(12) United States Patent
Yu et al.

(10) Patent No.: US 10,956,114 B2
(45) Date of Patent: Mar. 23, 2021

(54) ENVIRONMENTAL CHARACTERIZATION BASED ON A CHANGE CONDITION

(71) Applicant: EVA Automation, Inc., Redwood City, CA (US)

(72) Inventors: Gaylord Yu, San Francisco, CA (US); Steven Stupp, Foster City, CA (US)

(73) Assignee: B&W Group Ltd., Worthing (GB)

( * ) Notice: Subject to any disclaimer, the term of this patent is extended or adjusted under 35 U.S.C. 154(b) by 0 days.

(21) Appl. No.: 15/790,000

(22) Filed: Oct. 22, 2017

(65) Prior Publication Data

US 2018/0166101 A1 Jun. 14, 2018

Related U.S. Application Data

(60) Provisional application No. 62/433,237, filed on Dec. 13, 2016.

(51) Int. Cl.
*G06F 17/00* (2019.01)
*G06F 3/16* (2006.01)
(Continued)

(52) U.S. Cl.
CPC ............ *G06F 3/165* (2013.01); *G06F 1/12* (2013.01); *G11B 27/10* (2013.01); *H04L 7/02* (2013.01);
(Continued)

(58) Field of Classification Search
CPC . G06F 3/165; G06F 1/12; G11B 27/10; H04L 7/02; H04L 65/60; H04L 29/06027; H04N 21/4305; H04N 21/43615; H04N 21/8106; H04N 21/8547; H04R 27/00; H04R 3/12; H04R 2227/005;
(Continued)

(56) References Cited

U.S. PATENT DOCUMENTS 5,872,743 A * 2/1999 Maxwell ............... G01S 15/876
367/96
8,285,405 B2 * 10/2012 Goh .................. H04M 1/72522
700/94

(Continued)

OTHER PUBLICATIONS

ID3 Draft Specification (Year: 2000).*

*Primary Examiner* — Paul C McCord
(74) *Attorney, Agent, or Firm* — Steve Stupp; Stupp Associates, LLC

(57) ABSTRACT

An audio/video (A/V) hub that selectively determines one or more acoustic characteristics of an environment that includes the A/V hub is described. In particular, the A/V hub may detect, using wireless communication, an electronic device (such as a speaker) in the environment. Then, the A/V hub may determine a change condition, such as when the electronic device was not previously detected in the environment and/or a change in a location of the electronic device. In response to determining the change condition, the A/V hub may transition into a characterization mode. During the characterization mode, the A/V hub may: provide instructions to the electronic device to playback audio content at a specified playback time; determine one or more acoustic characteristics of the environment based on acoustic measurements in the environment; and store the one or more acoustic characteristics and/or a location of the electronic device in memory.

20 Claims, 23 Drawing Sheets

(51) Int. Cl.
*H04R 27/00* (2006.01)
*H04L 7/02* (2006.01)
*H04N 21/43* (2011.01)
*H04N 21/436* (2011.01)
*H04N 21/81* (2011.01)
*H04S 7/00* (2006.01)
*H04L 29/06* (2006.01)
*H04N 21/8547* (2011.01)
*G11B 27/10* (2006.01)
*H04W 4/02* (2018.01)
*H04W 56/00* (2009.01)
*G06F 1/12* (2006.01)
*H04R 3/12* (2006.01)

(52) U.S. Cl.
CPC ......... *H04L 65/60* (2013.01); *H04N 21/4305* (2013.01); *H04N 21/43615* (2013.01); *H04N 21/8106* (2013.01); *H04N 21/8547* (2013.01); *H04R 27/00* (2013.01); *H04S 7/301* (2013.01); *H04S 7/307* (2013.01); *H04W 4/023* (2013.01); *H04W 56/005* (2013.01); *H04L 29/06027* (2013.01); *H04R 3/12* (2013.01); *H04R 2227/005* (2013.01); *H04R 2420/07* (2013.01)

(58) Field of Classification Search
CPC ..... H04R 2420/07; H04S 7/301; H04S 7/307; H04W 4/023; H04W 56/005
USPC .......................................................... 700/94
See application file for complete search history.

(56) References Cited

U.S. PATENT DOCUMENTS

| | | | |
|---|---|---|---|
| 8,880,205 B2* | 11/2014 | Chung | H04S 7/307 381/100 |
| 8,989,882 B2* | 3/2015 | Wollmershauser | H04N 21/8106 700/94 |
| 9,084,058 B2* | 7/2015 | Reilly | H04R 27/00 |
| 9,106,192 B2 | 8/2015 | Sheen | H03G 5/005 |
| 9,307,340 B2* | 4/2016 | Seefeldt | H04S 7/301 |
| 9,432,791 B2 | 8/2016 | Chatterjee | H04S 7/301 |
| 9,554,203 B1* | 1/2017 | Pavlidi | H04R 1/08 |
| 2007/0038999 A1* | 2/2007 | Millington | H04J 3/0664 718/100 |
| 2008/0004729 A1* | 1/2008 | Hiipakka | H04R 5/04 700/94 |
| 2008/0077261 A1* | 3/2008 | Baudino | H04H 20/63 700/94 |
| 2008/0144876 A1* | 6/2008 | Reining | H04R 1/083 381/369 |
| 2010/0272270 A1* | 10/2010 | Chaikin | H04R 29/008 381/59 |
| 2015/0156578 A1* | 6/2015 | Alexandridis | H04R 3/005 381/92 |
| 2015/0215715 A1* | 7/2015 | Sheen | H04R 27/00 381/77 |
| 2016/0104494 A1* | 4/2016 | Kim | G10L 19/008 381/22 |
| 2016/0192098 A1* | 6/2016 | Oishi | G06F 3/165 381/56 |
| 2017/0011750 A1* | 1/2017 | Liu | G10L 19/008 |
| 2018/0160250 A1* | 6/2018 | Yamamoto | G10L 19/008 |
| 2018/0182402 A1* | 6/2018 | Krueger | H04S 7/303 |

* cited by examiner

ENVIRONMENTAL CHARACTERIZATION BASED ON A CHANGE CONDITION

CROSS REFERENCE TO RELATED APPLICATIONS

This application claims priority under 35 U.S.C. 119(e) to U.S. Provisional Application Ser. No. 62/433,237, "Wireless Coordination of Audio Sources," by Gaylord Yu, filed on Dec. 13, 2016, the contents of which are herein incorporated by reference.

BACKGROUND

Field

The described embodiments relate to a characterization technique. More specifically, the described embodiments include a characterization technique that selectively characterizes an environment when a change condition is detected.

Related Art

Music often has a significant impact on an individual's emotions and perceptions. This is thought to be a result of connections or relationships between the areas of the brain that decipher, learn, and remember music with those that produce emotional responses, such as the frontal lobes and limbic system. Indeed, emotions are thought to be involved in the process of interpreting music, and concurrently are very important in the effect of music on the brain. Given this ability of music to 'move' a listener, audio quality is often an important factor in user satisfaction when listening to audio content and, more generally, when viewing and listening to audio/video (A/V) content.

However, it is often challenging to achieve high audio quality in an environment. For example, the acoustic sources (such as loudspeakers) may not be properly placed in the environment. Alternatively or additionally, a listener may not be located at an ideal position in the environment. In particular, in a stereo playback system, the so-called 'sweet spot,' where the amplitude differences and arrival time differences are small enough that an apparent image and localization of an original sound source are both maintained, is usually limited to a fairly small area between the loudspeakers. When the listener is outside that area, the apparent image collapses and only one or the other independent audio channel output by the loudspeakers may be heard. Furthermore, achieving high audio quality in the environment typically places strong constraints on synchronization of the loudspeakers.

Consequently, when one or more of these factors is sub-optimal, the acoustic quality in the environment may be degraded. In turn, this may adversely impact listener satisfaction and the overall user experience when listening to audio content and/or A/V content.

SUMMARY

A first group of described embodiments includes an audio/video (A/V) hub. This A/V hub includes: one or more antennas; and an interface circuit that, during operation, communicates with electronic devices using wireless communication. During operation, the A/V hub receives, via the wireless communication, frames from the electronic devices, where a given frame includes a transmit time when a given electronic device transmitted the given frame. Then, the A/V hub stores receive times when the frames were received, where the receive times are based on a clock in the A/V hub. Moreover, the A/V hub calculates current time offsets between clocks in the electronic devices and the clock in the A/V hub based on the receive times and transmit times of the frames. Next, the A/V hub transmits one or more frames that include audio content and playback timing information to the electronic devices, where the playback timing information specifies playback times when the electronic devices are to playback the audio content based on the current time offsets. Furthermore, the playback times of the electronic devices have a temporal relationship so that the playback of the audio content by the electronic devices is coordinated.

Note that the temporal relationship may have a non-zero value, so that at least some of the electronic devices are instructed to playback the audio content with a phase relative to each other by using different values of the playback times. For example, the different playback times may be based on acoustic characterization of an environment that includes the electronic devices and the A/V hub. Alternatively or additionally, the different playback times may be based on a desired acoustic characteristic in the environment.

In some embodiments, the electronic devices are located at vector distances from the A/V hub, and the interface circuit determines magnitudes of the vector distances based on the transmit times and the receive times using wireless ranging. Moreover, the interface circuit may determine angles of the vector distances based on the angle of arrival of wireless signals associated with the frames that are received by the one or more antennas during the wireless communication. Furthermore, the different playback times may be based on the determined vector distances.

Alternatively or additionally, the different playback times are based on an estimated location of a listener relative to the electronic devices. For example, the interface circuit may: communicate with another electronic device; and calculate the estimated location of the listener based on the communication with the other electronic device. Moreover, the A/V hub may include an acoustic transducer that performs sound measurements of the environment that includes the A/V hub, and the A/V hub may calculate the estimated location of the listener based on the sound measurements. Furthermore, the interface circuit may communicate with other electronic devices in the environment and may receive additional sound measurements of the environment from the other electronic devices. In these embodiments, the A/V hub calculates the estimated location of the listener based on the additional sound measurements. In some embodiments, the interface circuit: performs time-of-flight measurements; and calculates the estimated location of the listener based on the time-of-flight measurements.

Note that the electronic devices may be located at non-zero distances from the A/V hub, and the current time offsets may be calculated based on the transmit times and the receive times using wireless ranging by ignoring the distances.

Moreover, the current time offsets may be based on models of clock drift in the electronic devices.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for coordinating playback of audio content. This method includes at least some of the operations performed by the A/V hub.

Another embodiment provides one or more of the electronic devices.

A second group of described embodiments includes an audio/video (A/V) hub. This A/V hub includes: memory that, during operation, stores characterization information of an environment that includes the A/V hub; one or more antennas; and an interface circuit that, during operation, communicates with an electronic device using wireless communication. During operation, the A/V hub detects, using the wireless communication, the electronic device in the environment. Then, the A/V hub determines a change condition, where the change condition includes: that the electronic device was not previously detected in the environment; and/or a change in a location of the electronic device. When the change condition is determined, the A/V hub transitions into a characterization mode. During the characterization mode, the A/V hub: provides instructions to the electronic device to playback audio content at a specified playback time; determines one or more acoustic characteristics of the environment based on acoustic measurements in the environment; and stores the characterization information in the memory, where the characterization information includes the one or more acoustic characteristics.

Moreover, the characterization information may include: an identifier of the electronic device; and the location of the electronic device. For example, the location may include a distance between the A/V hub and the electronic device, and an angle of arrival of wireless signals during the wireless communication. Consequently, the change in the location may include a change in: the distance, the angle of arrival, or both. In some embodiments, the distance is determined using wireless ranging.

Note that the one or more acoustic characteristics may include information specifying: an acoustic transfer function in at least a first band of frequencies, acoustic loss, acoustic delay, acoustic noise in the environment, ambient sound in the environment, a reverberation time of the environment, and/or a spectral response in at least a second band of frequencies.

Furthermore, the A/V hub may calculate the location of the electronic device in the environment based on the wireless communication.

Additionally, the interface circuit may communicate with other electronic devices in the environment using the wireless communication, and the acoustic measurements may be received from the other electronic devices. In these embodiments, the one or more acoustic characteristics may be determined based on locations of the other electronic devices in the environment. Note that the A/V hub may: receive the locations of the other electronic devices from the other electronic devices; access predetermined locations of the other electronic devices stored in the memory; and determine the locations of the other electronic devices based on the wireless communication.

In some embodiments, the A/V hub includes one or more acoustic transducers, and the A/V hub performs the acoustic measurements using the one or more acoustic transducers.

Moreover, the A/V hub may: receive a user input; and transition into the characterization mode based on the user input.

Furthermore, the A/V hub may transmit one or more frames that include additional audio content and playback timing information to the electronic device, where the playback timing information may specify a playback time when the electronic device is to playback the additional audio content based on the one or more acoustic characteristics.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for selectively determining one or more acoustic characteristics of the environment that includes the A/V hub. This method includes at least some of the operations performed by the A/V hub.

Another embodiment provides the electronic device.

A third group of described embodiments includes an audio/video (A/V) hub. This A/V hub includes: one or more acoustic transducers that, during operation, measure sound output by electronic devices in an environment that includes the A/V hub and the electronic devices; one or more antennas; and an interface circuit that, during operation, communicates with the electronic devices using wireless communication. During operation, the A/V hub measures the sound output by the electronic devices using the one or more acoustic transducers, where the sound corresponds to one or more acoustic-characterization patterns. Then, the A/V hub calculates current time offsets between clocks in the electronic devices and a clock in the A/V hub based on the measured sound, one or more times when the electronic devices output the sound and the one or more acoustic-characterization patterns. Next, the A/V hub transmits, using wireless communication, one or more frames that include audio content and playback timing information to the electronic devices, where the playback timing information specifies playback times when the electronic devices are to playback the audio content based on the current time offsets. Moreover, the playback times of the electronic devices have a temporal relationship so that the playback of the audio content by the electronic devices is coordinated.

Note that the measured sound may include information that specifies the one or more times when the electronic devices output the sound, and the one or more times may correspond to the clocks in the electronic devices.

Moreover, the A/V hub may provide to the electronic devices, via the wireless communication, one or more times when the electronic devices are to output the sound, and the one or more times may correspond to the clock in the A/V hub.

Furthermore, a given electronic device may output the sound at a different time in the one or more times than those used by a remainder of the electronic devices. Alternatively or additionally, the sound output by a given electronic device may correspond to a given acoustic-characterization patterns, which may be different from those used by the remainder of the electronic devices.

Note that the acoustic-characterization patterns may include pulses. Moreover, the sound may be in a range of frequencies outside of human hearing.

In some embodiments, the A/V hub modifies the measured sound based on an acoustic transfer function of the environment in at least a band of frequencies.

Moreover, the temporal relationship may have a non-zero value, so that at least some of the electronic devices are instructed to playback the audio content with a phase relative to each other by using different values of the playback times. For example, the different playback times may be based on: acoustic characterization of the environment; a desired acoustic characteristic in the environment; and/or an estimated location of a listener relative to the electronic devices.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for coordinating playback of audio content. This method includes at least some of the operations performed by the A/V hub.

Another embodiment provides one or more of the electronic devices.

A fourth group of described embodiments includes an audio/video (A/V) hub. This A/V hub includes: one or more antennas; and an interface circuit that, during operation, communicates with electronic devices using wireless communication. During operation, the A/V hub calculates an estimated location of a listener relative to the electronic devices in an environment that includes the A/V hub and the electronic devices. Then, the A/V hub transmits one or more frames that include audio content and playback timing information to the electronic devices, where the playback timing information specifies playback times when the electronic devices are to playback the audio content based on the estimated location. Note that the playback times of the electronic devices have a temporal relationship so that the playback of the audio content by the electronic devices is coordinated.

Moreover, the interface circuit may communicate with another electronic device, and the estimated location of the listener may be calculated based on the communication with the other electronic device. Furthermore, the A/V hub may include an acoustic transducer that performs sound measurements in the environment, and the estimated location of the listener may be calculated based on the sound measurements. Alternatively or additionally, the interface circuit may communicate with other electronic devices in the environment and may receive additional sound measurements of the environment from the other electronic devices, and the estimated location of the listener may be calculated based on the additional sound measurements. In some embodiments, the interface circuit performs time-of-flight measurements, and the estimated location of the listener is calculated based on the time-of-flight measurements.

Note that the playback times may be based on current time offsets between clocks in the electronic devices and a clock in the A/V hub.

Moreover, the A/V hub may calculate additional estimated locations of additional listeners relative to the electronic devices in the environment, and the playback times may be based on the estimated location and the additional estimated locations. For example, the playback times may be based on an average of the estimated location and the additional estimated locations. Alternatively, the playback times may be based on a weighted average of the estimated location and the additional estimated locations.

Furthermore, the temporal relationship may have a non-zero value, so that at least some of the electronic devices are instructed to playback the audio content with a phase relative to each other by using different values of the playback times. In some embodiments, the different playback times are based on: acoustic characterization of the environment; and/or a desired acoustic characteristic in the environment.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for calculating an estimated location. This method includes at least some of the operations performed by the A/V hub.

Another embodiment provides one or more of the electronic devices.

A fifth group of described embodiments includes an audio/video (A/V) hub. This A/V hub includes: one or more acoustic transducers that, during operation, measure sound output by electronic devices in an environment that includes the A/V hub and the electronic devices; one or more antennas; and an interface circuit that, during operation, communicates with the electronic devices using wireless communication. During operation, the A/V hub measures the sound output by the electronic devices using the one or more acoustic transducers, where the sound corresponds to audio content. Then, the A/V hub aggregates the electronic devices into two or more subsets based on the measured sound. Moreover, the A/V hub determines playback timing information for the subsets, where the playback timing information specifies playback times when the electronic devices in a given subset are to playback the audio content. Next, the A/V hub transmits, using wireless communication, one or more frames that include the audio content and playback timing information to the electronic devices, where the playback times of the electronic devices in at least the given subset have a temporal relationship so that the playback of the audio content by the electronic devices in the given subset is coordinated.

Note that the different subsets may be located in different rooms in the environment.

Moreover, at least one of the subsets may playback different audio content than a remainder of the subsets.

Furthermore, the aggregation of the electronic devices into the two or more subsets may be based on: the different audio content; an acoustic delay of the measured sound; and/or a desired acoustic characteristic in the environment.

Additionally, the A/V hub may calculate an estimated location of a listener relative to the electronic devices, and the aggregation of the electronic devices into the two or more subsets may be based on the estimated location of the listener.

In some embodiments, the A/V hub modifies the measured sound based on an acoustic transfer function of the environment in at least a band of frequencies.

Moreover, the A/V hub may determine playback volumes for the subsets that are used when the subsets playback the audio content, and the one or more frames may include information that specifies the playback volumes. For example, a playback volume for at least one of the subsets may be different than the playback volumes of a remainder of the subsets. Alternatively or additionally, the playback volumes may reduce acoustic cross-talk among the two or more subsets.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for aggregating electronic devices. This method includes at least some of the operations performed by the A/V hub.

Another embodiment provides one or more of the electronic devices.

A sixth group of described embodiments includes an audio/video (A/V) hub. This A/V hub includes: one or more acoustic transducers that, during operation, measure sound output by electronic devices in an environment that includes the A/V hub and the electronic devices; one or more antennas; and an interface circuit that, during operation, communicates with the electronic devices using wireless communication. During operation, the A/V hub measures the sound output by the electronic devices using the one or more acoustic transducers, where the sound corresponds to audio content. Then, the A/V hub compares the measured sound to a desired acoustic characteristic at a first location in the environment based on the first location, a second location of the A/V hub, and an acoustic transfer function of the environment in at least a band of frequencies, where the comparison involves calculating the acoustic transfer function at the first location based on the acoustic transfer function at other locations in the environment and correcting the measured sound based on the calculated the acoustic transfer function at the first location. Moreover, the A/V hub determines equalized audio content based on the comparison and the audio content. Next, the A/V hub transmits, using wireless communication, one or more frames that include the equalized audio content to the electronic devices to facilitate output by the electronic devices of additional sound, which corresponds to the equalized audio content.

Note that the first location may include an estimated location of a listener relative to the electronic devices, and the A/V hub may calculate the estimated location of the listener. For example, the A/V hub may calculate the estimated location of the listener based on the sound measurements. Alternatively or additionally, the interface circuit may: communicate with another electronic device; and may calculate the estimated location of the listener based on the communication with the other electronic device. In particular, the communication with the other electronic device may include wireless ranging, and the estimated location may be calculated based on the wireless ranging and an angle of arrival of wireless signals from the other electronic device. In some embodiments, the interface circuit: performs time-of-flight measurements; and calculates the estimated location of the listener based on the time-of-flight measurements.

Moreover, the interface circuit may communicate with other electronic devices in the environment and may receive additional sound measurements of the environment from the other electronic devices. Then, the A/V hub may perform one or more additional comparisons of the additional sound measurements to the desired acoustic characteristic at the first location in the environment based on one or more third locations of the other electronic devices and the acoustic transfer function of the environment in at least a band of frequencies, and the equalized audio content is further determined based on the one or more additional comparisons. Furthermore, the interface circuit may determine the one or more third locations based on the communication with the other electronic devices. For example, the communication with the other electronic devices may include wireless ranging, and the one or more third locations may be calculated based on the wireless ranging and angles of arrival of wireless signals from the other electronic devices. Alternatively or additionally, the interface circuit may receive information specifying the third locations from the other electronic devices.

In some embodiments, the desired acoustic characteristic is based on a type of audio playback, which may include: monophonic, stereophonic and/or multichannel.

Moreover, the A/V hub may determine playback timing information that specifies playback times when the electronic devices playback the equalized audio content, the one or more frames further may include the playback timing information, and the playback times of the electronic devices have a temporal relationship so that the playback of the audio content by the electronic devices is coordinated.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for determining the equalized audio content. This method includes at least some of the operations performed by the A/V hub.

Another embodiment provides one or more of the electronic devices.

A seventh group of described embodiments includes an audio/video (A/V) hub. This A/V hub includes: one or more antennas; and an interface circuit that, during operation, communicates with electronic devices using wireless communication. During operation, the A/V hub receives, via the wireless communication, frames from the electronic devices. Then, the A/V hub stores receive times when the frames were received, where the receive times are based on a clock in the A/V hub. Moreover, the A/V hub calculates current time offsets between clocks in the electronic devices and the clock in the A/V hub based on the receive times and expected transmit times of the frames, where the expected transmit times are based on coordination of the clocks in the electronic devices and the clock in the A/V hub at a previous time and a predefined transmit schedule of the frames. Next, the A/V hub transmits one or more frames that include audio content and playback timing information to the electronic devices, where the playback timing information specifies playback times when the electronic devices are to playback the audio content based on the current time offsets. Furthermore, the playback times of the electronic devices have a temporal relationship so that the playback of the audio content by the electronic devices is coordinated.

Note that the temporal relationship may have a non-zero value, so that at least some of the electronic devices are instructed to playback the audio content with a phase relative to each other by using different values of the playback times. For example, the different playback times may be based on acoustic characterization of an environment that includes the electronic devices and the A/V hub. Alternatively or additionally, the different playback times may be based on a desired acoustic characteristic in the environment.

In some embodiments, the electronic devices are located at vector distances from the A/V hub, and the interface circuit determines magnitudes of the vector distances based on transmit times of the frames and the receive times using wireless ranging. Moreover, the interface circuit may determine angles of the vector distances based on the angle of arrival of wireless signals associated with the frames that are received by the one or more antennas during the wireless communication. Furthermore, the different playback times may be based on the determined vector distances.

Alternatively or additionally, the different playback times are based on an estimated location of a listener relative to the electronic devices. For example, the interface circuit may: communicate with another electronic device; and calculate the estimated location of the listener based on the communication with the other electronic device. Moreover, the A/V hub may include an acoustic transducer that performs sound measurements of the environment that includes the A/V hub, and the A/V hub may calculate the estimated location of the listener based on the sound measurements. Furthermore, the interface circuit may communicate with other electronic devices in the environment and may receive additional sound measurements of the environment from the other electronic devices. In these embodiments, the A/V hub calculates the estimated location of the listener based on the additional sound measurements. In some embodiments, the interface circuit: performs time-of-flight measurements; and calculates the estimated location of the listener based on the time-of-flight measurements.

Note that the coordination of the clocks in the electronic devices and the clock in the A/V hub may have occurred during an initialization mode of operation.

Moreover, the current time offsets may be based on models of clock drift in the electronic devices.

Another embodiment provides a computer-readable storage medium for use with the A/V hub. This computer-readable storage medium includes a program module that, when executed by the A/V hub, cause the A/V hub to perform at least some of the aforementioned operations.

Another embodiment provides a method for coordinating playback of audio content. This method includes at least some of the operations performed by the A/V hub.

Another embodiment provides one or more of the electronic devices.

This Summary is only provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
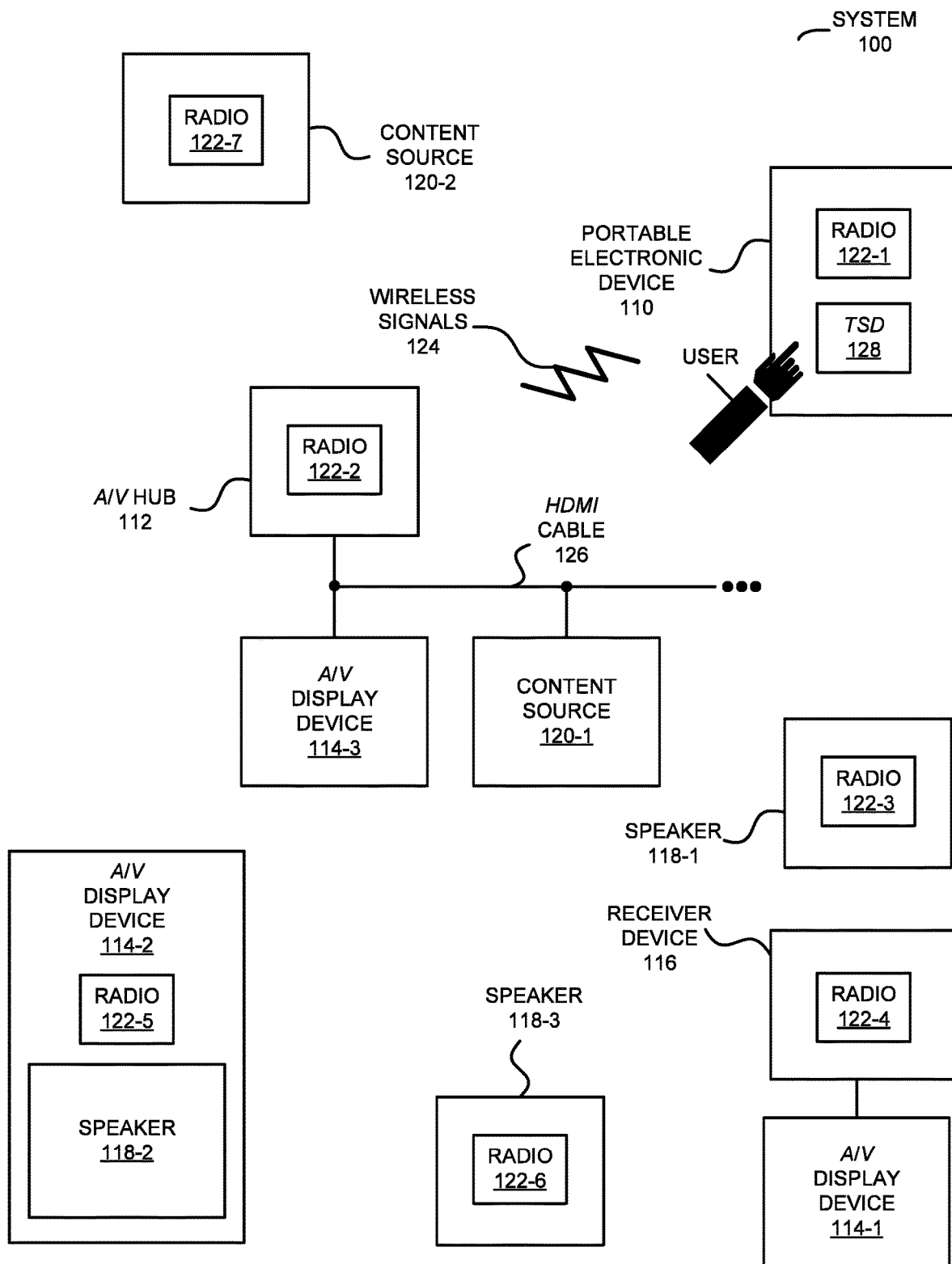
FIG. 1 is a block diagram illustrating a system with electronic devices in accordance with an embodiment of the present disclosure.

In a first group of embodiments, an audio/video (A/V) hub that coordinates playback of audio content is described. In particular, the A/V hub may calculate current time offsets between clocks in electronic devices (such as electronic devices that include speakers) and a clock in the A/V hub based on differences between transmit times of frames from the electronic devices and receive times when the frames were received. For example, the current time offsets may be calculated using wireless ranging by ignoring distances between the A/V hub and the electronic devices. Then, the A/V hub may transmit, to the electronic devices, one or more frames that include audio content and playback timing information, which may specify playback times when the electronic devices are to playback the audio content based on the current time offsets. Furthermore, the playback times of the electronic devices may have a temporal relationship so that the playback of the audio content by the electronic devices is coordinated.

By coordinating the playback of the audio content by the electronic devices, this coordination technique may provide an improved acoustic experience in an environment that includes the A/V hub and the electronic devices. For example, the coordination technique may correct for clock drift between the A/V hub and the electronic devices. Alternatively or additionally, the coordination technique may correct or adapt for acoustic characteristics of the environment and/or based on a desired acoustic characteristic in the environment. In addition, the coordination technique may correct the playback times based on an estimated location of a listener relative to the electronic devices. In these ways, the coordination technique may improve the acoustic quality and, more generally, the user experience when using the A/V hub and the electronic devices. Consequently, the coordination technique may increase customer loyalty and revenue of a provider of the A/V hub and the electronic devices.

In a second group of embodiments, an audio/video (A/V) hub that selectively determines one or more acoustic characteristics of an environment that includes the A/V hub is described. In particular, the A/V hub may detect, using wireless communication, an electronic device (such as an electronic device that includes a speaker) in the environment. Then, the A/V hub may determine a change condition, such as when the electronic device was not previously detected in the environment and/or a change in a location of the electronic device. In response to determining the change condition, the A/V hub may transition into a characterization mode. During the characterization mode, the A/V hub may: provide instructions to the electronic device to playback audio content at a specified playback time; determine one or more acoustic characteristics of the environment based on acoustic measurements in the environment; and store the one or more acoustic characteristics and/or a location of the electronic device in memory.

By selectively determining the one or more acoustic characteristics, this characterization technique may facilitate an improved acoustic experience in the environment that includes the A/V hub and the electronic device. For example, the characterization technique may identify the changes and characterize the modified environment, which may be subsequently used to correct for the impact of the change during playback of audio content by one or more electronic devices (including the electronic device). In these ways, the characterization technique may improve acoustic quality and, more generally, the user experience when using the A/V hub and the electronic devices. Consequently, the characterization technique may increase customer loyalty and revenue of a provider of the A/V hub and the electronic devices.

In a third group of embodiments, an audio/video (A/V) hub that coordinates playback of audio content is described. In particular, the A/V hub may calculate current time offsets between clocks in electronic devices (such as electronic devices that include speakers) and a clock in the A/V hub based on measured sound corresponding to one or more acoustic-characterization patterns, one or more times when the electronic devices output the sound and the one or more acoustic-characterization patterns. Then, the A/V hub may transmit, to the electronic devices, one or more frames that include audio content and playback timing information, which may specify playback times when the electronic devices are to playback the audio content based on the current time offsets. Moreover, the playback times of the electronic devices may have a temporal relationship so that the playback of the audio content by the electronic devices is coordinated.

By coordinating the playback of the audio content by the electronic devices, this coordination technique may provide an improved acoustic experience in an environment that includes the A/V hub and the electronic devices. For example, the coordination technique may correct for clock drift between the A/V hub and the electronic devices. Alternatively or additionally, the coordination technique may correct or adapt for acoustic characteristics of the environment and/or based on a desired acoustic characteristic in the environment. In addition, the coordination technique may correct the playback times based on an estimated location of a listener relative to the electronic devices. In these ways, the coordination technique may improve the acoustic quality and, more generally, the user experience when using the A/V hub and the electronic devices. Consequently, the coordination technique may increase customer loyalty and revenue of a provider of the A/V hub and the electronic devices.

In a fourth group of embodiments, an audio/video (A/V) hub that calculates an estimated location is described. In particular, the A/V hub may calculate an estimated location of a listener relative to electronic devices (such as electronic devices that include speakers) in an environment that includes the A/V hub and the electronic devices based on: communication with another electronic device; sound measurements in the environment; and/or time-of-flight measurements. Then, the A/V hub may transmit, to the electronic devices, one or more frames that include audio content and playback timing information, which may specify playback times when the electronic devices are to playback the audio content based on the estimated location. Moreover, the playback times of the electronic devices may have a temporal relationship so that the playback of the audio content by the electronic devices is coordinated.

By calculating the estimated location of the listener, this characterization technique may facilitate an improved acoustic experience in the environment that includes the A/V hub and the electronic devices. For example, the characterization technique may track changes in the location of the listener in the environment, which may be subsequently used to correct or adapt playback of audio content by one or more electronic devices. In these ways, the characterization technique may improve the acoustic quality and, more generally, the user experience when using the A/V hub and the electronic devices. Consequently, the characterization technique may increase customer loyalty and revenue of a provider of the A/V hub and the electronic devices.

In a fifth group of embodiments, an audio/video (A/V) hub that aggregates electronic devices is described. In particular, the A/V hub may measure sound, corresponding to audio content, output by electronic devices (such as electronic devices that include speakers). Then, the A/V hub may aggregate the electronic devices into two or more subsets based on the measured sound. Moreover, the A/V hub may determine, for the subsets, playback timing information, which may specify playback times when the electronic devices in a given subset are to playback the audio content. Next, the A/V hub may transmit, to the electronic devices, one or more frames that include the audio content and playback timing information, where the playback times of the electronic devices in at least the given subset have a temporal relationship so that the playback of the audio content by the electronic devices in the given subset is coordinated.

By aggregating the electronic devices, this characterization technique may facilitate an improved acoustic experience in the environment that includes the A/V hub and the electronic devices. For example, the characterization technique may aggregate the electronic devices based on: different audio content; an acoustic delay of the measured sound; and/or a desired acoustic characteristic in the environment. In addition, the A/V hub may determine playback volumes for the subsets that are used when the subsets playback the audio content in order to reduce acoustic cross-talk among the two or more subsets. In these ways, the characterization technique may improve the acoustic quality and, more generally, the user experience when using the A/V hub and the electronic devices. Consequently, the characterization technique may increase customer loyalty and revenue of a provider of the A/V hub and the electronic devices.

In a sixth group of embodiments, an audio/video (A/V) hub that determines equalized audio content is described. In particular, the A/V hub may measure the sound, corresponding to audio content, output by electronic devices (such as electronic devices that include speakers). Then, the A/V hub may compare the measured sound to a desired acoustic characteristic at a first location in the environment based on the first location, a second location of the A/V hub, and an acoustic transfer function of the environment in at least a band of frequencies. For example, the comparison may involve calculating the acoustic transfer function at the first location based on the acoustic transfer function at other locations in the environment and correcting the measured sound based on the calculated the acoustic transfer function at the first location. Moreover, the A/V hub may determine the equalized audio content based on the comparison and the audio content. Next, the A/V hub may transmit, to the electronic devices, one or more frames that include the equalized audio content to facilitate output by the electronic devices of additional sound, which corresponds to the equalized audio content.

By determining the equalized audio content, this signal-processing technique may facilitate an improved acoustic experience in the environment that includes the A/V hub and the electronic devices. For example, the signal-processing may dynamically modify the audio content based on an estimated location of a listener relative to locations of the electronic devices and the acoustic transfer function of the environment in at least the band of frequencies. This may allow a desired acoustic characteristic or a type of audio playback (such as monophonic, stereophonic or multichannel) to be achieved at the estimated location in the environment. In these ways, the signal-processing technique may improve the acoustic quality and, more generally, the user experience when using the A/V hub and the electronic devices. Consequently, the signal-processing technique may increase customer loyalty and revenue of a provider of the A/V hub and the electronic devices.

In a seventh group of embodiments, an audio/video (A/V) hub that coordinates playback of audio content is described. In particular, the A/V hub may calculate current time offsets between clocks in electronic devices (such as electronic devices that include speakers) and a clock in the A/V hub based on differences between receive times when frames are received from electronic devices and expected transmit times of the frames. For example, the expected transmit times may be based on coordination of clocks in the electronic devices and a clock in the A/V hub at a previous time and a predefined transmit schedule of the frames. Then, the A/V hub may transmit, to the electronic devices, one or more frames that include audio content and playback timing information, which may specify playback times when the electronic devices are to playback the audio content based on the current time offsets. Furthermore, the playback times of the electronic devices may have a temporal relationship so that the playback of the audio content by the electronic devices is coordinated.

By coordinating the playback of the audio content by the electronic devices, this coordination technique may provide an improved acoustic experience in an environment that includes the A/V hub and the electronic devices. For example, the coordination technique may correct for clock drift between the A/V hub and the electronic devices. Alternatively or additionally, the coordination technique may correct or adapt for acoustic characteristics of the environment and/or based on a desired (or target) acoustic characteristic in the environment. In addition, the coordination technique may correct the playback times based on an estimated location of a listener relative to the electronic devices. In these ways, the coordination technique may improve the acoustic quality and, more generally, the user experience when using the A/V hub and the electronic devices. Consequently, the coordination technique may increase customer loyalty and revenue of a provider of the A/V hub and the electronic devices.

In the discussion that follows, the A/V hub (which is sometimes referred to as 'a coordination device'), an A/V display device, a portable electronic device, one or more receiver devices, and/or one or more electronic devices (such as a speaker and, more generally, a consumer-electronic device) may include radios that communicate packets or frames in accordance with one or more communication protocols, such as: an Institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, a near-field-communication standard or specification (from the NFC Forum of Wakefield, Mass.), and/or another type of wireless interface. For example, the cellular-telephone communication protocol may include or may be compatible with: a $2^{nd}$ generation of mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used (such as Ethernet). In addition, the communication may occur via a wide variety of frequency bands. Note that the portable electronic device, the A/V hub, the A/V display device, and/or the one or more electronic devices may communicate using infra-red communication that is compatible with an infra-red communication standard (including unidirectional or bidirectional infra-red communication).

Moreover, A/V content in following discussion may include video and associated audio (such as music, sound, dialog, etc.), video only or audio only.

Communication among electronic devices is shown in FIG. 1, which presents a block diagram illustrating a system 100 with a portable electronic device 110 (such as a remote control or a cellular telephone), one or more A/V hubs (such as A/V hub 112), one or more A/V display devices 114 (such as a television, a monitor, a computer and, more generally, a display associated with an electronic device), one or more receiver devices (such as receiver device 116, e.g., a local wireless receiver associated with a proximate A/V display device 114-1 that can receive frame-by-frame transcoded A/V content from A/V hub 112 for display on A/V display device 114-1), one or more speakers 118 (and, more generally, one or more electronic devices that include one or more speakers) and/or one or more content sources 120 associated with one or more content providers (e.g., a radio receiver, a video player, a satellite receiver, an access point that provides a connection to a wired network such as the Internet, a media or a content source, a consumer-electronic device, an entertainment device, a set-top box, over-the-top content delivered over the Internet or a network without involvement of a cable, satellite or multiple-system operator, a security camera, a monitoring camera, etc.). Note that A/V hub 112, A/V display devices 114, receiver device 116 and speakers 118 are sometimes collectively referred to as 'components' in system 100. However, A/V hub 112, A/V display devices 114, receiver device 116 and/or speakers 118 are sometimes referred to as 'electronic devices.'

In particular, portable electronic device 110 and A/V hub 112 may communicate with each other using wireless communication, and one or more other components in system 100 (such as at least: one of A/V display devices 114, receiver device 116, one of speakers 118 and/or one of content sources 120) may communicate using wireless and/or wired communication. During the wireless communication, these electronic devices may wirelessly communicate while: transmitting advertising frames on wireless channels, detecting one another by scanning wireless channels, establishing connections (for example, by transmitting association requests), and/or transmitting and receiving packets or frames (which may include the association requests and/or additional information as payloads, such as information specifying communication performance, data, a user interface, A/V content, etc.).

Figure 23:
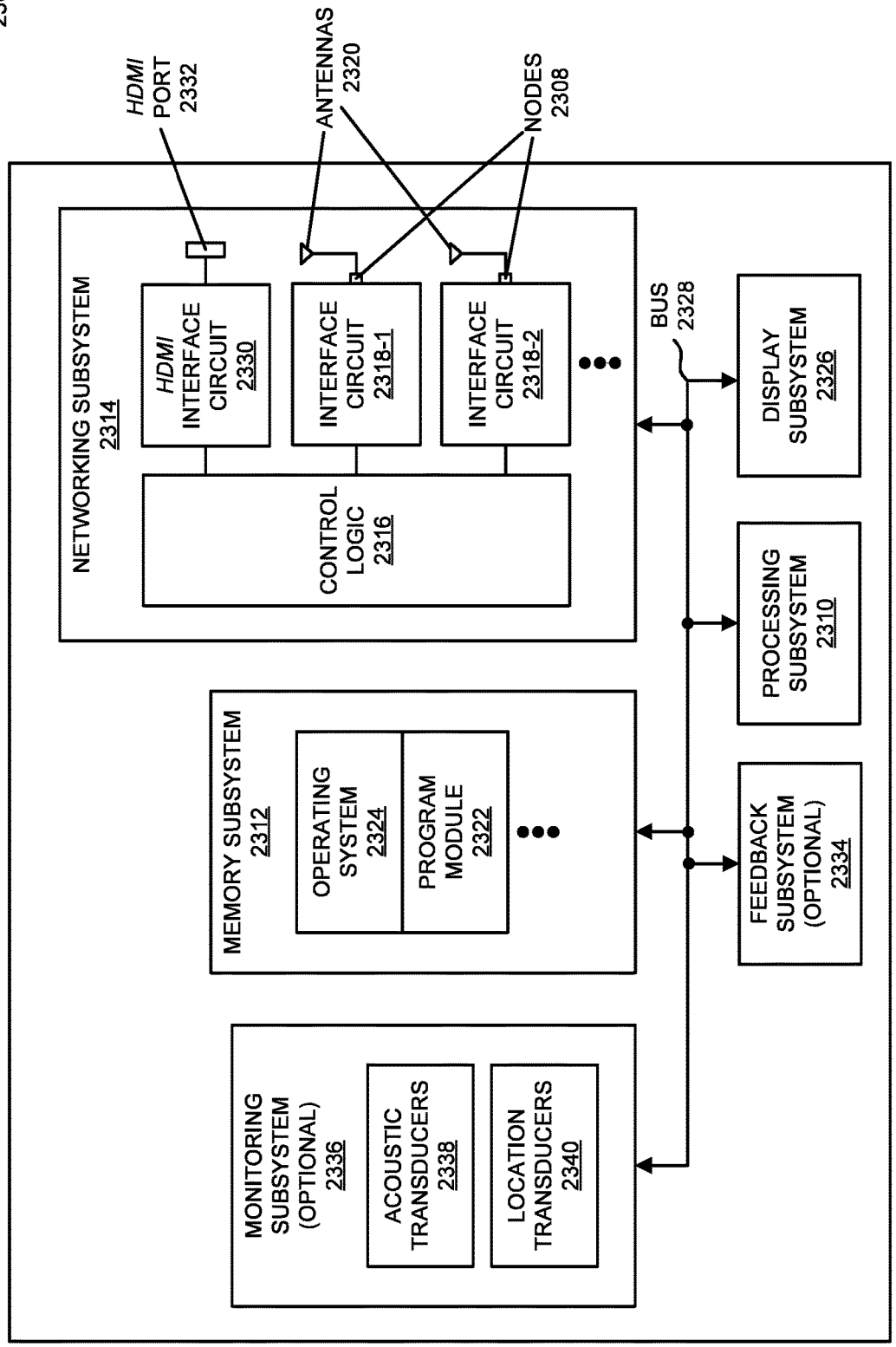
FIG. 23 is a block diagram illustrating one of the electronic devices of FIG. 1 in accordance with an embodiment of the present disclosure.

As described further below with reference to FIG. 23, portable electronic device 110, A/V hub 112, A/V display devices 114, receiver device 116, speakers 118 and content sources 120 may include subsystems, such as: a networking subsystem, a memory subsystem and a processor subsystem. In addition, portable electronic device 110, A/V hub 112, receiver device 116, and/or speakers 118, and optionally one or more of A/V display devices 114 and/or content sources 120, may include radios 122 in the networking subsystems. For example, a radio or receiver device may be in an A/V display device, e.g., radio 122-5 is included in A/V display device 114-2.) Moreover, note that radios 122 may be instances of the same radio or may be different from each other. More generally, portable electronic device 110, A/V hub 112, receiver device 116 and/or speakers 118 (and optionally A/V display devices 114 and/or content sources 120) can include (or can be included within) any electronic devices with the networking subsystems that enable portable electronic device 110, A/V hub 112 receiver device 116 and/or speakers 118 (and optionally A/V display devices 114 and/or content sources 120) to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 124 (represented by a jagged line) are transmitted from radio 122-1 in portable electronic device 110. These wireless signals may be received by at least one of: A/V hub 112, receiver device 116 and/or at least one of speakers 118 (and, optionally, one or more of A/V display devices 114 and/or content sources 120). For example, portable electronic device 110 may transmit packets. In turn, these packets may be received by a radio 122-2 in A/V hub 112. This may allow portable electronic device 110 to communicate information to A/V hub 112. While FIG. 1 illustrates portable electronic device 110 transmitting packets, note that portable electronic device 110 may also receive packets from A/V hub 112 and/or one or more other components in system 100. More generally, wireless signals may be transmitted and/or received by one or more of the components in system 100.

In the described embodiments, processing of a packet or frame in portable electronic device 110, A/V hub 112, receiver device 116 and/or speakers 118 (and optionally one or more of A/V display devices 114 and/or content sources 120) includes: receiving wireless signals 124 with the packet or frame; decoding/extracting the packet or frame from received wireless signals 124 to acquire the packet or frame; and processing the packet or frame to determine information contained in the packet or frame (such as the information associated with a data stream). For example, the information from portable electronic device 110 may include user-interface activity information associated with a user interface displayed on touch-sensitive display (TSD) 128 in portable electronic device 110, which a user of portable electronic device 110 uses to control at least: A/V hub 112, at least one of A/V display devices 114, at least one of speakers 118 and/or at least one of content sources 120. (In some embodiments, instead of or in additional to touch-sensitive display 128, portable electronic device 110 includes a user interface with physical knobs and/or buttons that a user can use to control at least: A/V hub 112 one of A/V display devices 114, at least one of speakers 118 and/or one of content sources 120.) Alternatively, the information from portable electronic device 110, A/V hub 112, one or more of A/V display devices 114, receiver device 116, one or more of speakers 118 and/or one or more of content sources 120 may specify communication performance about the communication between portable electronic device 110 and one or more other components in system 100. Moreover, the information from A/V hub 112 may include device-state information about a current device state of at least one of A/V display devices 114, at least one of speakers 118 and/or one of content sources 120 (such as on, off, play, rewind, fast forward, a selected channel, selected A/V content, a content source, etc.), or may include user-interface information for the user interface (which may be dynamically updated based on the device-state information and/or the user-interface activity information). Furthermore, the information from at least A/V hub 112 and/or one of content sources 120 may include audio and/or video (which is sometimes denoted as 'audio/video' or A/V' content) that are displayed or presented on one or more of A/V display devices 114, as well as display instructions that specify how the audio and/or video are to be displayed or presented.

However, as noted previously, the audio and/or video may be communicated between components in system 100 via wired communication. Therefore, as shown in FIG. 1, there may be a wired cable or link, such as a high-definition multimedia-interface (HDMI) cable 126, such as between A/V hub 112 and A/V display device 114-3. While the audio and/or video may be included in or associated with HDMI content, in other embodiments the audio content may be included in or associated with A/V content that is compatible with another format or standard is used in the embodiments of the disclosed communication technique. For example, the A/V content may include or may be compatible with: H.264, MPEG-2, a QuickTime video format, MPEG-4, MP4, and/or TCP/IP. Moreover, the video mode of the A/V content may be 720p, 1080i, 1080p, 1440p, 2000, 2160p, 2540p, 4000p and/or 4320p.

Note that A/V hub 112 may determine display instructions (with a display layout) for the A/V content based on a format of a display in one of A/V display devices 114, such as A/V display device 114-1. Alternatively, A/V hub 112 can use pre-determined display instructions or A/V hub 112 can modify or transform the A/V content based on the display layout so that the modified or transformed A/V content has an appropriate format for display on the display. Moreover, the display instructions may specify information to be displayed on the display in A/V display device 114-1, including where A/V content is displayed (such as in a central window, in a tiled window, etc.). Consequently, the information to be displayed (i.e., an instance of the display instructions) may be based on a format of the display, such as: a display size, display resolution, display aspect ratio, display contrast ratio, a display type, etc. Furthermore, note that when A/V hub 112 receives the A/V content from one of content sources 120, A/V hub 112 may provide the A/V content and display instructions to A/V display device 114-1 as frames with the A/V content are received from one of content sources 120 (e.g., in real time), so that the A/V content is displayed on the display in A/V display device 114-1. For example, A/V hub 112 may collect the A/V content in a buffer until a frame is received, and then A/V hub 112 may provide the complete frame to A/V display device 114-1. Alternatively, A/V hub 112 may provide packets with portions of a frame to A/V display device 114-1 as they are received. In some embodiments, the display instructions may be provided to A/V display device 114-1 differentially (such as when the display instructions change), regularly or periodically (such as in one of every N packets or in a packet in each frame) or in each packet.

Moreover, note that the communication between portable electronic device 110, A/V hub 112, one or more of A/V display devices 114, receiver device 116, one or more of speakers 118 and/or one or more content sources 120 may be characterized by a variety of performance metrics, such as: a received signal strength indicator (RSSI), a data rate, a data rate discounting radio protocol overhead (which is sometimes referred to as a 'throughput'), an error rate (such as a packet error rate, or a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated maximum data rate (which is sometimes referred to as 'utilization'). Moreover, the performance during the communication associated with different channels may be monitored individually or jointly (e.g., to identify dropped packets).

The communication between portable electronic device 110, A/V hub 112, one of A/V display devices 114, receiver device 116 one of speakers 118 and/or one or more of content sources 120 in FIG. 1 may involve one or more independent, concurrent data streams in different wireless channels (or even different communication protocols, such as different Wi-Fi communication protocols) in one or more connections or links, which may be communicated using multiple radios. Note that the one or more connections or links may each have a separate or different identifier (such as a different service set identifier) on a wireless network in system 100 (which may be a proprietary network or a public network). Moreover, the one or more concurrent data streams may, on a dynamic or packet-by-packet basis, be partially or completely redundant to improve or maintain the performance metrics even when there are transient changes (such as interference, changes in the amount of information that needs to be communicated, movement of portable electronic device 110, etc.), and to facilitate services (while remaining compatible with the communication protocol, e.g., a Wi-Fi communication protocol) such as: channel calibration, determining of one or more performance metrics, performing quality-of-service characterization without disrupting the communication (such as performing channel estimation, determining link quality, performing channel calibration and/or performing spectral analysis associated with at least one channel), seamless handoff between different wireless channels, coordinated communication between components, etc. These features may reduce the number of packets that are resent, and, thus, may decrease the latency and avoid disruption of the communication and may enhance the experience of one or more users that are viewing A/V content on one or more of A/V display devices 114 and/or listening to audio output by one or more of speakers 118.

As noted previously, a user may control at least A/V hub 112, at least one of A/V display devices 114, at least one of speakers 118 and/or at least one of content sources 120 via the user interface displayed on touch-sensitive display 128 on portable electronic device 110. In particular, at a given time, the user interface may include one or more virtual icons that allow the user to activate, deactivate or change functionality or capabilities of at least: A/V hub 112, at least one of A/V display devices 114, at least one of speakers 118 and/or at least one of content sources 120. For example, a given virtual icon in the user interface may have an associated strike area on a surface of touch-sensitive display 128. If the user makes and then breaks contact with the surface (e.g., using one or more fingers or digits, or using a stylus) within the strike area, portable electronic device 110 (such as a processor executing a program module) may receive user-interface activity information indicating activation of this command or instruction from a touch-screen input/output (I/O) controller, which is coupled to touch-sensitive display 128. (Alternatively, touch-sensitive display 128 may be responsive to pressure. In these embodiments, the user may maintain contact with touch-sensitive display 128 with an average contact pressure that is usually less than a threshold value, such as 10-20 kPa, and may activate a given virtual icon by increase the average contact pressure with touch-sensitive display 128 above the threshold value.) In response, the program module may instruct an interface circuit in portable electronic device 110 to wirelessly communicate the user-interface activity information indicating the command or instruction to A/V hub 112, and A/V hub 112 may communicate the command or the instruction to the target component in system 100 (such as A/V display device 114-1). This instruction or command may result in A/V display device 114-1 turning on or off, displaying A/V content from a particular content source, performing a trick mode of operation (such as fast forward, reverse, fast reverse or skip), etc. For example, A/V hub 112 may request the A/V content from content source 120-1, and then may provide the A/V content along with display instructions to A/V display device 114-1, so that A/V display device 114-1 displays the A/V content. Alternatively or additionally, A/V hub 112 may provide audio content associated with video content from content source 120-1 to one or more of speakers 118.

As noted previously, it is often challenging to achieve high audio quality in an environment (such as a room, a building, a vehicle, etc.). In particular, achieving high audio quality in the environment typically places strong constraints on coordination of the loudspeakers, such as speakers 118. For example, the coordination may need to be maintained to 1-5 μs accuracy (which are nonlimiting exemplary values). In some embodiments, the coordination includes synchronization in the time domain within a temporal or phase accuracy and/or the frequency domain within a frequency accuracy. In the absence of suitable coordination, the acoustic quality in the environment may be degraded, with a commensurate impact on listener satisfaction and the overall user experience when listening to audio content and/or A/V content.

This challenge may be addressed in a coordination technique by directly or indirectly coordinating speakers 118 with A/V hub 112. As described below with reference to FIGS. 2-4, in some embodiments coordinated playback of audio content by speakers 118 may be facilitated using wireless communication. In particular, because the speed of light is almost six orders of magnitude faster than the speed of sound, the propagation delay of wireless signals in an environment (such as a room) is negligible relative to the desired coordination accuracy of speakers 118. For example, the desired coordination accuracy of speakers 118 may be on the order of a microsecond, while the propagation delay in a typical room (e.g., over distances of at most 10-30 m) may be one or two orders of magnitude smaller. Consequently, techniques such as wireless ranging or radio-based distance measurements may be used to coordinate speakers 118. In particular, during wireless ranging A/V hub 112 may transmit a frame or a packet that includes a transmission time and an identifier of A/V hub 112 based on a clock in A/V hub 112, and a given one of speakers 118 (such as speaker 118-1) may determine an arrival or a reception time of the frame or packet based on a clock in speaker 118-1.

Alternatively, speaker 118-1 may transmit a frame or a packet (which is sometimes referred to as an 'input frame') that includes a transmission time and an identifier of speaker 118-1 based on the clock in speaker 118-1, and/V hub 112 may determine an arrival or a reception time of the frame or packet based on the clock in/V hub 112. Typically, the distance between A/V hub 112 and speaker 118-1 is determined based on the product of the time of fight (the difference of the arrival time and the transmission time) and the speed of propagation. However, by ignoring the physical distance between A/V hub 112 and speaker 118-1, i.e., by assuming instantaneous propagation (which for stationary devices in the same room or environment introduces a negligible static offset), the difference of the arrival time and the transmission time may dynamically track the drift or the current time offset in the coordination of the clocks in A/V hub 112 and speaker 118-1 (as well as the negligible static offset).

The current time offset may be determined by A/V hub 112 or may be provided to A/V hub 112 by speaker 118-1. Then, A/V hub 112 may transmit, to speaker 118-1, one or more frames (which are sometimes referred to as 'output frames') that include audio content and playback timing information, which may specify playback times when speaker 118-1 is to playback the audio content based on the current time offset. This may be repeated for other speakers 118. Furthermore, the playback times of speakers 118 may have a temporal relationship so that the playback of the audio content by speakers 118 is coordinated.

In addition to correcting for drift in the clocks, this coordination technique (as well as the other embodiments of the coordination technique described below) may provide an improved acoustic experience in an environment that includes A/V hub 112 and speakers 118. For example, the coordination technique may correct or adapt for predetermined or dynamically determined acoustic characteristics of the environment (as described further below with reference to FIGS. 11-13), based on a desired acoustic characteristic in the environment (such as a type of playback, e.g., monophonic, stereophonic and/or multichannel, an acoustic radiation pattern, such as directed or diffuse, intelligibility, etc.) and/or based on dynamically estimated locations of one or more listeners relative to speakers 118 (as described further below with reference to FIGS. 14-16). In addition, the coordination technique may be used in conjunction with dynamic aggregation of speakers 118 into groups (as described further below with reference to FIGS. 17-19) and/or with dynamically equalized audio content based audio content being played and differences between an acoustic characteristic and the desired acoustic characteristic in the environment (as described further below with reference to FIGS. 20-22).

Note that the wireless ranging (as well as the wireless communication in general) may be performed at or in one or more bands of frequencies, such as at or in: a 2 GHz wireless band, a 5 GHz wireless band, an ISM band, a 60 GHz wireless band, ultra-wide band, etc.

In some embodiments, one or more additional communication techniques may be used to identify and/or exclude multi-path wireless signals during the coordination of speakers 118. For example, A/V hub 112 and/or speakers 118 may determine the angle of arrival (including non-line-of-sight reception) using: a directional antenna, the differential time of arrival at an array of antennas with known location(s), and/or the angle of arrival at two receivers having known location (i.e., trilateration or multilateration).

As described further below with reference to FIGS. 5-7, another approach for coordinating speakers 118 may use scheduled transmission times. In particular, during a calibration mode, clocks in A/V hub 112 and speakers 118 may be coordinated. Subsequently, in a normal operating mode, A/V hub 112 may transmit frames or packets with an identifier of A/V hub 112 at predefined transmission times based on the clock in A/V hub 112. However, because of the relative drift in the clock in A/V hub 112, these packets or frames will arrive or be received at speakers 118 at different times than the expected predefined transmission times based on the clocks in speakers 118. Thus, by once again ignoring the propagation delay, the difference of the arrival time and the predefined transmission time of a given frame at a given one of speakers 118 (such as speaker 118-1) may dynamically track the drift or the current time offset in the coordination of the clocks in A/V hub 112 and speaker 118-1 (as well as the negligible static offset associated with the propagation delay).

Alternatively or additionally, after the calibration mode, speakers 118 may transmit frames or packets with identifiers of speakers 118 at predefined transmission times based on the clock in speakers 118. However, because of drift in the clocks in speakers 118, these packets or frames will arrive or be received by A/V hub 112 at different times than the expected predefined transmission times based on the clock in A/V hub 112. Thus, by once again ignoring the propagation delay, the difference of the arrival time and the predefined transmission time of a given frame from a given one of speakers 118 (such as speaker 118-1) may dynamically track the drift or the current time offset in the coordination of the clocks in A/V hub 112 and speaker 118-1 (as well as the negligible static offset associated with the propagation delay).

Once again, the current time offset may be determined by A/V hub 112 or may be provided to A/V hub 112 by one or more of speakers 118 (such as speaker 118-1). Note that in some embodiments the current time offset is further based on models of clock drift in A/V hub 112 and speakers 118. Then, A/V hub 112 may transmit, to speaker 118-1, one or more frames that include audio content and playback timing information, which may specify playback times when speaker 118-1 is to playback the audio content based on the current time offset. This may be repeated for other speakers 118. Furthermore, the playback times of speakers 118 may have a temporal relationship so that the playback of the audio content by speakers 118 is coordinated.

Moreover, note that the one or more additional communication techniques may also be used in these embodiments to identify and/or exclude multi-path wireless signals during the coordination of speakers 118.

As described further below with reference to FIGS. 8-10, another approach for coordinating speakers 118 may use acoustic measurements. In particular, during a calibration mode, clocks in A/V hub 112 and speakers 118 may be coordinated. Subsequently, A/V hub 112 may output sound that corresponds to an acoustic-characterization pattern that uniquely identifies A/V hub 112 (such as a sequence of pulses, different frequencies, etc.) at predefined transmission times. This acoustic-characterization pattern may be output at frequencies outside of the range of human hearing (such as at ultrasonic frequencies). However, because of the relative drift in the clock in A/V hub 112, the sound corresponding to the acoustic-characterization pattern will be measured at speakers 118 (i.e., will arrive or be received) at different times than the expected predefined transmission times based on the clocks in speakers 118. In these embodiments, the different times need to be corrected for the contributions associated with acoustic propagation delays based on the predetermined or known locations of A/V hub 112 and speakers 118 and/or using wireless ranging. For example, the locations may be determined using a triangulation and/or trilateration in a local positioning system, a global positioning system, and/or a wireless network (such as a cellular-telephone network or a WLAN). Thus, after correcting for the acoustic propagation delay, the difference of the arrival time and the predefined transmission time of a given frame at a given one of speakers 118 (such as speaker 118-1) may dynamically track the drift or the current time offset in the coordination of the clocks in A/V hub 112 and speaker 118-1.

Alternatively or additionally, after the calibration mode, speakers 118 may output sound that corresponds to acoustic-characterization patterns that uniquely identify speakers 118 (such as different sequences of pulses, different frequencies, etc.) at predefined transmission times. However, because of the relative drift in the clocks in speakers 118, the sound corresponding to the acoustic-characterization patterns will be measured at A/V hub 112 (i.e., will arrive or be received) at different times than the expected predefined transmission times based on the clock in A/V hub 112. In these embodiments, the different times need to be corrected for the contributions associated with acoustic propagation delays based on the predetermined or known locations of A/V hub 112 and speakers 118 and/or using wireless ranging. Thus, after correcting for the acoustic propagation delay, the difference of the arrival time and the predefined transmission time of a given frame from a given one of speakers 118 (such as speaker 118-1) may dynamically track the drift or the current time offset in the coordination of the clocks in A/V hub 112 and speaker 118-1.

Once again, the current time offset may be determined by A/V hub 112 or may be provided to A/V hub 112 by speaker 118-1. Then, A/V hub 112 may transmit, to speaker 118-1, one or more frames that include audio content and playback timing information, which may specify playback times when speaker 118-1 is to playback the audio content based on the current time offset. This may be repeated for other speakers 118. Furthermore, the playback times of speakers 118 may have a temporal relationship so that the playback of the audio content by speakers 118 is coordinated.

Although we describe the network environment shown in FIG. 1 as an example, in alternative embodiments, different numbers or types of electronic devices may be present. For example, some embodiments include more or fewer electronic devices. As another example, in another embodiment, different electronic devices are transmitting and/or receiving packets or frames. While portable electronic device 110 and A/V hub 112 are illustrated with a single instance of radios 122, in other embodiments portable electronic device 110 and A/V hub 112 (and optionally A/V display devices 114, receiver device 116, speakers 118 and/or content sources 120) may include multiple radios.

Figure 2:
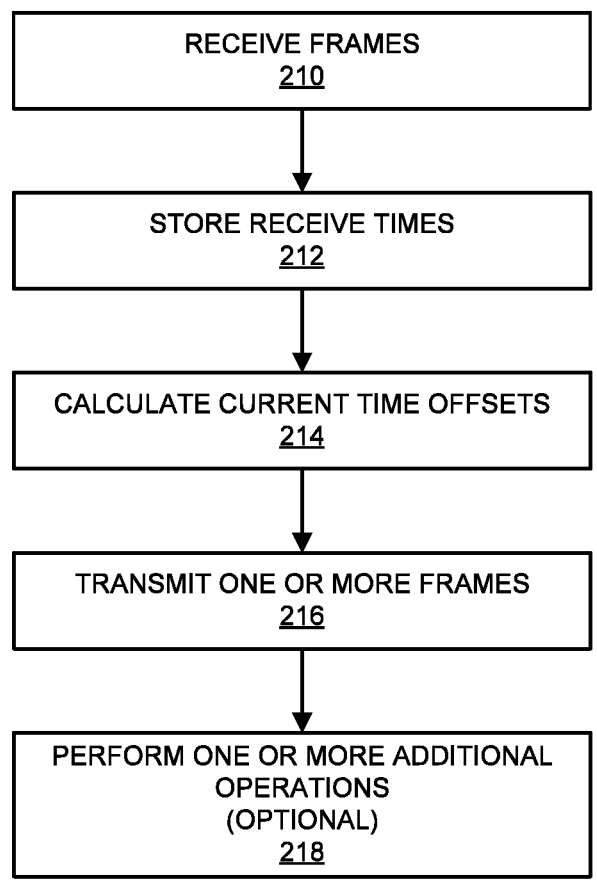
FIG. 2 is a flow diagram illustrating a method for coordinating playback of audio content in accordance with an embodiment of the present disclosure.

We now describe embodiments of the communication technique. FIG. 2 presents a flow diagram illustrating a method 200 for coordinating playback of audio content, which may be performed by an A/V hub, such as A/V hub 112 (FIG. 1). During operation, the A/V hub (such as a control circuit or control logic, e.g., a processor executing a program module, in the A/V hub) may receive, via wireless communication, frames (operation 210) or packets from one or more electronic devices, where a given frame or packet includes a transmit time when a given electronic device transmitted the given frame or packet.

Then, the A/V hub may store receive times (operation 212) when the frames or packets were received, where the receive times are based on a clock in the A/V hub. For example, a receive time may be may be added to an instance of a packet or a frame or packet received from one of the electronic devices by a physical layer and/or a media access control (MAC) layer in or associated with an interface circuit in the A/V hub. Note that the receive time may be associated with the leading edge or the trailing edge of the packet or frame or packet, such as with a receive time signal which is associated with the leading edge or with a receive clear signal which is associated with the trailing edge. Similarly, the transmit time may be added to an instance of a frame or a packet transmitted by one of the electronic devices by a physical layer and/or a MAC layer in or associated with an interface circuit in the electronic device. In some embodiments, the transmit and receive times are determined and added to the frames or packets by wireless-ranging capability in a physical layer and/or a MAC layer in or associated with the interface circuits.

Moreover, the A/V hub may calculate current time offsets (operation 214) between clocks in the electronic devices and the clock in the A/V hub based on the receive times and transmit times of the frames or packets. Furthermore, the current time offsets may be calculated by the A/V hub based on models of clock drift in the electronic devices, such as an electrical circuit model of a clock circuit and/or a look-up table of clock drift as a function of time. Note that the electronic devices may be located at non-zero distances from the A/V hub, and the current time offsets may be calculated based on the transmit times and the receive times using wireless ranging by ignoring the distances.

Next, the A/V hub may transmit one or more frames (operation 216) or packets that include audio content and playback timing information to the electronic devices, where the playback timing information specifies playback times when the electronic devices are to playback the audio content based on the current time offsets. Furthermore, the playback times of the electronic devices may have a temporal relationship so that the playback of the audio content by the electronic devices is coordinated. Note that the temporal relationship may have a non-zero value, so that at least some of the electronic devices are instructed to playback the audio content with a phase relative to each other by using different values of the playback times. For example, the different playback times may be based on predetermined or dynamically determined acoustic characteristics of an environment that includes the electronic devices and the A/V hub. Alternatively or additionally, the different playback times may be based on a desired acoustic characteristic in the environment.

In some embodiments, the A/V hub optionally performs one or more additional operations (operation 218). For example, the electronic devices may be located at vector distances from the A/V hub, and the interface circuit may determine magnitudes of the vector distances based on the transmit times and the receive times using wireless ranging. Moreover, the interface circuit may determine angles of the vector distances based on the angle of arrival of wireless signals associated with the frames or packets that are received by the one or more antennas during the wireless communication. Furthermore, the different playback times may be based on the determined vector distances. For example, the playback times may correspond to the determined vector distances such that the sound associated with the audio content from different electronic devices at different locations in the environment may arrive at a location in the environment (e.g., a location of the A/V hub, in the middle of the environment, at a preferred listening location of a user, etc.) with a desired phase relationship or to achieve a desired acoustic characteristic at the location.

Alternatively or additionally, the different playback times are based on an estimated location of a listener relative to the electronic devices, such that the sound associated with the audio content from different electronic devices at different locations in the environment may arrive at the estimated location of the listener with a desired phase relationship or to achieve a desired acoustic characteristic at the estimated location. Techniques that can be used to determine the location of the listener are described further below with reference to FIGS. 14-16.

Note that while the wireless ranging capability in the interface circuits may involve coordinated clocks in the A/V hub and the electronic devices, in other embodiments the clocks are not coordinated. Thus, a variety of radiolocation techniques may be used. In some embodiments, the wireless-ranging capability includes the use of transmissions over GHz or multi-GHz bandwidths to create pulses of short duration (such as, e.g., approximately 1 ns).

Figure 3:
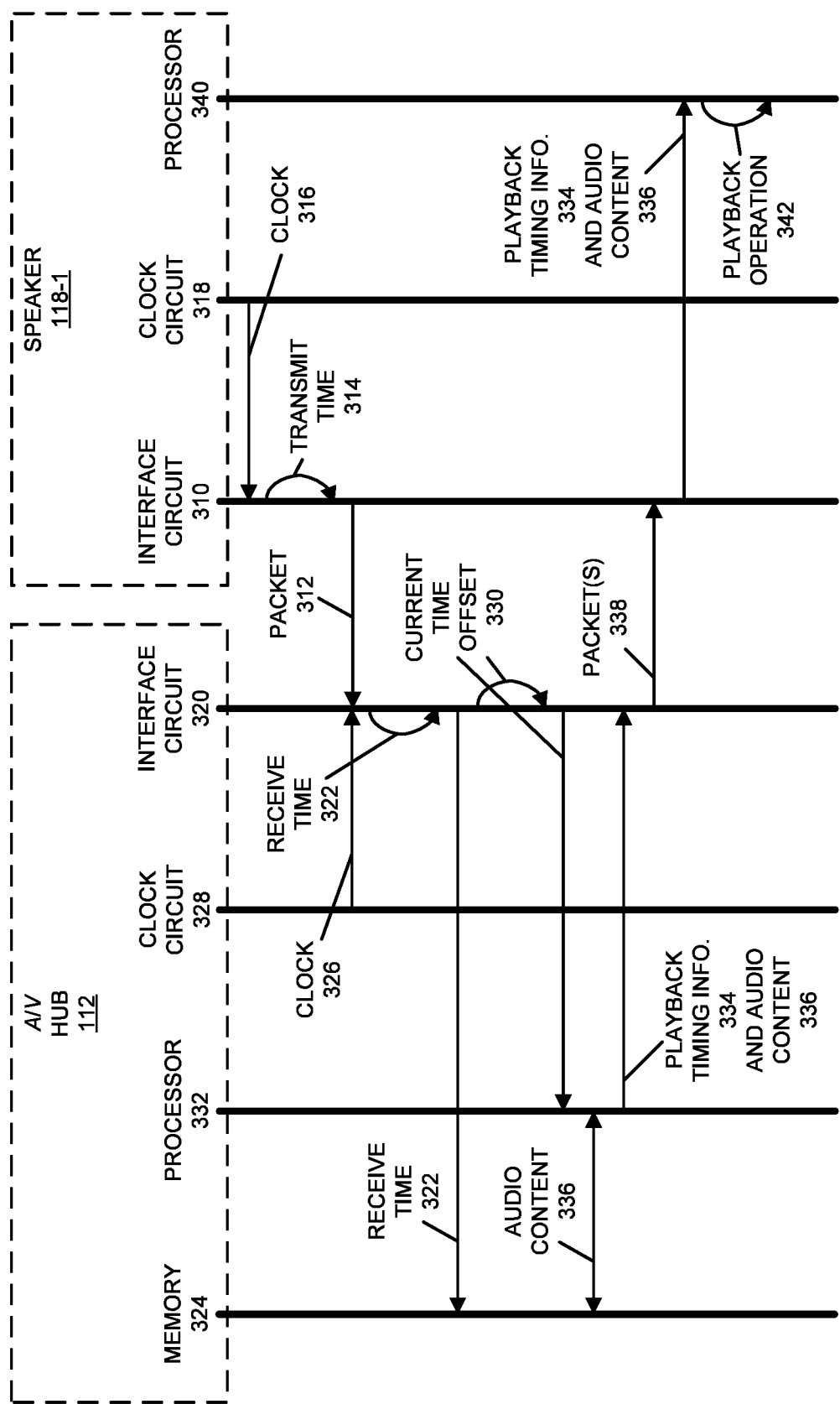
FIG. 3 is a drawing illustrating communication among the electronic devices in FIG. 1 in accordance with an embodiment of the present disclosure.

FIG. 3 is a drawing illustrating between A/V hub 112, and speaker 118-1. In particular, interface circuit 310 in speaker 118-1 may transmit one or more frames or packets (such as packet 312) to A/V hub 112. Packet 312 may include corresponding transmit time 314, based on an interface clock 316 provided by an interface clock circuit 318 in or associated with an interface circuit 310 in speaker 118-1, when speaker 118-1 transmitted packets 312. When an interface circuit 320 in A/V hub 112 receives packet 312, it may include receive time 322 in packet 312 (or it may store receive time 322 in memory 324), where for each packet the corresponding receive time may be based on an interface clock 326 provided by an interface clock circuit 328 in or associated with interface circuit 318.

Then, interface circuit 320 may calculate, based on differences between transmit times 314 and receive times 322, a current time offset 330 between interface clock 316 and interface clock 326. Moreover, interface circuit 320 may provide current time offset 330 to processor 332. (Alternatively, processor 332 may calculate the current time offset 330.)

Furthermore, processor 332 may provide playback timing information 334 and audio content 336 to interface circuit 320, where the playback timing information 334 specifies a playback time when speaker 118-1 is to playback audio content 336 based on the current time offset 330. In response, interface circuit 330 may transmit one or more frames or packets 338 that includes the playback timing information 334 and audio content 336 to speaker 118-1. (However, in some embodiments, playback timing information 334 and audio content 336 are transmitted using separate or different frames or packets.)

After interface circuit 310 receives the one or more frames or packets 338, it may provide the playback timing information 334 and audio content 336 to processor 340. Processor 340 may execute software that performs a playback operation 342. For example, processor 340 may store audio content 336 in a queue in memory. In these embodiments, playback operation 350 includes outputting audio content 336 from the queue, including driving an electrical-to-acoustic transducer in speaker 118-1 based on audio content 336 so speaker 118-1 outputs sound at a time specified by the playback timing information 334.

Figure 4:
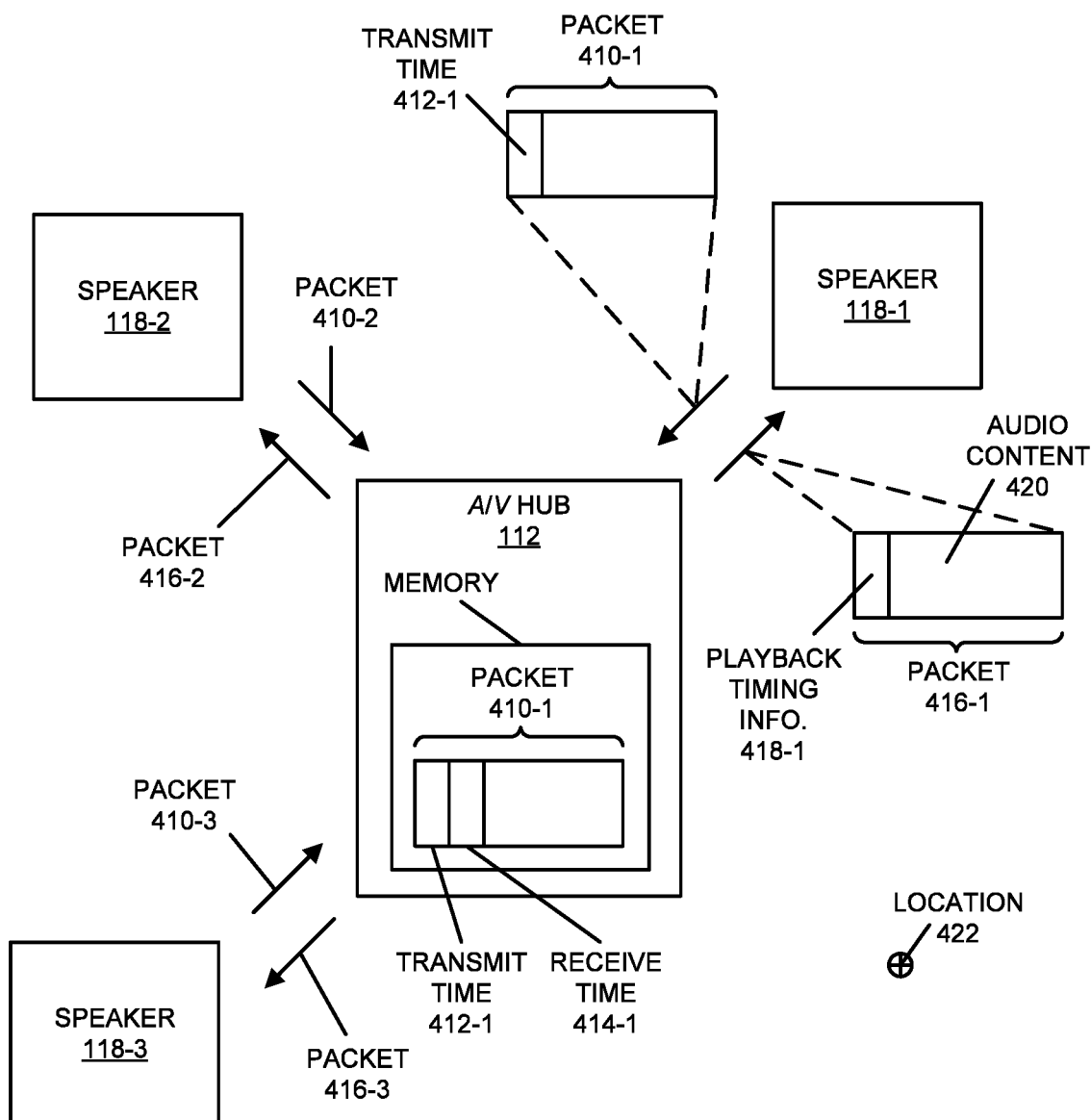
FIG. 4 is a drawing illustrating coordinating playback of audio content by the electronic devices in FIG. 1 in accordance with an embodiment of the present disclosure.

In an exemplary embodiment, the communication technique is used to coordinate the playback of audio content by speakers 118. This is illustrated in FIG. 4, which presents a drawing illustrating coordinating playback of audio content by speakers 118. In particular, when frames or packets (such as packet 410-1) are transmitted by speakers 118 they may include information specifying transmit times (such as transmit time 412-1). For example, the physical layer in the interface circuits in speakers 118 may include the transmit times in packets 410. In FIG. 4 and the other embodiments below, note that information in frames or packets may be included at an arbitrary position (such the beginning, the middle and/or the end).

When packets 410 are received by A/V hub 112, additional information specifying receive times (such as receive time 414-1 of packet 410-1) may be included in packets 410. For example, the physical layer in the interface circuit in A/V hub 112 may include the receive times in packets 410.

Moreover, the transmit times and the receive times may be used to track the drift of clocks in A/V hub 112 and speakers 118.

Using the transmit times and receive times, A/V hub 112 may calculate current time offsets between the clocks in speakers 118 and the clock in A/V hub 112. Furthermore, the current time offsets may be calculated by A/V hub 112 based on models in A/V hub 112 of the clock drift in speakers 118. For example, a model of the relative or absolute clock drift may include a polynomial or a cubic spline expression (and, more generally, a function) with parameters that specify or estimate the clock drift in a given speaker as a function of time based on historical time offsets.

Subsequently, A/V hub 112 may transmit one or more packets or frames or packets that include audio content 420 and playback timing information (such as playback timing information 418-1 in packet 416-1) to speakers 118, where the playback timing information specifies playback times when speakers 118 devices are to playback audio content 420 based on the current time offsets. The playback times of speakers 118 may have a temporal relationship so that the playback of audio content 420 by speakers 118 is coordinated, e.g., so that the associated sound or wavefronts arrive at a location 422 in an environment with a desired phase relationship.

Figure 5:
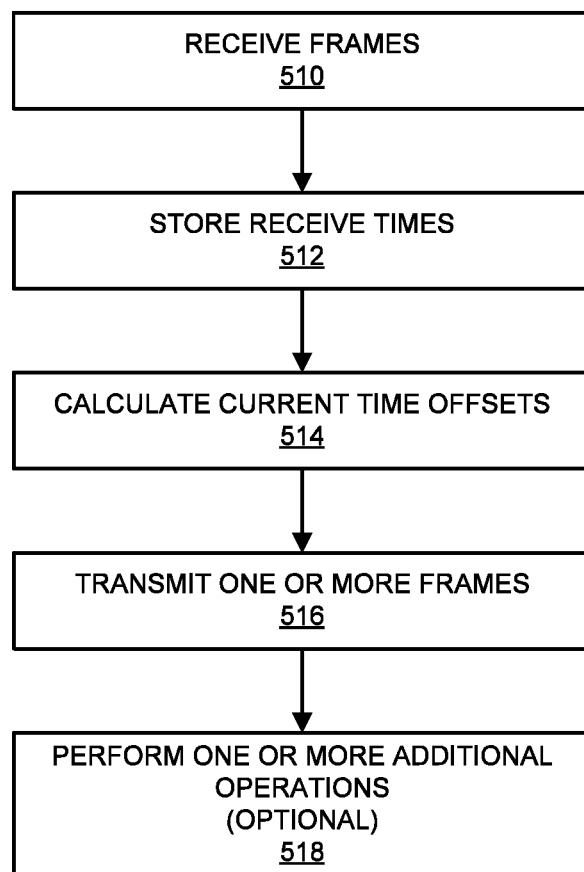
FIG. 5 is a flow diagram illustrating a method for coordinating playback of audio content in accordance with an embodiment of the present disclosure.

Another embodiment of the coordination in the communication technique is shown in FIG. 5, which presents a flow diagram illustrating a method 500 for coordinating playback of audio content. Note that method 500 may be performed by an A/V hub, such as A/V hub 112 (FIG. 1). During operation, the A/V hub (such as a control circuit or control logic, e.g., a processor executing a program module, in the A/V hub) may receive, via wireless communication, frames (operation 510) or packets from electronic devices.

Then, the A/V hub may store receive times (operation 512) when the frames or packets were received, where the receive times are based on a clock in the A/V hub. For example, a receive time may be may be added to an instance of a frame or a packet received from one of the electronic devices by a physical layer and/or a MAC layer in or associated with an interface circuit in the A/V hub. Note that the receive time may be associated with the leading edge or the trailing edge of the frame or a packet, such as with a receive time signal which is associated with the leading edge or with a receive clear signal which is associated with the trailing edge.

Moreover, the A/V hub may calculate current time offsets (operation 514) between clocks in the electronic devices and the clock in the A/V hub based on the receive times and expected transmit times of the frames or packets, where the expected transmit times are based on coordination of the clocks in the electronic devices and the clock in the A/V hub at a previous time and a predefined transmit schedule of the frames or packets (such as every 10 or 100 ms, which are nonlimiting examples). For example, during an initialization mode, time offsets between the clocks in the electronic devices and the clock in the A/V hub may be eliminated (i.e., coordination may be established). Note that the predefined transmit times in the transmit schedule may include or may be other than beacon transmit times in a WLAN. Subsequently, the clocks and the clock may have relative drift, which can be tracked based on differences between the receive times and expected transmit times of the frames or packets. In some embodiments, the current time offsets are calculated by the A/V hub based on models of clock drift in the electronic devices.

Next, the A/V hub may transmit one or more frames (operation 516) or packets that include audio content and playback timing information to the electronic devices, where the playback timing information specifies playback times when the electronic devices are to playback the audio content based on the current time offsets. Furthermore, the playback times of the electronic devices may have a temporal relationship so that the playback of the audio content by the electronic devices is coordinated. Note that the temporal relationship may have a non-zero value, so that at least some of the electronic devices are instructed to playback the audio content with a phase relative to each other by using different values of the playback times. For example, the different playback times may be based on predetermined or dynamically determined acoustic characteristics of an environment that includes the electronic devices and the A/V hub. Alternatively or additionally, the different playback times may be based on a desired acoustic characteristic in the environment.

In some embodiments, the A/V hub optionally performs one or more additional operations (operation 518). For example, the electronic devices may be located at vector distances from the A/V hub, and the interface circuit may determine magnitudes of the vector distances based on the transmit times and the receive times using wireless ranging. Moreover, the interface circuit may determine angles of the vector distances based on the angle of arrival of wireless signals associated with the frames or packets that are received by the one or more antennas during the wireless communication. Furthermore, the different playback times may be based on the determined vector distances. For example, the playback times may correspond to the determined vector distances such that the sound associated with the audio content from different electronic devices at different locations in the environment may arrive at a location in the environment (e.g., a location of the A/V hub, in the middle of the environment, at a preferred listening location of a user, etc.) with a desired phase relationship or to achieve a desired acoustic characteristic at the location.

Alternatively or additionally, the different playback times are based on an estimated location of a listener relative to the electronic devices, such that the sound associated with the audio content from different electronic devices at different locations in the environment may arrive at the estimated location of the listener with a desired phase relationship or to achieve a desired acoustic characteristic at the estimated location. Techniques that can be used to determine the location of the listener are described further below with reference to FIGS. 14-16.

Figure 6:
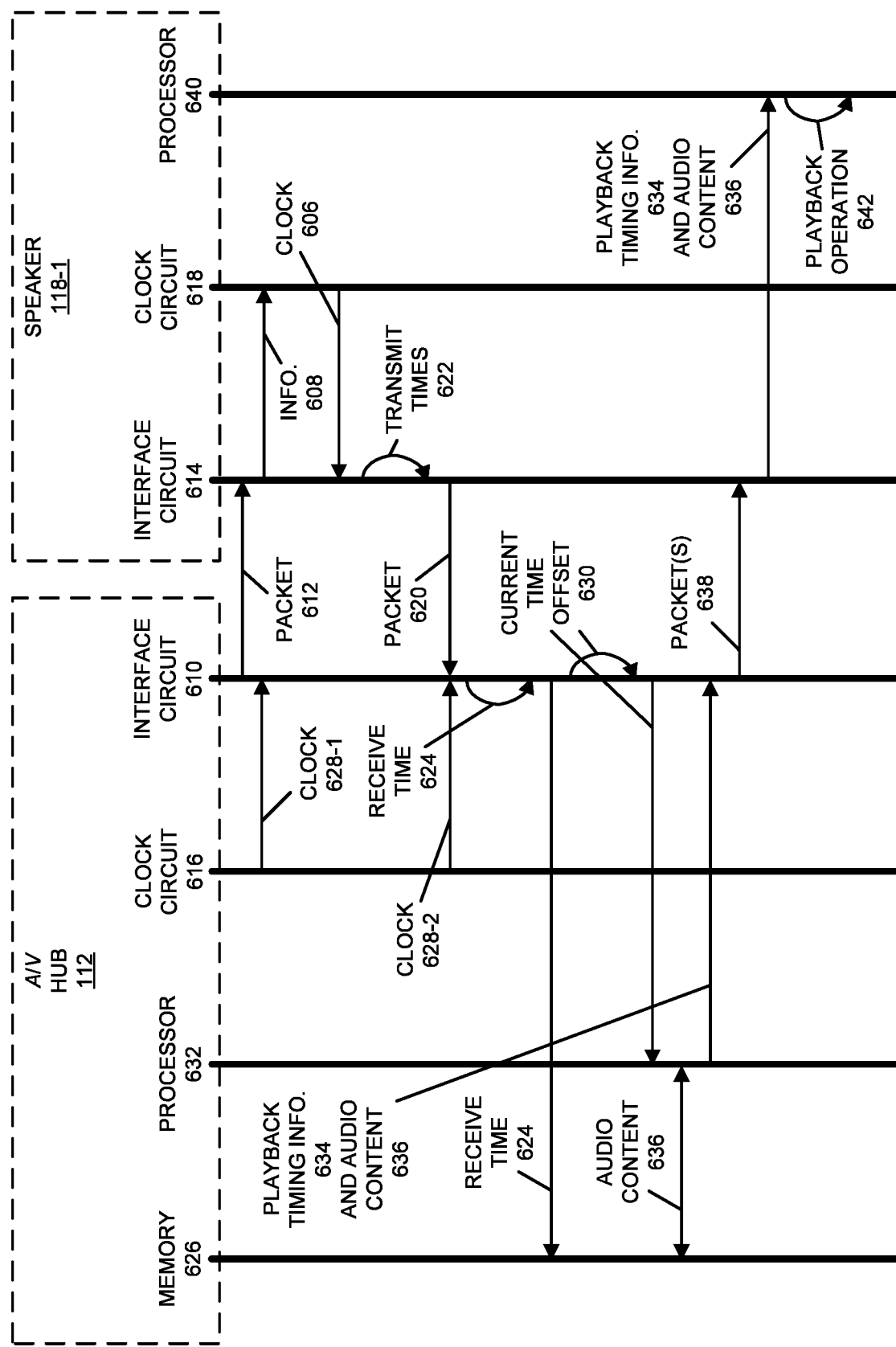
FIG. 6 is a drawing illustrating communication among the electronic devices in FIG. 1 in accordance with an embodiment of the present disclosure.
Figure 7:
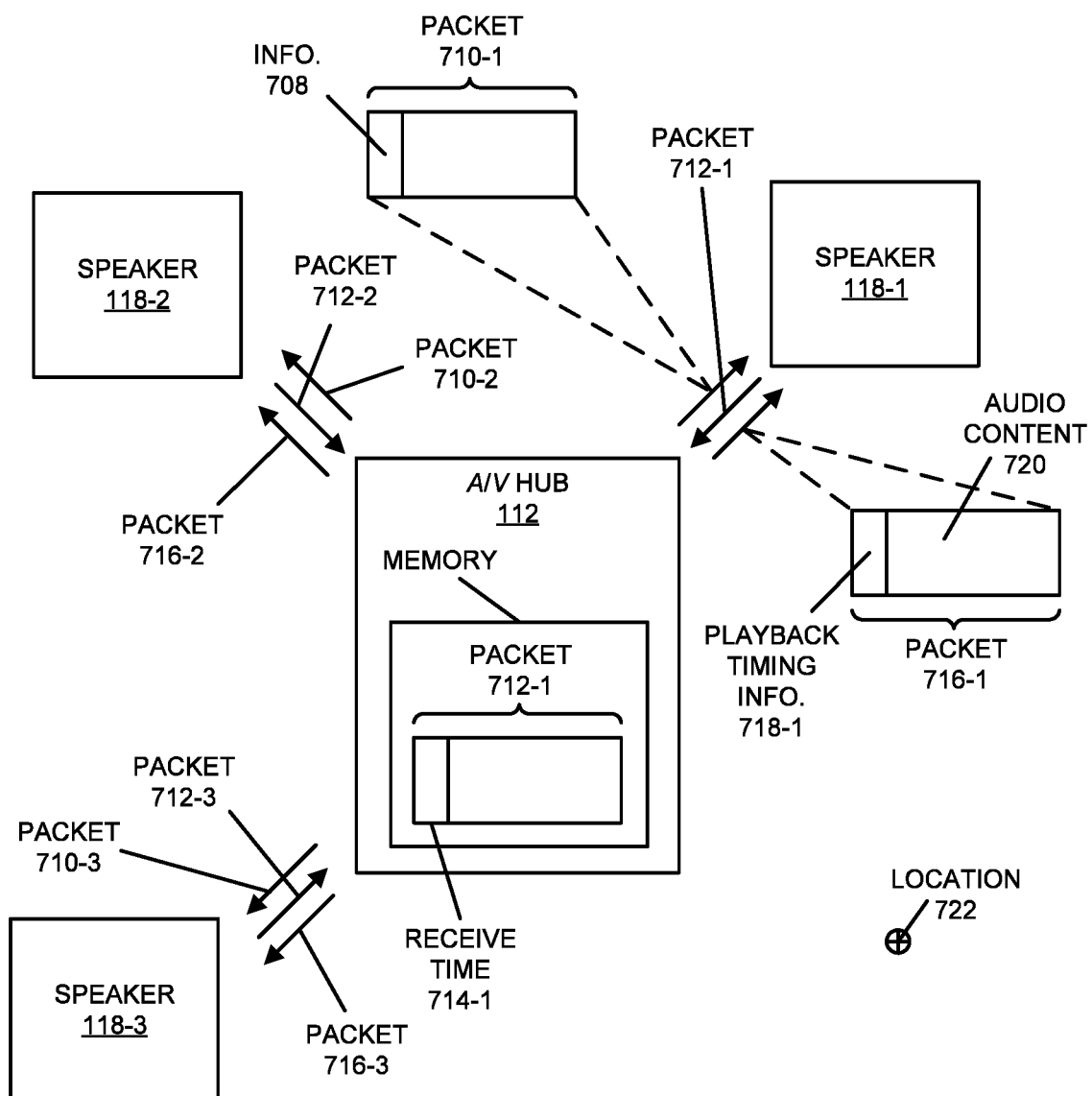
FIG. 7 is a drawing illustrating coordinating playback of audio content by the electronic devices in FIG. 1 in accordance with an embodiment of the present disclosure.

FIG. 6 is a drawing illustrating communication among portable electronic device 110, A/V hub 112, and speaker 118-1. In particular, during an initialization mode, interface circuit 610 in A/V hub 112 may transmit a frame or packet 612 to interface circuit 614 in speaker 118-1. This packet may include information 608 that coordinates clocks 628 and 606 provided, respectively, by interface clock circuits 616 and 618. For example, the information may eliminate a time offset between interface clock circuits 616 and 618 and/or may set interface clock circuits 616 and 618 to the same clock frequency.

Subsequently, interface circuit 614 may transmit one or more frames or packets (such as packet 620) to A/V hub 112 at predefined transmit times 622.

When an interface circuit 610 in A/V hub 112 receives packet 620, it may include receive time 624 in packet 620 (or it may store receive time 624 in memory 626), where for each packet the corresponding receive time may be based on interface clock 628 provided by an interface clock circuit 616 in or associated with interface circuit 610.

Then, interface circuit 610 may calculate, based on differences between transmit times 622 and receive times 624, a current time offset 630 between interface clock 628 and interface clock 606. Moreover, interface circuit 610 may provide current time offset 630 to processor 632. (Alternatively, processor 632 may calculate the current time offset 630.)

Furthermore, processor 632 may provide playback timing information 634 and audio content 636 to interface circuit 610, where the playback timing information 634 specifies a playback time when speaker 118-1 is to playback audio content 636 based on the current time offset 630. In response, interface circuit 610 may transmit one or more frames or packets 638 that includes the playback timing information 634 and audio content 636 to speaker 118-1. (However, in some embodiments, playback timing information 634 and audio content 636 are transmitted using separate or different frames or packets.)

After interface circuit 614 receives the one or more frames or packets 638, it may provide the playback timing information 634 and audio content 636 to processor 640. Processor 640 may execute software that performs a playback operation 642. For example, processor 640 may store audio content 636 in a queue in memory. In these embodiments, playback operation 650 includes outputting audio content 636 from the queue, including driving an electrical-to-acoustic transducer in speaker 118-1 based on audio content 636 so speaker 118-1 outputs sound at a time specified by the playback timing information 634.

In an exemplary embodiment, the communication technique is used to coordinate the playback of audio content by speakers 118. This is illustrated in FIG. 7, which presents a drawing illustrating coordinating playback of audio content by speakers 118. In particular, A/V hub 112 may transmit frames or packets 710 to speakers 118 with information (such as information 708 in packet 710-1) that coordinates clocks, provided by clock circuits, in A/V hub 112 and speakers 118.

Subsequently, speakers 118 may transmit frames or packets 712 to A/V hub 112 at predefined transmit times. When these frames or packets are received by A/V hub 112, information specifying receive times may be included in packets 712 (such as receive time 714-1 in packet 712-1). The predefined transmit times and the receive times may be used to track the drift of the clocks in A/V hub 112 and speakers 118.

Using the predefined transmit times and the receive times, A/V hub 112 may calculate current time offsets between the clocks in speakers 118 and the clock in A/V hub 112. Furthermore, the current time offsets may be calculated by A/V hub 112 based on models in A/V hub 112 of the clock drift in speakers 118. For example, a model of the relative or absolute clock drift may include a polynomial or a cubic spline expression (and, more generally, a function) with parameters that specify or estimate the clock drift in a given speaker as a function of time based on historical time offsets.

Subsequently, A/V hub 112 may transmit one or more frames or packets that include audio content 720 and playback timing information (such as playback timing information 718-1 in packet 716-1) to speakers 118, where the playback timing information specifies playback times when speakers 118 devices are to playback audio content 720 based on the current time offsets. The playback times of speakers 118 may have a temporal relationship so that the playback of audio content 720 by speakers 118 is coordinated, e.g., so that the associated sound or wavefronts arrive at a location 722 in an environment with a desired phase relationship.

Figure 8:
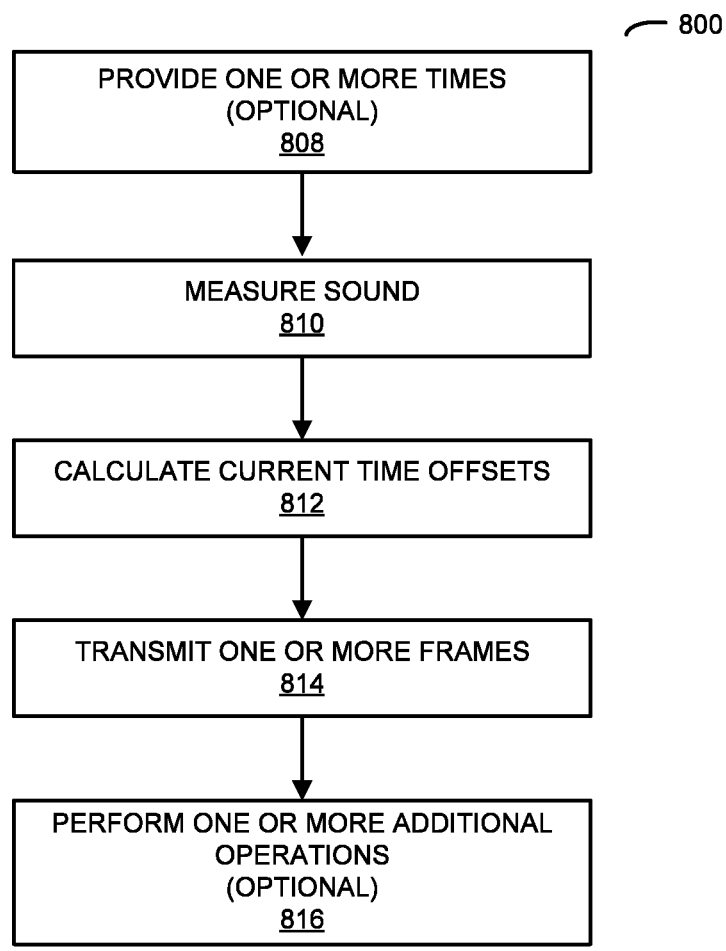
FIG. 8 is a flow diagram illustrating a method for coordinating playback of audio content in accordance with an embodiment of the present disclosure.

Another embodiment of the coordination in the communication technique is shown in FIG. 8, which presents a flow diagram illustrating a method 800 for coordinating playback of audio content. Note that method 800 may be performed by an A/V hub, such as A/V hub 112 (FIG. 1). During operation, the A/V hub (such as a control circuit or control logic, e.g., a processor executing a program module, in the A/V hub) may measure sound (operation 810) output by electronic devices in an environment that includes the A/V hub using one or more acoustic transducers in the A/V hub, where the sound corresponds to one or more acoustic-characterization patterns. For example, the measured sound may include the sound pressure. Note that the acoustic-characterization patterns may include pulses. Moreover, the sound may be in a range of frequencies outside of human hearing, such as ultrasound.

Furthermore, a given electronic device may output the sound at a different time in the one or more times than those used by a remainder of the electronic devices, so that the sound from the given electronic device can be identified or distinguished from the sound output by the remainder of the electronic devices. Alternatively or additionally, the sound output by a given electronic device may correspond to a given acoustic-characterization pattern, which may be different from those used by the remainder of the electronic devices. Thus, the acoustic-characterization patterns may uniquely identify the electronic devices.

Then, the A/V hub may calculate current time offsets (operation 812) between clocks in the electronic devices and a clock in the A/V hub based on the measured sound, one or more times when the electronic devices output the sound and the one or more acoustic-characterization patterns. For example, the A/V hub may correct the measured sound based on an acoustic characteristic of the environment, such as an acoustic delay associated with at least a particular frequency or a predetermined (or dynamically determined) acoustic transfer function of the environment in at least a band of frequencies (such as 100-20,000 Hz, which is a nonlimiting example), and the output times may be compared to triggered output times or predefined output times. This may allow the A/V hub to determine the original output sound without the spectral filtering or distortions associated with the environment, which may allow the A/V hub to more accurately determine the current time offsets.

Note that the measured sound may include information that specifies the one or more times when the electronic devices output the sound (e.g., the pulses in the acoustic-characterization patterns may specify the times), and the one or more times may correspond to the clocks in the electronic devices. Alternatively or additionally, the A/V hub may optionally provide to the electronic devices, via the wireless communication, one or more times (operation 808) when the electronic devices are to output the sound, and the one or more times may correspond to the clock in the A/V hub. For example, the A/V hub may transmit one or more frames or packets to the electronic devices with the one or more times. Thus, the A/V hub may trigger the output of the sound or the sound may be output at predefined output times.

Next, the A/V hub may transmit, using wireless communication, one or more frames (operation 814) or packets that include audio content and playback timing information to the electronic devices, where the playback timing information specifies playback times when the electronic devices are to playback the audio content based on the current time offsets. Moreover, the playback times of the electronic devices have a temporal relationship so that the playback of the audio content by the electronic devices is coordinated. Note that the temporal relationship may have a non-zero value, so that at least some of the electronic devices are instructed to playback the audio content with a phase relative to each other by using different values of the playback times. For example, the different playback times may be based on predetermined or dynamically determined acoustic characteristics of an environment that includes the electronic devices and the A/V hub. Alternatively or additionally, the different playback times may be based on a desired acoustic characteristic in the environment and/or an estimated location of a listener relative to the electronic devices.

In some embodiments, the A/V hub optionally performs one or more additional operations (operation 816). For example, the A/V hub may modify the measured sound based on an acoustic transfer function of the environment in at least a band of frequencies that includes the spectral content in acoustic-characterization patterns. Note that the acoustic transfer function may be predetermined and accessed by the A/V hub or dynamically determined by the A/V hub. This correction for the filtering associated with the environment may be necessary because, while the time delay and dispersion associated with the propagation of sound in the environment may be much larger than the desired coordination of the clocks in the electronic devices and the clock in the A/V hub, the leading edge of the modified direct sound may be determined with sufficient accuracy that the current time offset between the clocks in the electronic devices and the clock in the A/V hub can be determined. For example, the desired coordination accuracy of speakers 118 may be as small as on the order of a microsecond, while the propagation delay of sound in a typical room (e.g., over distances of at most 10-30 m) may be five orders of magnitude larger. Nonetheless, the modified measured sound may allow the leading edges of the direct sound associated with pulses in the sound output from a given electronic device to be measured with as little as microsecond accuracy, which can facilitate coordination of the clocks in the electronic devices and the clock in the A/V hub. In some embodiments, the A/V hub determines the temperature in the environment, and the calculations of the current time offset may be corrected for changes in the temperature (which impact the speed of sound in the environment).

Figure 9:
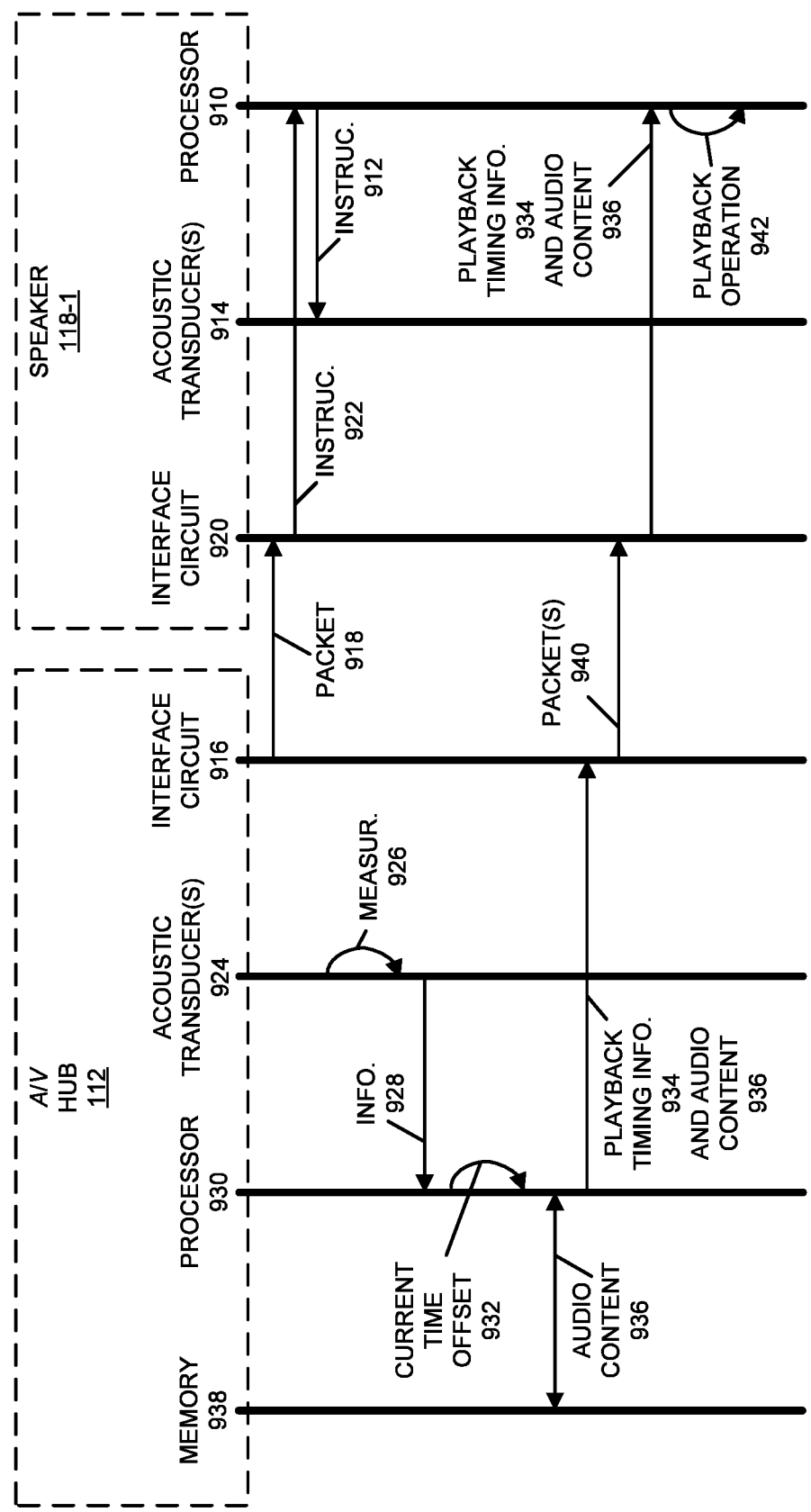
FIG. 9 is a drawing illustrating communication among the electronic devices in FIG. 1 in accordance with an embodiment of the present disclosure.
Figure 10:
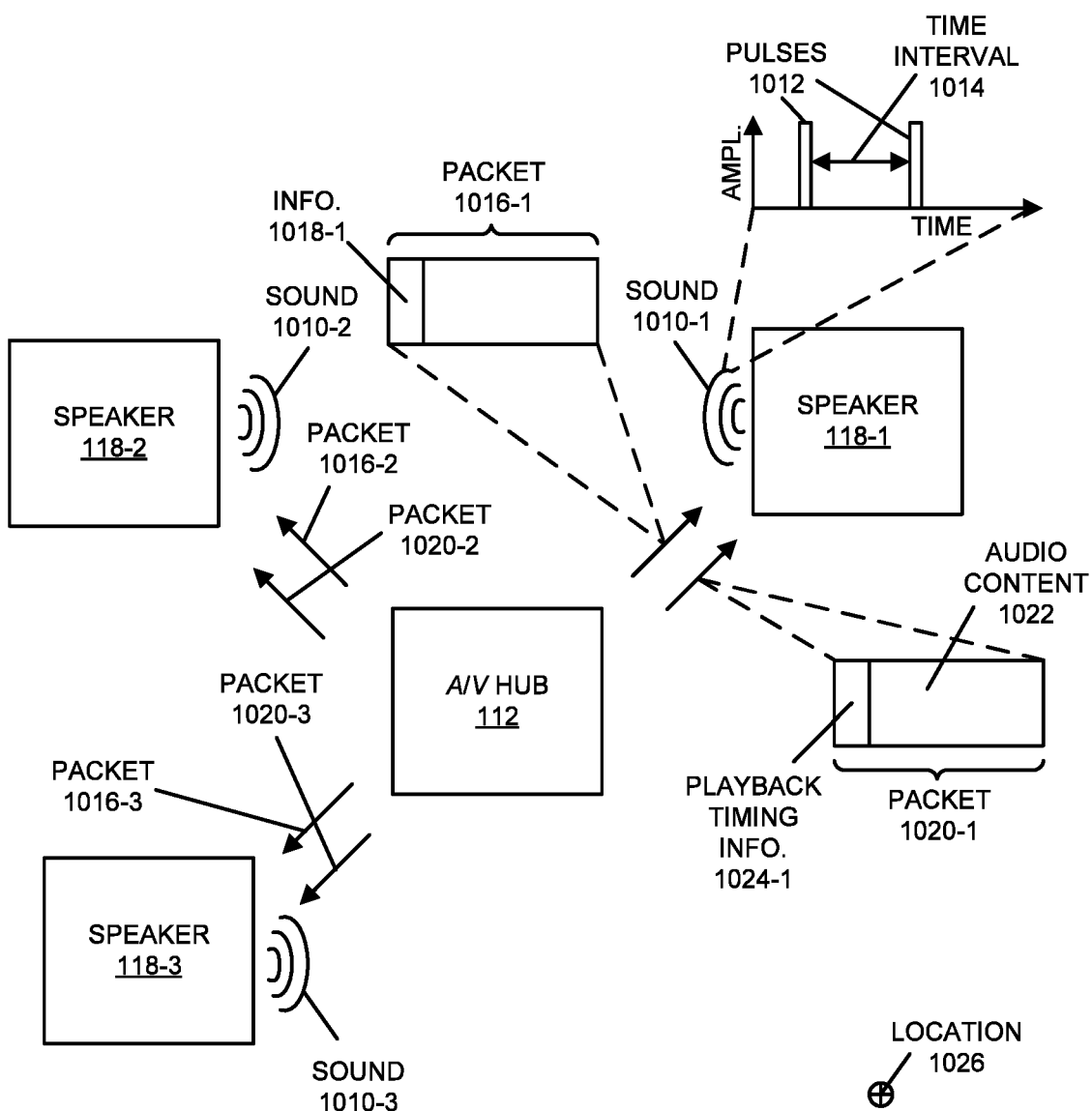
FIG. 10 is a drawing illustrating coordinating playback of audio content by the electronic devices in FIG. 1 in accordance with an embodiment of the present disclosure.

FIG. 9 is a drawing illustrating communication among portable electronic device 110, A/V hub 112, and speaker 118-1. In particular, processor 910 in speaker 118-1 may instruct 912 one or more acoustic transducers 914 in speaker 118-1 to output sound at an output time, where the sound corresponds to an acoustic-characterization pattern. For example, the output time may be predefined (such as based on a pattern or sequence of pulses in the acoustic-characterization pattern, a predefined output schedule with scheduled output times or a predefined output interval between output times) and thus may be known to A/V hub 112 and the speaker 118-1. Alternatively, interface circuit 916 in A/V hub 112 may provide a trigger frame or packet 918. After interface circuit 920 receives trigger packet 918, it may forward an instruction 922 to processor 910 in speaker 118-1, which triggers the sound output from the one or more acoustic transducers 914 based on instruction 922.

Subsequently, the one or more acoustic transducers 924 in A/V hub 112 may measure 926 the sound, and may provide information 928 that specifies the measurements to processor 930 in A/V hub 112.

Next, processor 930 may calculate a current time offset 932 between a clock from a clock circuit in speaker 118-1 (such as an interface clock circuit) and a clock from a clock circuit (such as an interface clock circuit) in A/V hub 112 based on the information 928, one or more times when speaker 118-1 output the sound and an acoustic-characterization pattern associated with speaker 118-1. For example, processor 930 may determine the current time offset 932 based on at least two times in the acoustic-characterization pattern when the one or more acoustic transducers 914 in speaker 118-1 output sound corresponding to the acoustic-characterization pattern.

Moreover, processor 930 may provide playback timing information 934 and audio content 936 to interface circuit 916, where the playback timing information 934 specifies a playback time when speaker 118-1 is to playback audio content 936 based on the current time offset 932. Note that processor 930 may access audio content 936 in memory 938. In response, interface circuit 916 may transmit one or more frames or packets 940 that includes the playback timing information 934 and audio content 936 to speaker 118-1. (However, in some embodiments, playback timing information 934 and audio content 936 are transmitted using separate or different frames or packets.)

After interface circuit 920 receives the one or more frames or packets 940, it may provide the playback timing information 934 and audio content 936 to processor 924. Processor 924 may execute software that performs a playback operation 942. For example, processor 924 may store audio content 936 in a queue in memory. In these embodiments, playback operation 942 includes outputting audio content 936 from the queue, including driving one or more of acoustic transducers 914 based on audio content 936 so speaker 118-1 outputs sound at a time specified by the playback timing information 934.

In an exemplary embodiment, the communication technique is used to coordinate the playback of audio content by speakers 118. This is illustrated in FIG. 10, which presents a drawing illustrating coordinating playback of audio content by speakers 118. In particular, speakers 118 may output sound 1010 corresponding to acoustic-characterization patterns. For example, an acoustic-characterization pattern associated with speaker 118-1 may include two or more pulses 1012, where a time interval 1014 between pulses 1012 may correspond to a clock provided by a clock circuit in speaker 118-1. In some embodiments, a pattern or sequence of pulses in the acoustic-characterization patterns may also uniquely identify speakers 118. While pulses 1012 are used to illustrated the acoustic-characterization patterns in FIG. 10, in other embodiments a variety of temporal, frequency and/or modulation techniques may be used, including: amplitude modulation, frequency modulation, phase modulation, etc. Note that A/V hub 112 may optional trigger the output of sound 1010 by transmitting one or more frames or packets 1016 with information 1018 specifying times to speakers 118 when speakers 118 are to output sound 1010 corresponding to the acoustic-characterization patterns.

Then, A/V hub 112 may measure sound 1010 output by the electronic devices using one or more acoustic transducers, where the sound corresponds to one or more of the acoustic-characterization patterns. After measuring sound 1010, A/V hub 112 may calculate current time offsets between clocks in speakers 118 and a clock in A/V hub 112 based on the measured sound 1010, one or more times when the speakers 118 output the sound and the one or more acoustic-characterization patterns. In some embodiments, the current time offsets may be calculated by A/V hub 112 based on models in A/V hub 112 of clock drift in speakers 118. For example, a model of the relative or absolute clock drift may include a polynomial or a cubic spline expression (and, more generally, a function) with parameters that specify or estimate the clock drift in a given speaker as a function of time based on historical time offsets.

Next, A/V hub 112 may transmit one or more frames or packets that include audio content 1022 and playback timing information to speakers 118 (such as playback timing information 1024-1 in packet 1020-1), where the playback timing information specifies playback times when speakers 118 devices are to playback audio content 1022 based on the current time offsets. The playback times of speakers 118 may have a temporal relationship so that the playback of audio content 1022 by speakers 118 is coordinated, e.g., so that the associated sound or wavefronts arrive at a location 1026 in an environment with a desired phase relationship.

Figure 11:
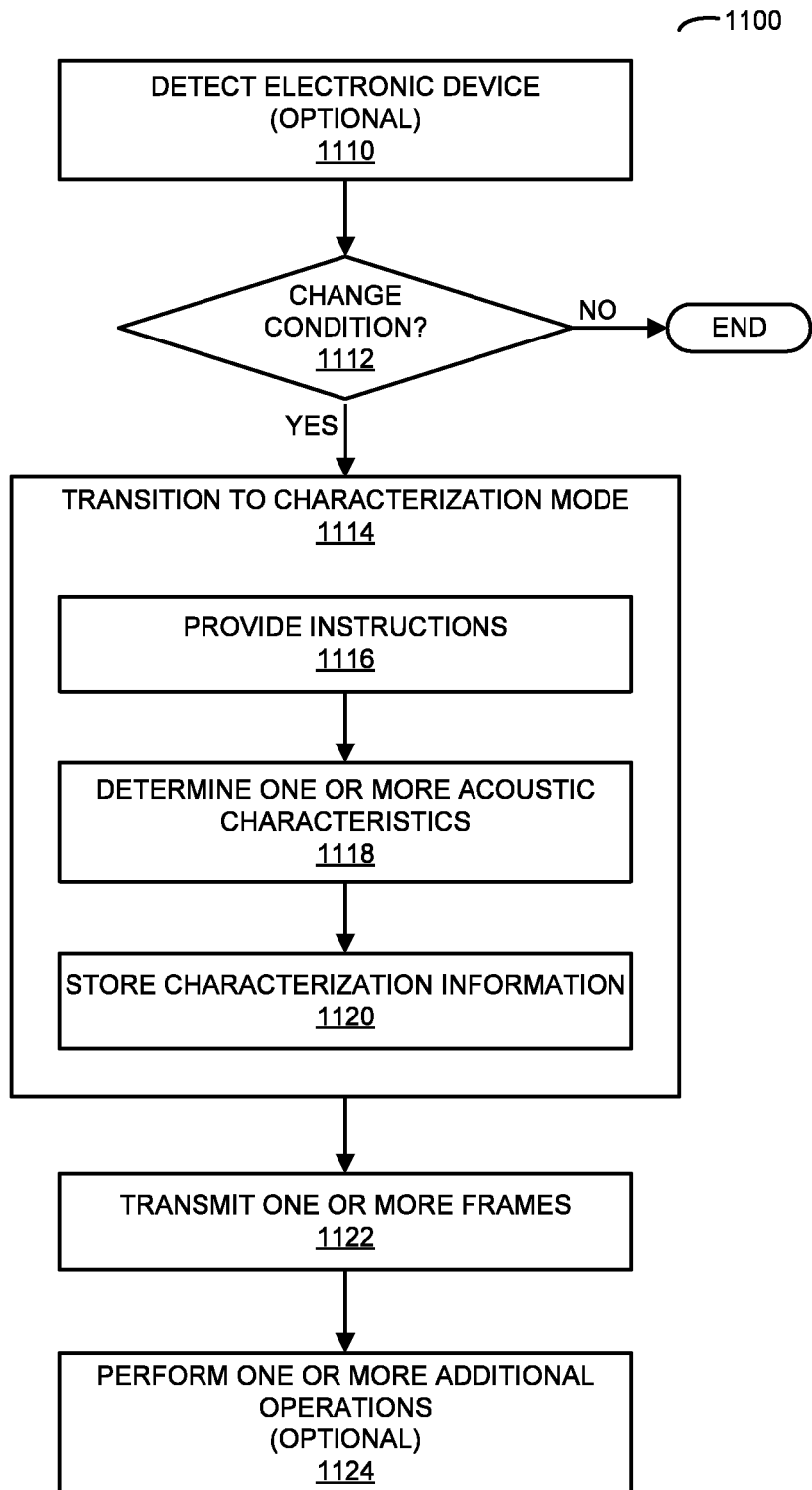
FIG. 11 is a flow diagram illustrating a method for selectively determining one or more acoustic characteristics of an environment in accordance with an embodiment of the present disclosure.

The communication technique may include operations that are used to adapt the coordination to improve the acoustic experience of listeners. One approach is shown in FIG. 11, which presents a flow diagram illustrating a method 1100 for selectively determining one or more acoustic characteristics of an environment (such as a room). Method 1100 may be performed by an A/V hub, such as A/V hub 112 (FIG. 1). During operation, the A/V hub (such as a control circuit or control logic, e.g., a processor executing a program module, in the A/V hub) may optionally detect, using wireless communication, an electronic device (operation 1110) in an environment. Alternatively or additionally, the A/V hub may determine a change condition (operation 1112), where the change condition includes: that the electronic device was not previously detected in the environment; and/or a change in a location of the electronic device (including a change in the location that occurs long after the electronic device was first detected in the environment).

When the change condition is determined (operation 1112), the A/V hub may transition into a characterization mode (operation 1114). During the characterization mode, the A/V hub may: provide instructions (operation 1116) to the electronic device to playback audio content at a specified playback time; determine one or more acoustic characteristics (operation 1118) of the environment based on acoustic measurements in the environment; and store the characterization information (operation 1120) in memory, where the characterization information includes the one or more acoustic characteristics.

Moreover, the A/V hub may transmit one or more frames (operation 1122) or packets that include additional audio content and playback timing information to the electronic device, where the playback timing information may specify a playback time when the electronic device is to playback the additional audio content based on the one or more acoustic characteristics.

In some embodiments, the A/V hub optionally performs one or more additional operations (operation 1124). For example, the A/V hub may calculate the location of the electronic device in the environment, such as based on wireless communication. Moreover, the characterization information may include an identifier of the electronic device, which may be received from the electronic device by the A/V hub using wireless communication.

Furthermore, the A/V hub may determine the one or more acoustic characteristics based, at least in part, on acoustic measurements performed by other electronic devices. Thus, the A/V hub may communicate with the other electronic devices in the environment using the wireless communication, and may receive the acoustic measurements from the other electronic devices. In these embodiments, the one or more acoustic characteristics may be determined based on locations of the other electronic devices in the environment. Note that the A/V hub may: receive the locations of the other electronic devices from the other electronic devices; access predetermined locations of the other electronic devices stored in memory; and determine the locations of the other electronic devices, e.g., based on the wireless communication.

In some embodiments, the A/V hub includes one or more acoustic transducers, and the A/V hub performs the acoustic measurements using the one or more acoustic transducers. Therefore, the one or more acoustic characteristics may be determined by the A/V hub alone or in conjunction with the acoustic measurements performed by the other electronic devices.

However, in some embodiments, instead of determining the one or more acoustic characteristics, the A/V hub receives the determined one or more acoustic characteristics from one of the other electronic devices.

While the acoustic characterization may be fully automated based on the change condition, in some embodiments a user may manually initiate the characterization mode or may manually approve the characterization mode when the change condition is detected. For example, the A/V hub may: receive a user input; and transition into the characterization mode based on the user input.

Figure 12:
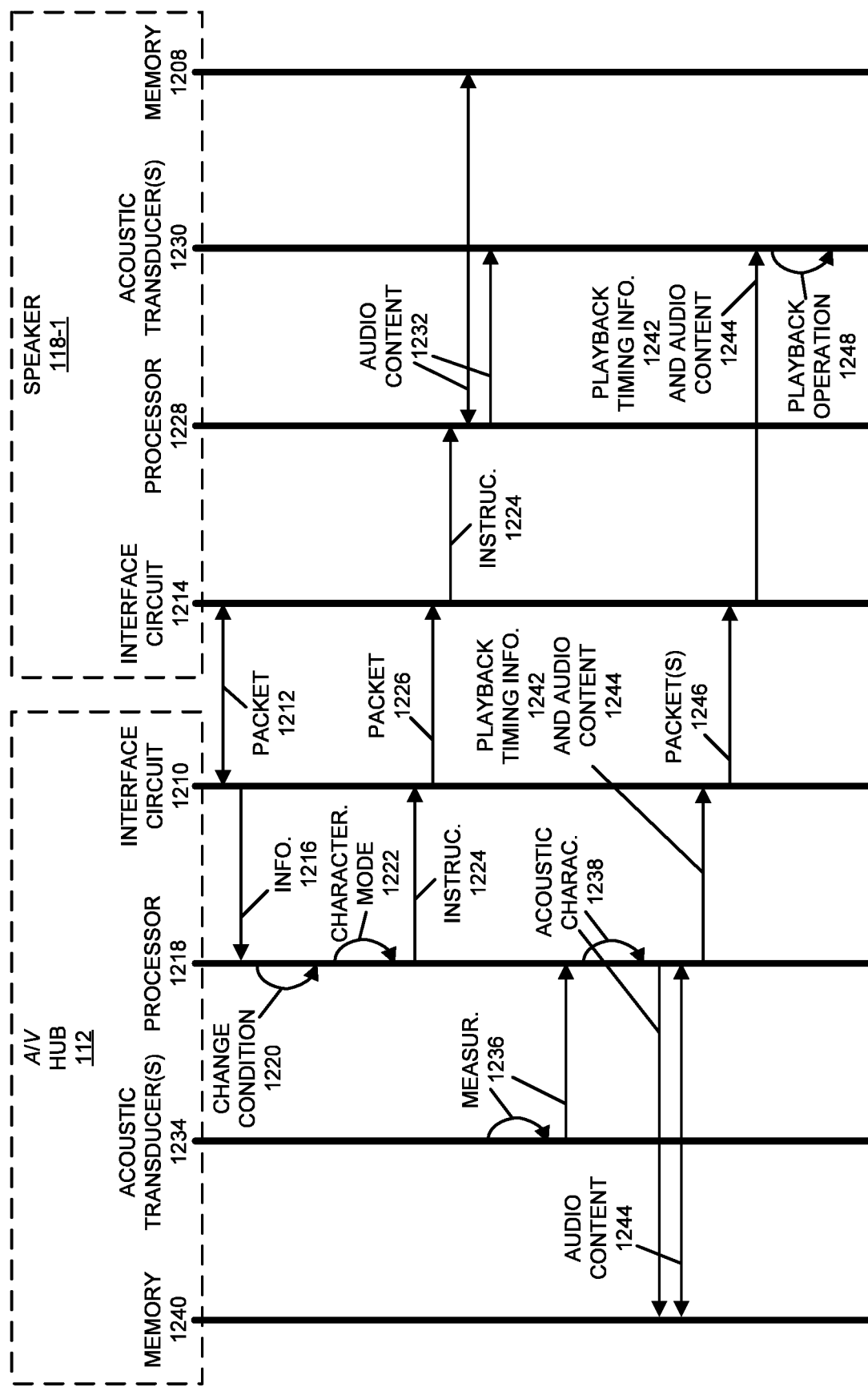
FIG. 12 is a drawing illustrating communication among the electronic devices in FIG. 1 in accordance with an embodiment of the present disclosure.

FIG. 12 is a drawing illustrating communication between A/V hub 112 and speaker 118-1. In particular, interface circuit 1210 in A/V hub 112 may detect speaker 118-1 by wireless communication of frames or packets 1212 with interface circuit 1214 in speaker 118-1. Note that this communication may be unilateral or bilateral.

Interface circuit 1210 may provide information 1216 to processor 1218. This information may indicate the presence of speaker 118-1 in an environment. Alternatively or additionally, information 1216 may specify a location of speaker 118-1.

Then, processor 1218 may determine whether a change condition 1220 has occurred. For example, processor 1218 may determine the presence of speaker 118-1 in the environment when it was not present previously or that the location of previously detected speaker 118-1 has changed.

When change condition 1220 is determined, processor 1218 may transition to a characterization mode 1222. During characterization mode 1222, processor 1218 may provide instruction 1224 to interface circuit 1210. In response, interface circuit 1210 may transmit instruction 1224 to interface circuit 1214 in frame or packet 1226.

After receiving packet 1226, interface circuit 1214 may provide instruction 1224 to processor 1228, when then instructs one or more acoustic transducers 1230 to playback audio content 1232 at a specified playback time. Note that processor 1228 may access audio content 1232 in memory 1208 or audio content 1232 may be included in packet 1226. Next, one or more acoustic transducers 1234 in A/V hub 112 may perform acoustic measurements 1236 of sound corresponding to audio content 1232 output by the one or more acoustic transducers 1230. Based on acoustic measurements 1236 (and/or additional acoustic measurements received from other speakers by interface circuit 1210), processor

1218 may determine one or more acoustic characteristics 1238 of the environment, which are then stored in memory 1240.

Moreover, processor 1218 may provide playback timing information 1242 and audio content 1244 to interface circuit 1210, where the playback timing information 1242 specifies a playback time when speaker 118-1 is to playback audio content 1244 based, at least in part, on the one or more acoustic characteristics 1238. In response, interface circuit 1210 may transmit one or more frames or packets 1246 that includes the playback timing information 1242 and audio content 1244 to speaker 118-1. (However, in some embodiments, playback timing information 1242 and audio content 1244 are transmitted using separate or different frames or packets.)

After interface circuit 1214 receives the one or more frames or packets 1246, it may provide the playback timing information 1242 and audio content 1244 to processor 1228. Processor 1228 may execute software that performs a playback operation 1248. For example, processor 1228 may store audio content 1244 in a queue in memory. In these embodiments, playback operation 1248 includes outputting audio content 1244 from the queue, including driving one or more of acoustic transducers 1230 based on audio content 1244 so speaker 118-1 outputs sound at a time specified by the playback timing information 1242.

Figure 13:
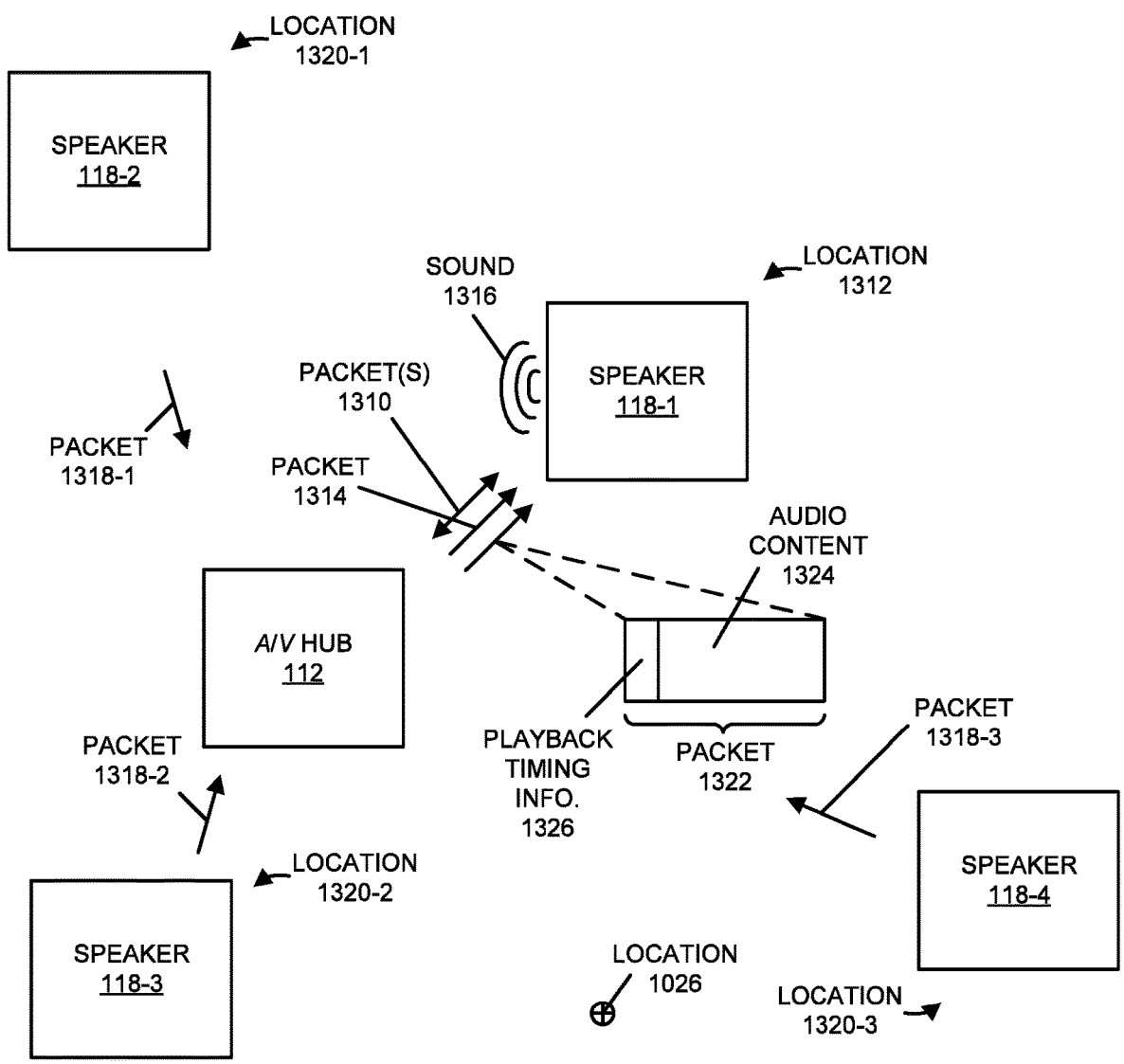
FIG. 13 is a drawing illustrating selective acoustic characterization of an environment that includes the electronic devices in FIG. 1 in accordance with an embodiment of the present disclosure.

In an exemplary embodiment, the communication technique is used to selectively determine one or more acoustic characteristics of an environment (such as a room) that includes A/V hub 112 when a change is detected. FIG. 13 presents a drawing illustrating selective acoustic characterization of an environment that includes speakers 118. In particular, A/V hub 112 may detect speaker 118-1 in the environment. For example, A/V hub 112 may detect speaker 118-1 based on wireless communication of one or more frames or packets 1310 with speaker 118-1. Note that the wireless communication may be unilateral or bilateral.

When a change condition is determined (such as when the presence of speaker 118-1 is first detected, i.e., when speaker 118-1 was not previously detected in the environment, and/or when there is a change in a location 1312 of previously detected speaker 118-1 in the environment), A/V hub 112 may transition into a characterization mode. For example, A/V hub 112 may transition into the characterization mode when a magnitude change in location 1312 on the order of the wavelength at the upper limit of human hearing, e.g., a change of 0.0085, 0.017 or 0.305 m (which are nonlimiting examples), in location 1312 of speaker 118-1 is detected.

During the characterization mode, A/V hub 112 may: provide instructions in frame or packet 1314 to speaker 118-1 to playback audio content at a specified playback time (i.e., to output sound 1316); determine one or more acoustic characteristics of the environment based on acoustic measurements of sound 1316 output by speaker 118-1; and store the one or more acoustic characteristics, which may include location 1312 of speaker 118-1, in memory.

For example, the audio content may include a pseudorandom frequency pattern or white noise over a range of frequencies (such as between 100 and 10,000 or 20,000 Hz, or two or more sub-frequency bands in the range of human hearing, e.g., at 500, 1000 and 2000 Hz, which are nonlimiting examples), an acoustic pattern having a carrier frequency that varies as a function of time over a range of frequencies, an acoustic pattern having spectral content in a range of frequencies, and/or one or more types of music (such as symphony music, classical music, chamber music, opera, rock or pop music, etc.). In some embodiments, the audio content uniquely identifies speaker 118-1, such as a particular temporal pattern, spectral content and/or one or more frequency tones. Alternatively or additionally, A/V hub 112 may receive, via wireless communication with speaker 118-1, an identifier of speaker 118-1, such as an alphanumeric code.

However, in some embodiments, the acoustic characterization is performed without speaker 118-1 playing the audio content. For example, the acoustic characterization may be based on the acoustic energy associated with a person's voice or by measuring 1-2 min. of percussive background noise in the environment. Thus, in some embodiments the acoustic characterization includes passive characterization (instead of active measurements when the audio content is playing).

Moreover, the acoustic characteristics may include: an acoustic spectral response of the environment over a range of frequencies (i.e., information that specifies an amplitude response as a function of frequency), an acoustic transfer function or impulse response over a range of frequencies (i.e., information that specifies an amplitude and a phase response as a function of frequency), room resonances or low-frequency room modes (which have nodes and anti-nodes as a function of position or location in the environment, and which may be determined by measuring sound in the environment in different directions at 90° from each other), location 1312 of speaker 118-1, reflections (including early reflections within 50-60 ms of the arrival of direct sound from speaker 118-1, and late reflections or echoes that occur on longer time scales, which can impact clarity), an acoustic delay of the direct sound, an average reverberation time over a range of frequencies (or the persistence of acoustic sound in the environment over a range of frequencies after the audio content has discontinued), a volume of the environment (such as a size and/or a geometry of room, which may be determined optically), background noise in the environment, ambient sound in the environment, a temperature of the environment, a number of people in the environment (and, more generally, absorption or acoustic loss over a range of frequencies in the environment), a metric of how acoustically lively, bright or dull the environment is and/or information that specifies a type of the environment (such as an auditorium, a general-purpose room, a concert hall, a size of a room, types of furnishing in a room, etc.). For example, the reverberation time may be defined as the time for the sound pressure associated with an impulse at a frequency to decay to a particular level, such as −60 dB. In some embodiments, the reverberation time is a function of the frequency. Note that the range of frequencies in the preceding examples of the acoustic characteristics may be the same or different from each other. Thus, in some embodiments, different ranges of frequencies may be used for different acoustic characteristics. In addition, note that an 'acoustic transfer function' in some embodiments may include a magnitude of the acoustic transfer function (which is sometimes referred to as an 'acoustic spectral response'), a phase of the acoustic transfer function, or both.

As noted previously, the acoustic characteristics may include location 1312 of speaker 118-1. The location 1312 of speaker 118-1 (including distance and direction) may be determined by A/V hub 112 and/or in conjunction with other electronic devices in the environment (such as speakers 118) using techniques such as: triangulation, trilateration, time of flight, wireless ranging, the angle of arrival, etc. Moreover, location 1312 may be determined by A/V hub 112 using: wireless communication (such as communication with a wireless local area network or with a cellular-telephone network), acoustic measurements, a local positioning system, a global positioning system, etc.

While the acoustic characteristics may be determined by A/V hub 112 based on measurements performed by A/V hub 112, in some embodiments the acoustic characteristics are determined by or in conjunction with other electronic devices in the environment. In particular, one or more other electronic devices (such as one or more other speakers 118) may perform acoustic measurements, which are then wirelessly communicated to A/V hub 112 in frames or packets 1318. (Thus, acoustic transducers that perform the acoustic measurements may be included in A/V hub 112 and/or in the one or more other speakers 118.) Consequently, A/V hub 112 may compute the acoustic characteristics based, at least in part, on the acoustic measurements performed by A/V hub 112 and/or the one or more other speakers 118. Note that the computations may also be based on location(s) 1320 of the one or more other speakers 118 in the environment. These locations may be: received from the one or more other speakers 118 in frames or packets 1318, calculated using one of the aforementioned techniques (such as using wireless ranging), and/or accessed in memory (i.e., locations 1320 may be predetermined).

Moreover, while the acoustic characterization may occur when the change condition is detected, alternatively or additionally A/V hub 112 may transition to the characterization mode based on a user input. For example, the user may activate a virtual command icon in a user interface on portable electronic device 110. Thus, the acoustic characterization may be automatically, manually initiated and/or semi-automatically initiated (in which a user interface is used to ask the user for approval before the transition to the characterization mode).

After determining the acoustic characteristics, A/V hub 112 may transition back to a normal operating mode. In this operating mode, A/V hub 112 may transmit one or more frames or packets (such as packet 1322) that include additional audio content 1324 (such as music) and playback timing information 1326 to speaker 118-1, where the playback timing information 1326 may specify a playback time when speaker 118-1 is to playback the additional audio content 1324 based on the one or more acoustic characteristics. Thus, the acoustic characterization may be used to correct for or adapt to the changes (direct or indirect) in the one or more acoustic characteristics that are associated with a change in location 1312 of speaker 118-1, thereby improving the user experience.

Figure 14:
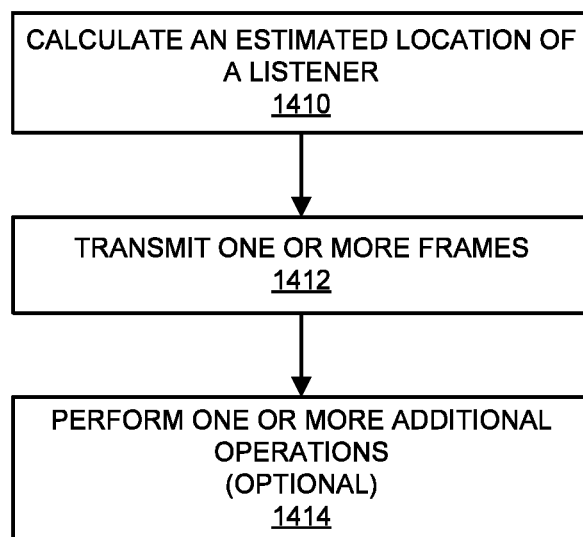
FIG. 14 is a flow diagram illustrating a method for calculating an estimated location in accordance with an embodiment of the present disclosure.

Another approach for improving the acoustic experience is to adapt the coordination based on dynamically tracked locations of one or more listeners. This is shown in FIG. 14, which presents a flow diagram illustrating a method 1400 for calculating an estimated location. Note that method 1400 may be performed by an A/V hub, such as A/V hub 112 (FIG. 1). During operation, the A/V hub (such as a control circuit or control logic, e.g., a processor executing a program module, in the A/V hub) may calculate an estimated location of a listener (operation 1410) (or an electronic device associated with the listener, such as portable electronic device 110 in FIG. 1) relative to the electronic devices in an environment that includes the A/V hub and the electronic devices.

Then, the A/V hub may transmit one or more frames (operation 1412) or packets that include audio content and playback timing information to the electronic devices, where the playback timing information specifies playback times when the electronic devices are to playback the audio content based on the estimated location. Furthermore, the playback times of the electronic devices have a temporal relationship so that the playback of the audio content by the electronic devices is coordinated. Note that the temporal relationship may have a non-zero value, so that at least some of the electronic devices are instructed to playback the audio content with a phase relative to each other by using different values of the playback times. For example, the different playback times may be based on predetermined or dynamically determined acoustic characteristics of the environment that includes the electronic devices and the A/V hub. Alternatively or additionally, the different playback times may be based on a desired acoustic characteristic in the environment. Additionally, the playback times may be based on current time offsets between clocks in the electronic devices and a clock in the A/V hub.

In some embodiments, the A/V hub optionally performs one or more additional operations (operation 1414). For example, the A/V hub may communicate with another electronic device, and the estimated location of the listener may be calculated based on the communication with the other electronic device.

Moreover, the A/V hub may include an acoustic transducer that performs sound measurements in the environment, and the estimated location of the listener may be calculated based on the sound measurements. Alternatively or additionally, the A/V hub may communicate with other electronic devices in the environment and may receive additional sound measurements of the environment from the other electronic devices, and the estimated location of the listener may be calculated based on the additional sound measurements.

In some embodiments, the A/V hub performs time-of-flight measurements, and the estimated location of the listener is calculated based on the time-of-flight measurements.

Furthermore, the A/V hub may calculate additional estimated locations of additional listeners relative to the electronic devices in the environment, and the playback times may be based on the estimated location and the additional estimated locations. For example, the playback times may be based on an average of the estimated location and the additional estimated locations. Alternatively, the playback times may be based on a weighted average of the estimated location and the additional estimated locations.

Figure 15:
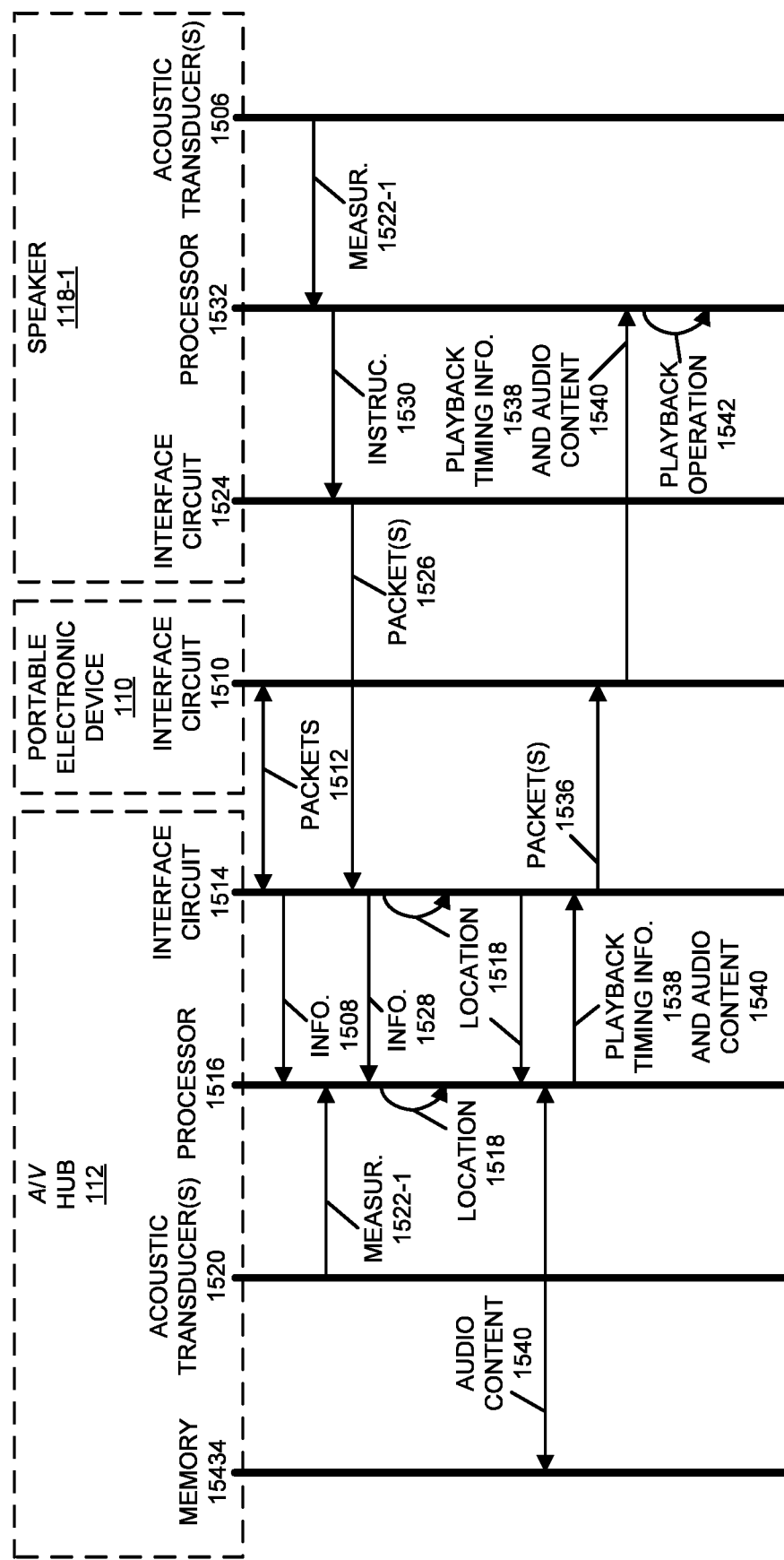
FIG. 15 is a drawing illustrating communication among the electronic devices in FIG. 1 in accordance with an embodiment of the present disclosure.

FIG. 15 is a drawing illustrating communication among portable electronic device 110, A/V hub 112, and speakers 118, such as speaker 118-1. In particular, interface circuit 1510 in A/V hub 112 may receive one or more frames or packets 1512 from interface circuit 1514 in portable electronic device 110. Note that the communication between A/V hub 112 and portable electronic device 110 may be unidirectional or bidirectional. Then, based on the one or more frames or packets 1512, interface circuit 1510 and/or processor 1516 in A/V hub 112 may estimate location 1518 of a listener associated with portable electronic device 110. For example, interface circuit 1510 may provide information 1508 based on packets 1512, which is used by processor 1516 to estimate location 1518.

Alternatively or additionally, one or more acoustic transducers 1520 in A/V hub 112 and/or one or more acoustic transducers 1506 in speakers 118 may performs measures 1522 of sound associated with listener. If speakers 118 perform measurements 1522-2 of the sound, interface circuits 1524 in one or more of speakers 118 (such as speaker 118-1) may transmit one or more frames or packets 1526 to interface circuit 1510 with information 1528 that specifies measurements 1522-2 of the sound based on instructions 1530 from processor 1532. Then, interface circuit 1514 and/or processor 1516 may estimate location 1518 based on the measured sound 1522.

Next, processor 1516 may instruct interface circuit 1510 to transmit one or more frames or packets 1536 to speaker 118-1 with playback timing information 1538 and audio content 1540, where the playback timing information 1538 specifies a playback time when speaker 118-1 is to playback audio content 1540 based, at least in part, on location 1518. (However, in some embodiments, playback timing information 1538 and audio content 1540 are transmitted using separate or different frames or packets.) Note that processor 1516 may access audio content 1540 in memory 1534.

After receiving the one or more frames or packets 1536, interface circuit 1524 may provide playback timing information 1538 and audio content 1540 to processor 1532. Processor 1532 may execute software that performs a playback operation 1542. For example, processor 1532 may store audio content 1540 in a queue in memory. In these embodiments, playback operation 1542 includes outputting audio content 1540 from the queue, including driving one or more of acoustic transducers 1506 based on audio content 1540 so speaker 118-1 outputs sound at a time specified by the playback timing information 1538.

Figure 16:
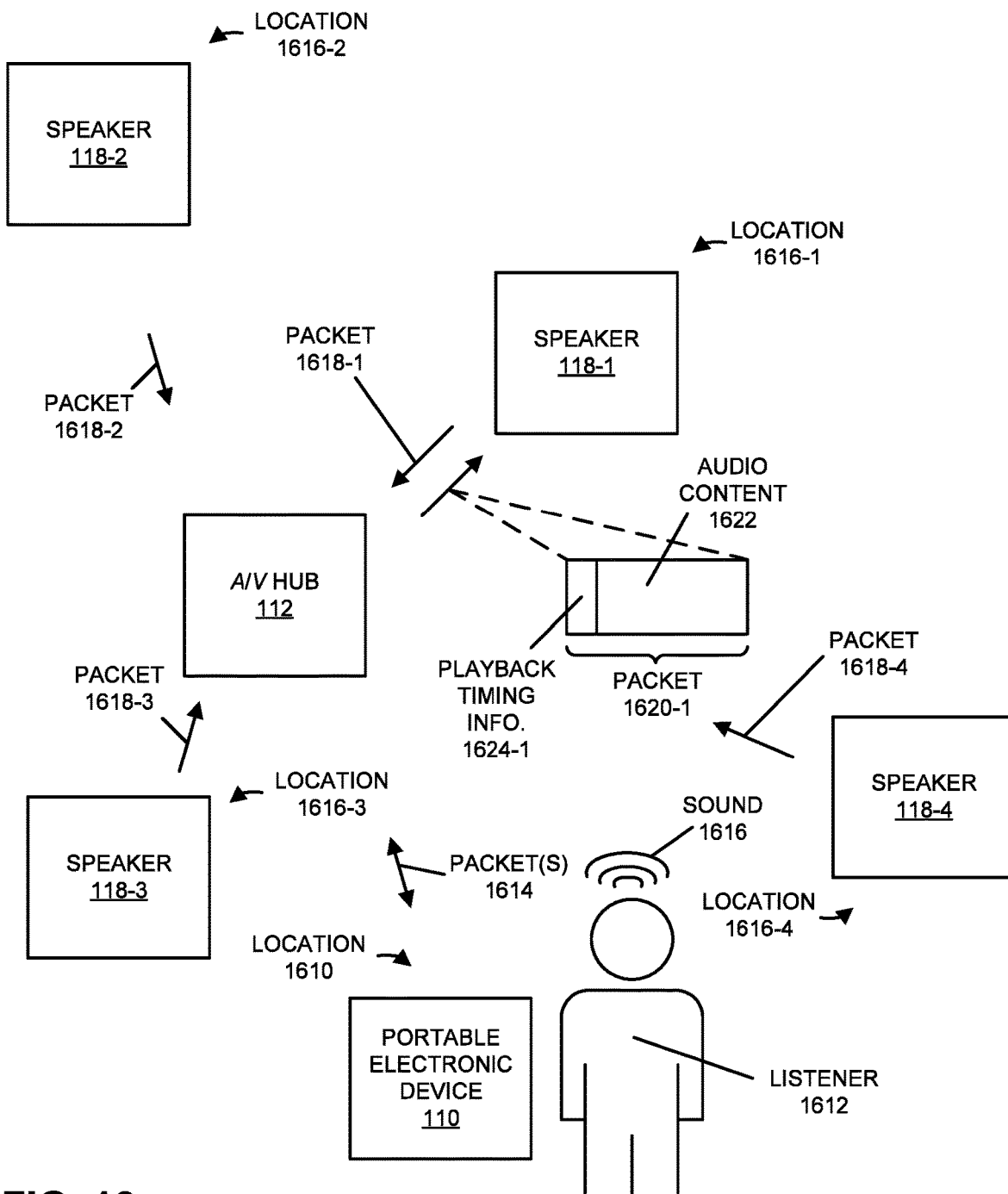
FIG. 16 is a drawing illustrating calculating an estimated location of one or more listeners relative to the electronic devices in FIG. 1 in accordance with an embodiment of the present disclosure.

In an exemplary embodiment, the communication technique is used to dynamically track the locations of one or more listeners in an environment. FIG. 16 presents a drawing illustrating calculating an estimated location of one or more listeners relative to speakers 118. In particular, A/V hub 112 may calculate estimated location(s) of one or more listeners, such as location 1610 of listener 1612 relative to such as speakers 118 in an environment that includes A/V hub 112 and speakers 118. For example, location 1610 may be determined coarsely (e.g., to the nearest room, 3-10 m accuracy, etc.) or finely (e.g., 0.1-3 m accuracy), which are nonlimiting numerical examples.

In general, location 1610 may be determined by A/V hub 112 and/or in conjunction with other electronic devices (such as speakers 118) in the environment using techniques such as: triangulation, trilateration, time of flight, wireless ranging, the angle of arrival, etc. Moreover, location 1610 may be determined by A/V hub 112 using: wireless communication (such as communication with a wireless local area network or with a cellular-telephone network), acoustic measurements, a local positioning system, a global positioning system, etc.

For example, location 1610 of at least listener 1612 may be estimated by A/V hub 112 based on wireless communication (such as using wireless ranging, time-of-flight measurements, the angle of arrival, RSSI, etc.) of one or more frames or packets 1614 with another electronic device, such as portable electronic device 110, which may be proximate to listener 1612 or on their person. In some embodiments, the wireless communication with the other electronic device (such as a MAC address in frames or packets received from portable electronic device 110) is used as a signature or an electronic thumbprint that identifies listener 1612. Note that the communication between portable electronic device 110 and A/V hub 112 may be unidirectional or bidirectional.

During wireless ranging, A/V hub 112 may transmit a frame or a packet that includes a transmission time to, e.g., portable electronic device 110. When this frame or packet is received by portable electronic device 110, the arrival time may be determined. Based on the product of the time of flight (the difference of the arrival time and the transmission time) and the speed of propagation, the distance between A/V hub 112 and portable electronic device 110 can be calculated. Then, this distance may be communicated in a subsequent transmission of a frame or a packet from portable electronic device 110 to A/V hub 112 along with an identifier of portable electronic device 110. Alternatively, portable electronic device 110 may transmit a frame or a packet that includes a transmission time and an identifier of portable electronic device 110, and A/V hub 112 may determine the distance between portable electronic device 110 and A/V hub 112 based on the product of the time of flight (the difference of a arrival time and the transmission time) and the speed of propagation.

In a variation on this approach, A/V hub 112 may transmit frames or packets 1614 that are reflected at portable electronic device 110, and the reflected frames or packets 1614 may be used to dynamically determine the distance between portable electronic device 110 and A/V hub 112.

While the preceding example illustrated wireless ranging with coordinated clocks in portable electronic device 110 and A/V hub 112, in other embodiments the clocks are not coordinated. For example, the position of portable electronic device 110 may be estimated based on the speed of propagation and the time of arrival data of wireless signals at several receivers at different known locations in the environment (which is sometimes referred to as 'differential time of arrival') even when the transmission time is unknown or unavailable. For example, the receivers may be at least some of the other speakers 118 at locations 1616, which may be predefined or predetermined. More generally, a variety of radiolocation techniques may be used, such as: determining distance based on a difference in the power of the RSSI relative to the original transmitted signal strength (which may include corrections for absorption, refraction, shadowing and/or reflection); determining the angle of arrival at a receiver (including non-line-of-sight reception) using a directional antenna or based on the differential time of arrival at an array of antennas with known location(s) in the environment; determining the distance based on backscattered wireless signals; and/or determining the angle of arrival at two receivers having known location in the environment (i.e., trilateration or multilateration). Note that the wireless signals may include transmissions over GHz or multi-GHz bandwidths to create pulses of short duration (such as, e.g., approximately 1 ns), which may allow the distance to be determined within 0.305 m (e.g., 1 ft), and which are nonlimiting examples. In some embodiments, the wireless ranging is facilitated using location information, such as a location of one or more of electronic devices in the environment (such as locations 1616) that are determined or specified by a local positioning system, a global positioning system and/or a wireless network.

Alternatively or additionally, location 1610 may be estimated by A/V hub 112 based on sound measurements in the environment, such as acoustic tracking of listener 1612, e.g., based on sounds 1618 they make as they move about, talk and/or breathe. The sound measurements may be performed by A/V hub 112 (such as using two or more acoustic transducers, e.g., microphones, which may be arranged as a phased array). However, in some embodiments sound measurements may be performed separately or additionally by one or more electronic devices in the environment, such as speakers 118, and these sound measurements may be wirelessly communicated to A/V hub 112 in frames or packets 1618, which then uses the sound measurements to estimate location 1610. In some embodiments, listener 1612 is identified using a voice-recognition technique.

In some embodiments, location 1610 is estimated by A/V hub 112 based on sound measurements in the environment and a predetermined acoustic characteristic of the environment, such as a spectral response or an acoustic transfer function. For example, variation in the excitation of predetermined room modes as listener 1612 moves in the environment may be used to estimate location 1610.

Moreover, one or more other techniques may be used to track or estimate location 1610 of listener 1612. For example, location 1610 may be estimated based on optical imaging of listener 1612 in a band of wavelengths (such as visible light or infrared light), time-of-flight measurements (such as laser ranging), and/or a grid of optical beams (such as infrared beams) that localize listener 1612 in a grid (and, thus, coarsely determine location 1610) based on a pattern of beam-line crossings. In some embodiments, the identity of listener 1612 is determined in optical images using a facial-recognition and/or a gate-recognition technique.

For example, in some embodiments the location of the listener in the environment is tracked based on wireless communication with a cellular telephone that is carried with the listener. Based on the pattern of the locations in the environment, the locations of furniture in the environment and/or a geometry of the environment (such as a size or dimensions of a room) may be determined. This information may be used to determine an acoustic characteristic of the environment. Moreover, the historical locations of the listener may be used to constrain an estimated location of the listener in the environment. In particular, historical information about the location of the listener in the environment at different times of day may be used to assist in estimating the current location of the listener at a particular time of day. Thus, in general, the location of the listener may be estimated using a combination of optical measurements, acoustic measurements, acoustic characteristics, wireless communication and/or machine learning.

After determining location 1610, A/V hub 112 may transmit at least one or more frames or packets to speakers 118 that include additional audio content 1622 (such as music) and playback timing information (such as playback timing information 1624-1 in packet 1620-1 to speaker 118-1), where the playback timing information 1624-1 may specify a playback time when speaker 118-1 is to playback the additional audio content 1622 based on location 1610. Thus, the communication technique may be used to correct for or adapt to the changes in location 1610, thereby improving the user experience.

As noted previously, the different playback times may be based on a desired acoustic characteristic in the environment. For example, the desired acoustic characteristic may include a type of playback, such as: monophonic, stereophonic and/or multichannel sound. Monophonic sound may include one or more audio signals that contain no amplitude (or level) and arrival time/phase information that replicates or simulates directional cues.

Moreover, stereophonic sound may include two independent audio-signal channels, and the audio signals may have a specific amplitude and phase relationship with each other so that, during the playback operation, there is an apparent image of the original sound source. In general, the audio signals for both channels may provide coverage over most or all of the environment. By adjusting the relative amplitudes and/or phases of the audio channels, the sweet spot may be moved to follow the determined location of at least the listener. However, the amplitude differences and arrival time differences (the directional cues) may need to be small enough that the stereo image and localization are both maintained. Otherwise, the image may collapse and only one or the other audio channel is heard.

Note that the audio channels in stereophonic sound may need to have the correct absolute phase response. This means that an audio signal with a positive pressure waveform at the input to the system may need to have the same positive pressure waveform at the output from one of speakers 118. Therefore, a drum, which, when struck, produces a positive pressure waveform at a microphone may need to produce a positive pressure waveform in the environment. Alternatively, if the absolute polarity is flipped the wrong way, the audio image may not be stable. In particular, the listener may not find or perceive a stable audio image. Instead, the audio image may wander and may localize at speakers 118.

Furthermore, multichannel sound may include left, center and right audio channels. For example, these channels may allow monophonic speech reinforcement and music or sound effect cues to be localized or mixed with a particular perspective, with stereo or stereo-like imaging. Thus, the three audio channels may provide coverage over most or all of the entire environment while maintaining amplitude and directional cues, as was the case for monophonic or stereophonic sound.

Alternatively or additionally, the desired acoustic characteristic may include an acoustic radiation pattern. The desired acoustic radiation pattern may be a function of the reverberation time in the environment. For example, the reverberation time may change depending on the number of people in the environment, the type and amount of furniture in the environment, whether or not the curtains are open or closed, whether or not a window is open or closed, etc. When the reverberation time is longer or is increased, the desired acoustic radiation pattern may be more directed, so that the sound is steered or beamed to a listener (thereby reducing the reverberation). In some embodiments, the desired acoustic characteristic includes intelligibility of words.

While the preceding discussion illustrated techniques that can be used to dynamically track location 1610 of listener 1612 (or portable electronic device 110), these techniques may be used to determine the location of an electronic device (such as a speaker 118-1) in the environment.

Figure 17:
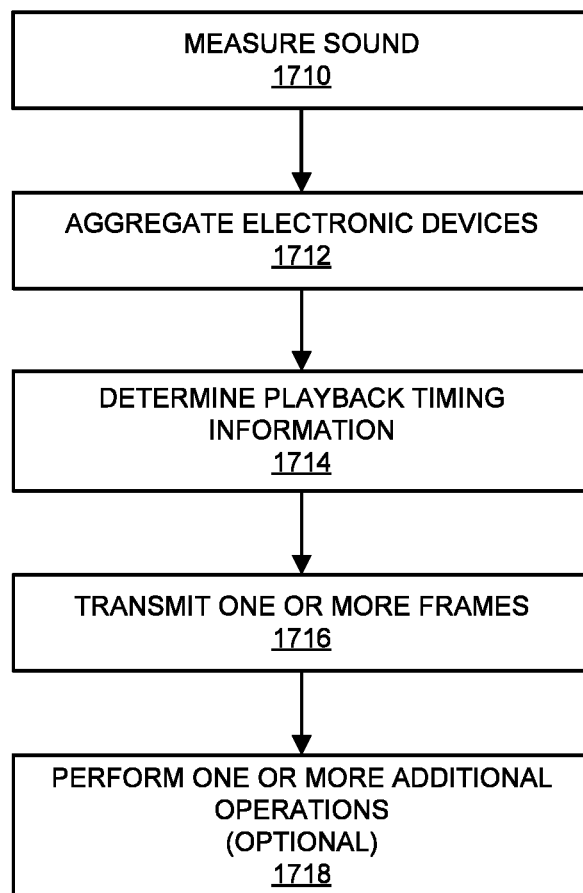
FIG. 17 is a flow diagram illustrating a method for aggregating electronic devices in accordance with an embodiment of the present disclosure.

Another approach for improving the acoustic experience is to dynamically aggregate electronic devices into groups and/or to adapt the coordination based on the groups. This is shown in FIG. 17, which presents a flow diagram illustrating a method 1700 for aggregating electronic devices. Note that method 1700 may be performed by an A/V hub, such as A/V hub 112 (FIG. 1). During operation, the A/V hub (such as a control circuit or control logic, e.g., a processor executing a program module, in the A/V hub) may measure sound (operation 1710) output by electronic devices (such as speakers 118) in an environment using one or more acoustic transducers, where the sound corresponds to audio content. For example, the measured sound may include the sound pressure.

Then, the A/V hub may aggregate the electronic devices (operation 1712) into two or more subsets based on the measured sound. Note that the different subsets may be located in different rooms in the environment. Moreover, at least one of the subsets may playback different audio content than a remainder of the subsets. Furthermore, the aggregation of the electronic devices into the two or more subsets may be based on: the different audio content; an acoustic delay of the measured sound; and/or a desired acoustic characteristic in the environment. In some embodiments, electronic devices in the subsets and/or geographic locations or regions associated with the subsets are not predefined. Instead, the A/V hub may dynamically aggregate the subsets.

Moreover, the A/V hub may determine playback timing information (operation 1714) for the subsets, where the playback timing information specifies playback times when the electronic devices in a given subset are to playback the audio content.

Next, the A/V hub may transmit, using wireless communication, one or more frames (operation 1716) or packets that include the audio content and playback timing information to the electronic devices, where the playback times of the electronic devices in at least the given subset have a temporal relationship so that the playback of the audio content by the electronic devices in the given subset is coordinated.

In some embodiments, the A/V hub optionally performs one or more additional operations (operation 1718). For example, the A/V hub may calculate an estimated location of at least a listener relative to the electronic devices, and the aggregation of the electronic devices into the two or more subsets may be based on the estimated location of at least the listener. This may help ensure that the listener has an improved acoustic experience, with reduced acoustic cross-talk from the other subset(s).

Moreover, the A/V hub may modify the measured sound based on a predetermined (or dynamically determined) acoustic transfer function of the environment in at least a band of frequencies (such as 100-20,000 Hz, which is a nonlimiting example). This may allow the A/V hub to determine the original output sound without the spectral filtering or distortions associated with the environment, which may allow the A/V hub to make better decisions when aggregating the subsets.

Furthermore, the A/V hub may determine playback volumes for the subsets that are used when the subsets playback the audio content, and the one or more frames or packets may include information that specifies the playback volumes. For example, a playback volume for at least one of the subsets may be different than the playback volumes of a remainder of the subsets. Alternatively or additionally, the playback volumes may reduce acoustic cross-talk among the two or more subsets so that listeners are more likely to hear the sound output by the subset to which they are proximate or closest.

Figure 18:
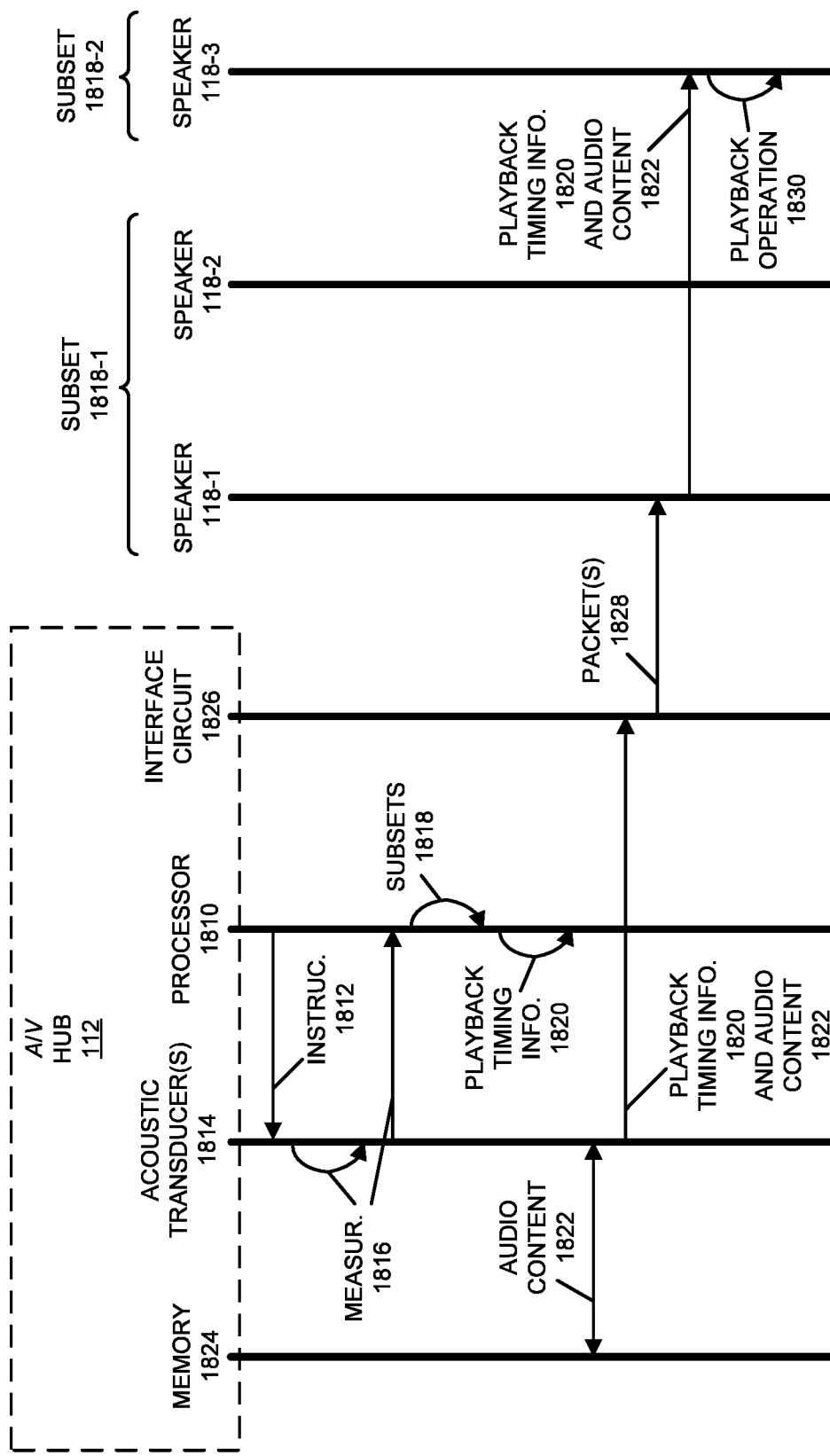
FIG. 18 is a drawing illustrating communication among the electronic devices in FIG. 1 in accordance with an embodiment of the present disclosure.

FIG. 18 is a drawing illustrating communication among portable electronic device 110, A/V hub 112, and speakers 118. In particular, processor 1810 may instruct 1812 one or more acoustic transducers 1814 in A/V hub 112 to perform measurements 1816 of sound associated with speakers 118. Then, based on measurements 1816, processor 1810 may aggregate speakers 118 into two or more subsets 1818.

Moreover, processor 1810 may determine playback timing information 1820 for subsets 1818, wherein the playback timing information 1820 specifies playback times when speakers 118 in a given subset are to playback audio content 1822. Note that processor 1810 may access audio content 1822 in memory 1824.

Next, processor 1810 may instruct interface circuit 1826 to transmit frames or packets 1828 to speakers 118 with playback timing information 1820 and audio content 1822. (However, in some embodiments, playback timing information 1820 and audio content 1822 are transmitted using separate or different frames or packets.)

After receiving the one or more frames or packets 1826, an interface circuit in speaker 118-3 may provide playback timing information 1820 and audio content 1822 to a processor. This processor may execute software that performs a playback operation 1830. For example, the processor may store audio content 1822 in a queue in memory. In these embodiments, playback operation 1830 includes outputting audio content 1822 from the queue, including driving one or more of acoustic transducers based on audio content 1822 so speaker 118-3 outputs sound at a time specified by the playback timing information 1820. Note that the playback times of speakers 118 in at least the given subset have a temporal relationship so that the playback of audio content 1822 by the speakers 118 in the given subset is coordinated.

Figure 19:
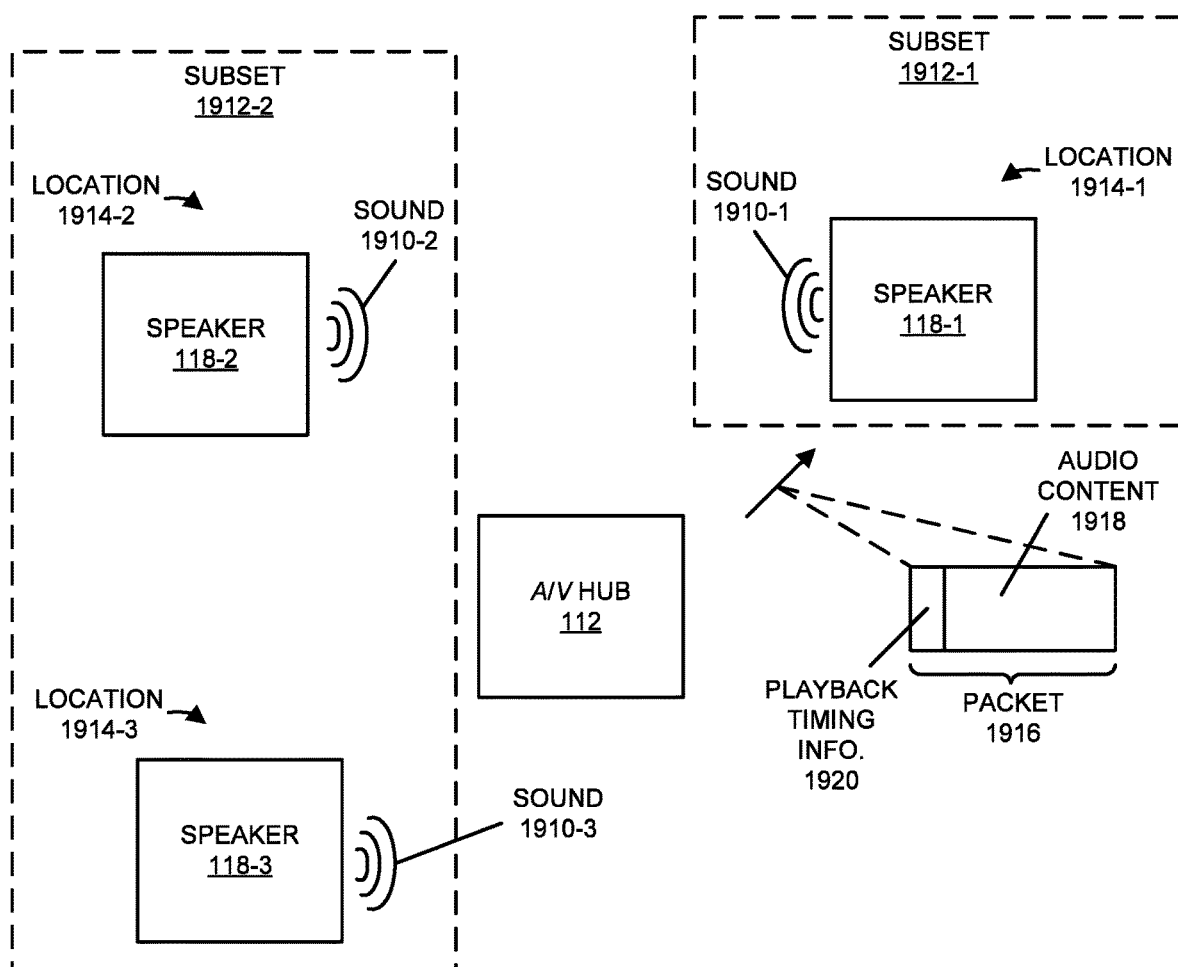
FIG. 19 is a drawing illustrating aggregating the electronic devices in FIG. 1 in accordance with an embodiment of the present disclosure.

In an exemplary embodiment, the communication technique is used to aggregate speakers 118 into subsets. FIG. 19 presents a drawing illustrating aggregating speakers 118, which may be in the same or different rooms in an environment. A/V hub 112 may measure sound 1910 output by speakers 118. Based on these measurements, A/V hub 112 may aggregate speakers 118 into subsets 1912. For example, the subsets 1912 may be aggregated based on sound intensity and/or acoustic delay, so that proximate speakers are aggregated together. In particular, speakers that have the highest acoustic intensity or similar acoustic delay may be aggregated together. In order to facilitate the aggregation, speakers 118 may wirelessly transmit and/or acoustically output identification information or acoustic-characterization patterns outside of the range of human hearing. For example, the acoustic-characterization patterns may include pulses. However, a variety of temporal, frequency and/or modulation techniques may be used, including: amplitude modulation, frequency modulation, phase modulation, etc. Alternatively or additionally, A/V hub 112 may instruct each of speakers 118 to, one at a time, dither the playback times or phase of their output sound, so that A/V hub 112 can associate the measured sound with particular speakers. Moreover, the measured sound 1910 may be corrected using an acoustic transfer function of an environment, so that the impact of reflections and filtering (or distortion) is removed prior to aggregating speakers 118. In some embodiments, the speakers 118 are aggregated based, at least in part, on locations 1914 of speakers 118, which may be determined using one or more of the aforementioned techniques (such as using wireless ranging). In this way, subsets 1912 may be dynamically modified as one or more listeners repositions speakers 118 in the environment.

Then, A/V hub 112 may transmit one or more frames or packets (such as packet 1916) that include additional audio content 1918 (such as music) and playback timing information 1920 to speakers 118 in at least one of subsets 1912 (such as subset 1912-1), where the playback timing information 1920 may specify playback times when speakers 118 in subset 1912-1 are to playback the additional audio content 1918. Thus, the communication technique may be used to dynamically select subsets 1912, e.g., based on a location of a listener and/or a desired acoustic characteristic in an environment that includes A/V hub 112 and speakers 118.

Figure 20:
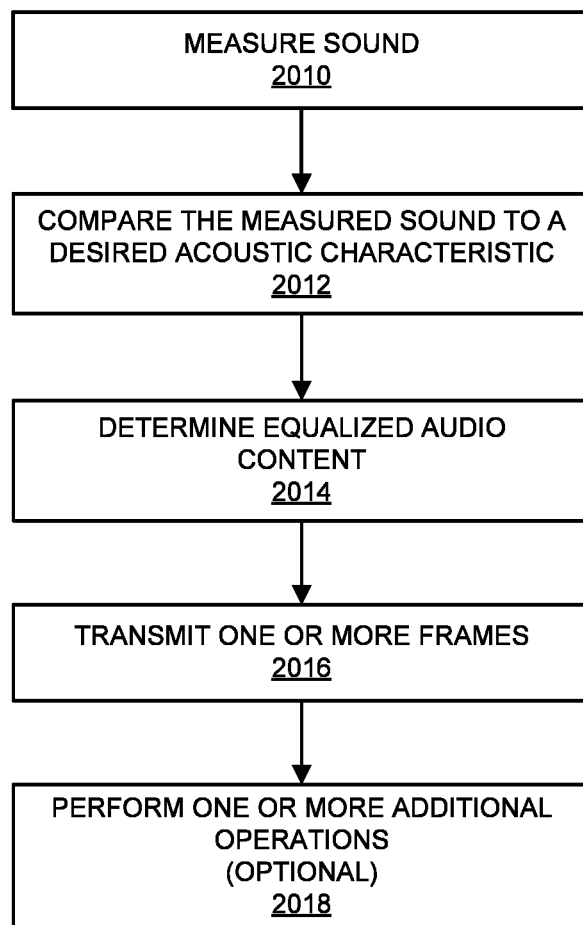
FIG. 20 is a flow diagram illustrating a method for determining equalized audio content in accordance with an embodiment of the present disclosure.

Another approach for improving the acoustic experience is to dynamically equalize audio based on acoustic monitoring in an environment. FIG. 20 presents a flow diagram illustrating a method 2000 for determining equalized audio content, which may be performed by an A/V hub, such as A/V hub 112 (FIG. 1). During operation, the A/V hub (such as a control circuit or control logic, e.g., a processor executing a program module, in the A/V hub) may measure sound (operation 2010) output by electronic devices (such as speakers 118) in the environment using one or more acoustic transducers, where the sound corresponds to audio content. For example, the measured sound may include the sound pressure.

Then, the A/V hub may compare the measured sound to a desired acoustic characteristic (operation 2012) at a first location in the environment based on the first location, a second location of the A/V hub, and a predetermined or dynamically determined acoustic transfer function of the environment in at least a band of frequencies (such as 100-20,000 kHz, which is a nonlimiting example). Note that the comparison may be performed in the time domain and/or in the frequency domain. In order to perform the comparison, the A/V hub may calculate the acoustic characteristic (such as an acoustic transfer function or a modal response) at the first location and/or the second location, and may correct the measured sound for filtering or distortions in the environment using the calculated acoustic characteristic. Using the acoustic transfer function as an example, this calculation may involve the use of a Green's function technique to compute the acoustic response of the environment as a function of location with one or more point or distributed acoustic sources at predefined or known location(s) in the environment. Note that the acoustic transfer function at the first location and the correction may depend on the integrated acoustic behavior of the environment (and, thus, the second location and/or locations of acoustic sources, such as speakers 118, in the environment). Therefore, the acoustic transfer function may include information specifying the location(s) in the environment where the acoustic transfer function was determined (e.g., the second location) and/or the location(s) of an acoustic source in the environment (such as the location of at least one of the electronic devices).

Moreover, the A/V hub may determine equalized audio content (operation 2014) based on the comparison and the audio content. Note that the desired acoustic characteristic may be based on a type of audio playback, such as: monophonic, stereophonic and/or multichannel. Alternatively or additionally, the desired acoustic characteristic may include an acoustic radiation pattern. The desired acoustic radiation pattern may be a function of the reverberation time in the environment. For example, the reverberation time may change depending on the number of people in the environment, the type and amount of furniture in the environment, whether or not the curtains are open or closed, whether or not a window is open or closed, etc. When the reverberation time is longer or is increased, the desired acoustic radiation pattern may be more directed, so that the sound associated with the equalized audio content is steered or beamed to a listener (thereby reducing the reverberation). Consequently, in some embodiments the equalization is a complex function that modifies the amplitude and/or phase in the audio content. Moreover, the desired acoustic characteristic may include reducing room resonances or room modes by reducing the energy in the associated low frequencies in the acoustic content. Note that in some embodiments, the desired acoustic characteristic includes intelligibility of words. Thus, the target (the desired acoustic characteristic) may be used to adapt the equalization of the audio content.

Next, the A/V hub may transmit, using wireless communication, one or more frames (operation 2016) or packets that include the equalized audio content to the electronic devices to facilitate output by the electronic devices of additional sound, which corresponds to the equalized audio content.

In some embodiments, the A/V hub optionally performs one or more additional operations (operation 2018). For example, the first location may include an estimated location of a listener relative to the electronic devices, and the A/V hub may calculate the estimated location of the listener. In particular, the estimated location of the listener may use one or more of the aforementioned techniques for dynamically determining the location of the listener. Thus, the A/V hub may calculate the estimated location of the listener based on the sound measurements. Alternatively or additionally, the A/V hub may: communicate with another electronic device; and may calculate the estimated location of the listener based on the communication with the other electronic device. In some embodiments, the communication with the other electronic device includes wireless ranging, and the estimated location may be calculated based on the wireless ranging and an angle of arrival of wireless signals from the other electronic device. Furthermore, the A/V hub may perform time-of-flight measurements, and may calculate the estimated location of the listener based on the time-of-flight measurements. In some embodiments, the dynamic equalization allows the 'sweet spot' in the environment to be adapted based on the location of the listener. Note that the A/V hub may determine the number of listeners in the environment and/or the locations of the listeners, and the dynamic equalization may adapt the sound so that the listeners (or a majority of the listeners) have the desired acoustic characteristic when listening to the equalized audio content.

Moreover, the A/V hub may communicate with other electronic devices in the environment and may receive (separately from or in conjunction with the sound measurements) additional sound measurements of the environment from the other electronic devices. Then, the A/V hub may perform one or more additional comparisons of the additional sound measurements to the desired acoustic characteristic at the first location in the environment based on one or more third locations of the other electronic devices (such as the locations of speakers 118) and the predetermined or dynamically determined acoustic transfer function of the environment in at least the band of frequencies, and the equalized audio content is further determined based on the one or more additional comparisons. In some embodiments, the A/V hub determines the one or more third locations based on the communication with the other electronic devices. For example, the communication with the other electronic devices may include wireless ranging, and the one or more third locations may be calculated based on the wireless ranging and angles of arrival of wireless signals from the other electronic devices. Alternatively or additionally, the A/V hub may receive information specifying the third locations from the other electronic devices. Thus, the locations of the other electronic devices may be determined using one or more of the aforementioned techniques for determining the location of an electronic device in the environment.

Furthermore, the A/V hub may determine playback timing information that specifies playback times when the electronic devices playback the equalized audio content, and the one or more frames or packets may include the playback timing information. In these embodiments, the playback times of the electronic devices have a temporal relationship so that the playback of the audio content by the electronic devices is coordinated.

Figure 21:
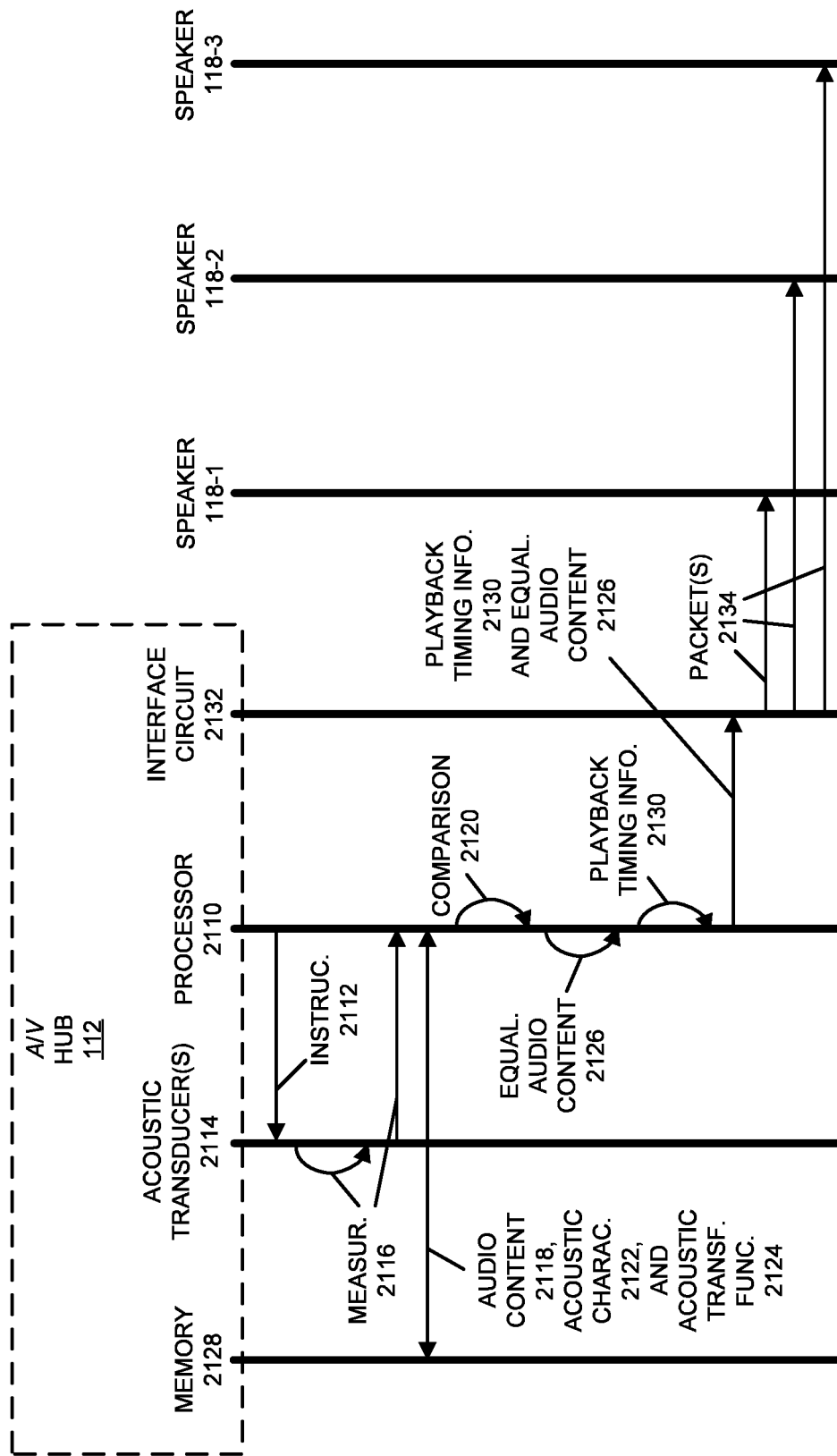
FIG. 21 is a drawing illustrating communication among the electronic devices in FIG. 1 in accordance with an embodiment of the present disclosure.

FIG. 21 is a drawing illustrating communication among portable electronic device 110, A/V hub 112, and speakers 118. In particular, processor 2110 may instruct 2112 one or more acoustic transducers 2114 in A/V hub 112 to measure sound 2116 associated with speakers 118 and corresponding to audio content 2118. Then, processor 21110 may compare 2120 the measured sound 2116 to a desired acoustic characteristic 2122 at a first location in the environment based on the first location, a second location of A/V hub 112, and a predetermined or dynamically determined acoustic transfer 2124 function of the environment in at least a band of frequencies (which may be accessed in memory 2128).

Moreover, processor 2110 may determine equalized audio content 2126 based on comparison 2120 and audio content 2118, which may be accessed in memory 2128. Note that processor 2110 may know, in advance, audio content 2118 being output by speakers 118.

Next, processor 2110 may determine playback timing information 2130, wherein the playback timing information 2130 specifies playback times when speakers 118 are to playback equalized audio content 2126.

Furthermore, processor 2110 may instruct interface circuit 2132 to transmit one or more frames or packets 2134 to speakers 118 with playback timing information 2130 and equalized audio content 2126. (However, in some embodiments, playback timing information 2130 and audio content 2126 are transmitted using separate or different frames or packets.)

After receiving the one or more frames or packets 2134, an interface circuit in one of speakers 118 (such as speaker 118-1) may provide playback timing information 2130 and equalized audio content 2126 to a processor. This processor may execute software that performs a playback operation. For example, the processor may store equalized audio content 2126 in a queue in memory. In these embodiments, the playback operation includes outputting equalized audio content 2126 from the queue, including driving one or more of acoustic transducers based on equalized audio content 2126 so speaker 118-1 outputs sound at a time specified by the playback timing information 2130. Note that the playback times of speakers 118 have a temporal relationship so that the playback of equalized audio content 2126 by the speakers 118 is coordinated.

Figure 22:
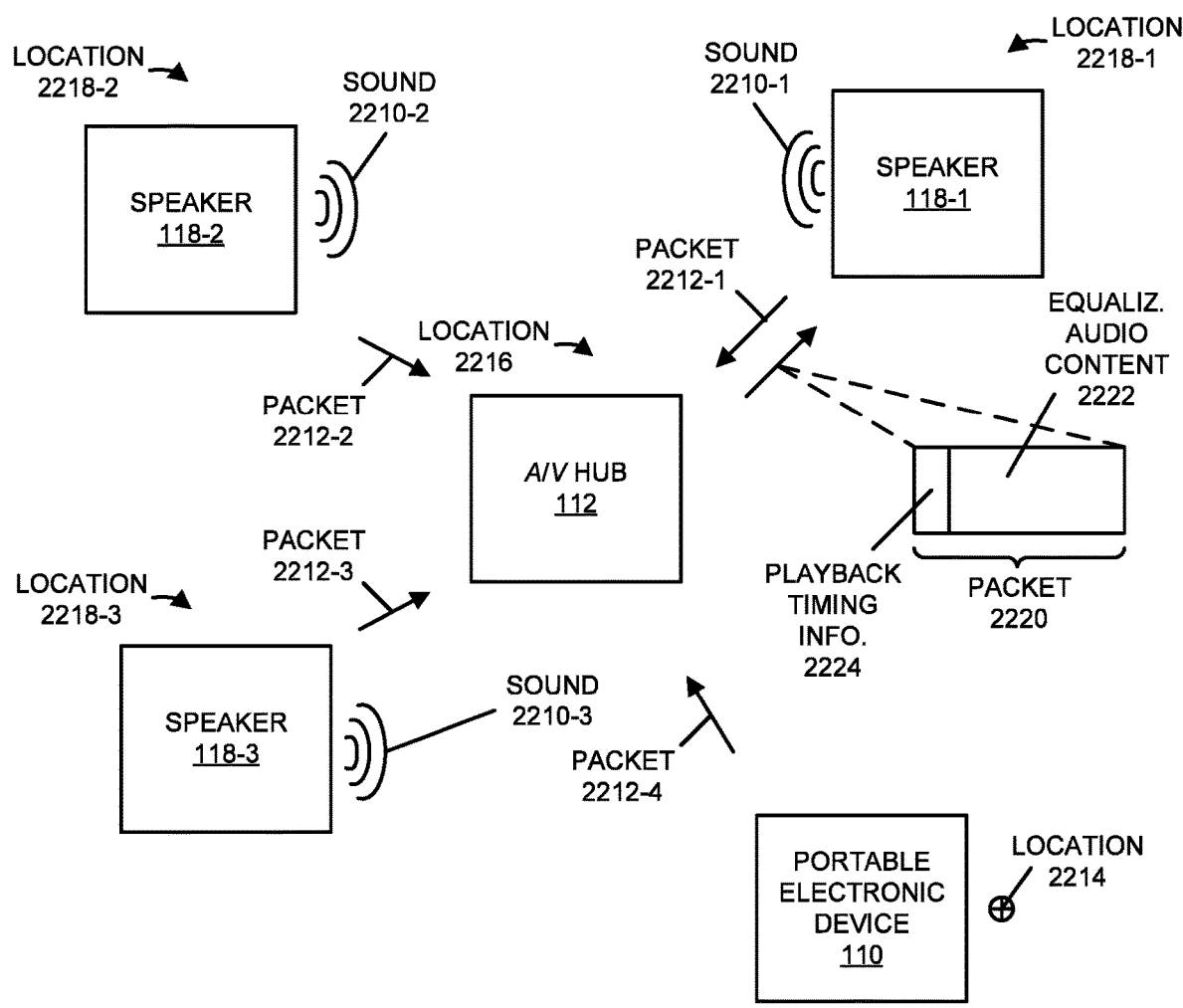
FIG. 22 is a drawing illustrating determining equalized audio content using the electronic devices in FIG. 1 in accordance with an embodiment of the present disclosure.

In an exemplary embodiment, the communication technique is used to dynamically equalize audio content. FIG. 22 presents a drawing illustrating determining equalized audio content using speakers 118. In particular, A/V hub 112 may measure sound 2210, corresponding to audio content, which is output by speakers 118. Alternatively or additionally, portable electronic device 110 and/or at least some of speakers 118 may measure sound 2210 and may provide information specifying the measurements to A/V hub 112 in frames or packets 2212.

Then, A/V hub 112 may compare the measured sound 2210 to a desired acoustic characteristic at a location 2214 in the environment (such as a dynamic location of one or more listeners, which may also be the location of portable electronic device 110) based on location 2214, location 2216 of A/V hub 112, locations 2218 of speakers 118, and/or a predetermined or dynamically determined acoustic transfer function (or, more generally, an acoustic characteristic) of the environment in at least a band of frequencies. For example, A/V hub 112 may calculate the acoustic transfer function at location 2214, 2216 and/or 2218. As noted previously, this calculation may involve the use of a Green's function technique to compute the acoustic response at locations 2214, 2216 and/or 2218. Alternatively or additionally, the calculation may involve interpolation (such as minimum bandwidth interpolation) of a predetermined acoustic transfer function at different locations in the environment that locations 2214, 2216 and/or 2218. Then, A/V hub 112 may correct the measured sound 2210 based on the computed and/or interpolated acoustic transfer function (and, more generally, the acoustic characteristic).

In this way, the communication technique may be used to compensate for sparse sampling when the acoustic transfer function was originally determined.

Moreover, A/V hub 112 may determine equalized audio content based on the comparison and the audio content. For example, A/V hub 112 may modify the spectral content and/or phase of the audio content as a function of frequency in a range of frequencies (such as 100-10,000 or 20,000 Hz) to achieve the desired acoustic characteristic.

Next, A/V hub 112 may transmit one or more frames or packets that include the equalized audio content (such as music) and playback timing information to speakers 118 (such as packet 2220 with equalized audio content 2222 and playback timing information 2224), where the playback timing information may specify playback times when speakers 118 are to playback the equalized audio content.

In this way, the communication technique may allow the sound output by speakers 118 to adapt to changes in location 2214 of one or more listeners (such as an average or mean location, a location corresponding to a majority of the listeners, an average location of a largest subset of the listeners for which the desired acoustic characteristic can be achieved given the audio content and the acoustic transfer function or the acoustic characteristics of the environment, etc.). This may allow the sweet spot in stereophonic sound to track motion of the one or more listeners and/or changes in the number of listeners in the environment (which may be determined by A/V hub 112 using one or more of the aforementioned techniques). Alternatively or additionally, the communication technique may allow the sound output by speakers 118 to adapt to changes in the audio content and/or in the desired acoustic characteristic. For example, depending on the type of audio content (such as a type of music), the one or more listeners may want or desire a big or broad sound (with diverging sound waves corresponding to an apparently physically extended acoustic source) or an apparently narrow or point source. Thus, the communication technique may allow the audio content to be equalized according to a desired psychoacoustic experience of the one or more listeners. Note that the desired acoustic characteristic or the desired psychoacoustic experience may be explicitly specified by one or more of the listeners (such by using a user interface on portable electronic device 110) or may be determined or inferred indirectly without user action (such as based on the type of music or prior acoustic preferences of the one or more listeners that are stored in a listening history).

In some embodiments of methods 200 (FIG. 2), 500 (FIG. 5), 800 (FIG. 8), 1100 (FIG. 11), 1400 (FIG. 14), 1700 (FIG. 17) and/or 2000 (FIG. 20) there are additional or fewer operations. Moreover, the order of the operations may be changed, and/or two or more operations may be combined into a single operation. Furthermore, one or more operations may be modified.

We now describe embodiments of an electronic device. FIG. 23 presents a block diagram illustrating an electronic device 2300, such as portable electronic device 110, A/V hub 112, one of A/V display devices 114, receiver device 116 or one of speakers 118 in FIG. 1. This electronic device includes processing subsystem 2310, memory subsystem 2312, networking subsystem 2314, optional feedback subsystem 2334, and optional monitoring subsystem 2336. Processing subsystem 2310 includes one or more devices configured to perform computational operations. For example, processing subsystem 2310 can include one or more microprocessors, application-specific integrated circuits (ASICs), microcontrollers, programmable-logic devices, and/or one or more digital signal processors (DSPs). One or more of these components in processing subsystem are sometimes referred to as a 'control circuit.' In some embodiments, processing subsystem 2310 includes a 'control mechanism' or a 'means for processing' that perform at least some of the operations in the communication technique.

Memory subsystem 2312 includes one or more devices for storing data and/or instructions for processing subsystem 2310 and networking subsystem 2314. For example, memory subsystem 2312 can include dynamic random access memory (DRAM), static random access memory (SRAM), and/or other types of memory. In some embodiments, instructions for processing subsystem 2310 in memory subsystem 2312 include: one or more program modules or sets of instructions (such as program module 2322 or operating system 2324), which may be executed by processing subsystem 2310. Note that the one or more computer programs or program modules may constitute a computer-program mechanism. Moreover, instructions in the various modules in memory subsystem 2312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2310.

In addition, memory subsystem 2312 can include mechanisms for controlling access to the memory. In some embodiments, memory subsystem 2312 includes a memory hierarchy that comprises one or more caches coupled to a memory in electronic device 2300. In some of these embodiments, one or more of the caches is located in processing subsystem 2310.

In some embodiments, memory subsystem 2312 is coupled to one or more high-capacity mass-storage devices (not shown). For example, memory subsystem 2312 can be coupled to a magnetic or optical drive, a solid-state drive, or another type of mass-storage device. In these embodiments, memory subsystem 2312 can be used by electronic device 2300 as fast-access storage for often-used data, while the mass-storage device is used to store less frequently used data.

Networking subsystem 2314 includes one or more devices configured to couple to and communicate on a wired and/or wireless network (i.e., to perform network operations), including: control logic 2316, interface circuits 2318 and associated antennas 2320. (While FIG. 23 includes antennas 2320, in some embodiments electronic device 2300 includes one or more nodes, such as nodes 2308, e.g., pads, which can be coupled to antennas 2320. Thus, electronic device 2300 may or may not include antennas 2320.) For example, networking subsystem 2314 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 2318 and at least one of antennas 2320 may constitute a radio. In some embodiments, networking subsystem 2314 includes a wired interface, such as HDMI interface 2330.

Networking subsystem 2314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 2300 may use the mechanisms in networking subsystem 2314 for performing simple wireless communication between the electronic devices, e.g., transmitting advertising or beacon frames or packets and/or scanning for advertising frames or packets transmitted by other electronic devices as described previously.

Within electronic device 2300, processing subsystem 2310, memory subsystem 2312, networking subsystem 2314, optional feedback subsystem 2334 and optional monitoring subsystem 2336 are coupled together using bus 2328. Bus 2328 may include an electrical, optical, and/or electro-optical connection that the subsystems can use to communicate commands and data among one another. Although only one bus 2328 is shown for clarity, different embodiments can include a different number or configuration of electrical, optical, and/or electro-optical connections among the subsystems.

In some embodiments, electronic device 2300 includes a display subsystem 2326 for displaying information on a display (such as a request to clarify an identified environment), which may include a display driver, an I/O controller and the display. Note that a wide variety of display types may be used in display subsystem 2326, including: a two-dimensional display, a three-dimensional display (such as a holographic display or a volumetric display), a head-mounted display, a retinal-image projector, a heads-up display, a cathode ray tube, a liquid-crystal display, a projection display, an electroluminescent display, a display based on electronic paper, a thin-film transistor display, a high-performance addressing display, an organic light-emitting diode display, a surface-conduction electronic-emitter display, a laser display, a carbon-nanotube display, a quantum-dot display, an interferometric modulator display, a multi-touch touchscreen (which is sometimes referred to as a touch-sensitive display), and/or a display based on another type of display technology or physical phenomenon.

Furthermore, optional feedback subsystem 2334 may include one or more sensor-feedback mechanisms or devices, such as: a vibration mechanism or a vibration actuator (e.g., an eccentric-rotating-mass actuator or a linear-resonant actuator), a light, one or more speakers, etc., which can be used to provide feedback to a user of electronic device 2300 (such as sensory feedback). Alternatively or additionally, optional feedback subsystem 2334 may be used to provide a sensory input to the user. For example, the one or more speakers may output sound, such as audio. Note that the one or more speakers may include an array of transducers that can be modified to adjust a characteristic of the sound output by the one or more speakers, such as a phased-array of acoustic transducers. This capability may allow the one or more speakers to modify the sound in an environment to achieve a desired acoustic experience for a user, such as by changing equalization or spectral content, phase and/or a direction of the propagating sound waves.

In some embodiments, optional monitoring subsystem 2336 includes one or more acoustic transducers 2338 (such as one or more microphones, a phased-array, etc.) that monitor sound in the environment that includes electronic device 2300. The acoustic monitoring may allow electronic device 2300 to acoustically characterize the environment, acoustically characterize sound output by speakers in the environment (such as sound corresponding to audio content), determine a location of a listener, determine a location of a speaker in the environment and/or measure sound from one or more speakers that correspond to one or more acoustic-characterization patterns (which may be used to coordinate playback of audio content). Additionally, optional monitoring subsystem 2336 may include location transducers 2340 that can be used to determine a location of a listener or an electronic device (such as a speaker) in the environment.

Electronic device 2300 can be (or can be included in) any electronic device with at least one network interface. For example, electronic device 2300 can be (or can be included in): a desktop computer, a laptop computer, a subnotebook/netbook, a server, a tablet computer, a smartphone, a cellular telephone, a smartwatch, a consumer-electronic device (such as a television, a set-top box, audio equipment, a speaker, video equipment, etc.), a remote control, a portable computing device, an access point, a router, a switch, communication equipment, test equipment, and/or another electronic device.

Although specific components are used to describe electronic device 2300, in alternative embodiments, different components and/or subsystems may be present in electronic device 2300. For example, electronic device 2300 may include one or more additional processing subsystems, memory subsystems, networking subsystems, and/or display subsystems. Moreover, while one of antennas 2320 is shown coupled to a given one of interface circuits 2318, there may be multiple antennas coupled to the given one of interface circuits 2318. For example, an instance of a 3×3 radio may include three antennas. Additionally, one or more of the subsystems may not be present in electronic device 2300. Furthermore, in some embodiments, electronic device 2300 may include one or more additional subsystems that are not shown in FIG. 23. Also, although separate subsystems are shown in FIG. 23, in some embodiments, some or all of a given subsystem or component can be integrated into one or more of the other subsystems or component(s) in electronic device 2300. For example, in some embodiments program module 2322 is included in operating system 2324.

Moreover, the circuits and components in electronic device 2300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2314, such as one or more radios. Moreover, the integrated circuit may include hardware and/or software mechanisms that are used for transmitting wireless signals from electronic device 2300 and receiving signals at electronic device 2300 from other electronic devices. Aside from the mechanisms herein described, radios are generally known in the art and hence are not described in detail. In general, networking subsystem 2314 and/or the integrated circuit can include any number of radios.

In some embodiments, networking subsystem 2314 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame or packet, calculating a performance metric, performing spectral analysis, etc.) Furthermore, networking subsystem 2314 may include at least one port (such as an HDMI port 2332) to receive and/or provide the information in the data stream to at least one of A/V display devices 114 (FIG. 1), at least one of speakers 118 (FIG. 1) and/or at least one of content sources 120 (FIG. 1).

While a communication protocol compatible with Wi-Fi was used as an illustrative example, the described embodiments may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 2322, operating system 2324 (such as drivers for interface circuits 2318) and/or in firmware in interface circuits 2318. Alternatively or additionally, at least some of the operations in the communication technique may be implemented in a physical layer, such as hardware in interface circuits 2318.

Moreover, while the preceding embodiments included a touch-sensitive display in the portable electronic device that the user touches (e.g., with a finger or digit, or a stylus), in other embodiments the user interface is display on a display in the portable electronic device and the user interacts with the user interface without making contact or touching the surface of the display. For example, the user's interact(s) with the user interface may be determined using time-of-flight measurements, motion sensing (such as a Doppler measurement) or another non-contact measurement that allows the position, direction of motion and/or speed of the user's finger or digit (or a stylus) relative to position(s) of one or more virtual command icons to be determined. In these embodiments, note that the user may activate a given virtual command icon by performing a gesture (such as 'tapping' their finger in the air without making contact with the surface of the display). In some embodiments, the user navigates through the user interface and/or activates/deactivates functions of one of the components in system 100 (FIG. 1) using spoken commands or instructions (i.e., via voice recognition) and/or based on where they are looking at one a display in portable electronic device 110 or on one of A/V display devices 114 in FIG. 1 (e.g., by tracking the user's gaze or where the user is looking).

Furthermore, while A/V hub 112 (FIG. 1) were illustrated as separate components from A/V display devices 114 (FIG. 1), in some embodiments an A/V hub and an A/V display device are combined into a single component or a single electronic device.

While the preceding embodiments illustrated the communication technique with audio and/or video content (such as HDMI content), in other embodiments the communication technique is used in the context of an arbitrary type of data or information. For example, the communication technique may be used with home-automation data. In these embodiments, A/V hub 112 (FIG. 1) may facilitate communication among and control of a wide variety of electronic devices. Thus, A/V hub 112 (FIG. 1) and the communication technique may be used to facilitate or implement services in the so-called Internet of things.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A coordination device, comprising:
   memory configured to store characterization information of an environment;
   one or more nodes configured to communicatively couple to one or more antennas;
   an interface circuit communicatively coupled to the one or more nodes, wherein the coordination device is configured to:
      detect an electronic device in the environment;
      determine a change condition, wherein the change condition includes one of: the electronic device was not previously detected in the environment, and a change in a location of the electronic device, and wherein the change condition is determined based at least in part on wireless communication associated with the electronic device;
      transition into a characterization mode when the change condition is determined, wherein, when in the characterization mode, the coordination device is configured to:
         provide, to the one or more nodes, instructions intended for the electronic device to playback audio content at a specified playback time;
         determine one or more acoustic characteristics of the environment based on acoustic measurements in the environment; and
         store the characterization information in the memory, wherein the characterization information includes the one or more acoustic characteristics, and wherein, while in the characterization mode, the coordination device does not transmit the audio content or additional audio content intended for the electronic device; and
      transition into a normal mode after determining the one or more acoustic characteristics, wherein in the normal mode, the coordination device is configured to transmit, to one or more nodes, one or more frames comprising the additional audio content and playback timing information intended for the electronic device, and
      wherein the playback timing information specifies a playback time when the electronic device is to playback the additional audio content based on the one or more acoustic characteristics.

2. The coordination device of claim 1, wherein the characterization information further includes: an identifier of the electronic device; and the location of the electronic device.

3. The coordination device of claim 1, wherein the location includes a distance between the coordination device and the electronic device, and an angle of arrival of wireless signals associated with the electronic device.

4. The coordination device of claim 3, wherein the change in the location includes one of a change in: the distance, the angle of arrival, and the distance and the angle of arrival.

5. The coordination device of claim 3, wherein the distance is determined using wireless ranging.

6. The coordination device of claim 1, wherein the one or more acoustic characteristics include information specifying at least one of: an acoustic transfer function in at least a first band of frequencies, acoustic loss, acoustic delay, acoustic noise in the environment, ambient sound in the environment, a reverberation time of the environment, and a spectral response in at least a second band of frequencies.

7. The coordination device of claim 1, wherein the coordination device is further configured to calculate the location of the electronic device in the environment based on one or more frames, associated with the electronic device, which are received from the one or more nodes.

8. The coordination device of claim 1, wherein the acoustic measurements associated with other electronic device are received from the one or more nodes.

9. The coordination device of claim 8, wherein the one or more acoustic characteristics are further determined based on locations of the other electronic devices in the environment.

10. The coordination device of claim 9, wherein the coordination device is further configured to perform one of: receive the locations of the other electronic devices from the one or more nodes; access predetermined locations of the other electronic devices stored in the memory; and determine the locations of the other electronic devices based on one or more frames, associated with the other electronic devices, which are received from the one or more nodes.

11. The coordination device of claim 1, further comprising one or more acoustic transducers, wherein the coordination device is further configured to perform the acoustic measurements using the one or more acoustic transducers.

12. The coordination device of claim 1, wherein the coordination device is configured to:
   receive a user input; and
   transition into the characterization mode based on the user input.

13. A non-transitory computer-readable storage medium for use with a coordination device, the computer-readable storage medium storing a program module that, when executed by the coordination device, causes the coordination device to selectively determine one or more acoustic characteristics by carrying out one or more operations comprising:
   detecting, based on wireless communication, an electronic device in an environment;
   determining a change condition, wherein the change condition includes one of: the electronic device was not previously detected in the environment, and a change in a location of the electronic device, and wherein the change condition is determined based at least in part on the wireless communication;
transitioning into a characterization mode when the change condition is determined, wherein, when in the characterization mode, the one or more operations comprise:
providing, to one or more nodes in the coordination device that are communicatively coupled to one or more antennas, instructions intended for the electronic device to playback audio content at a specified playback time;
determining the one or more acoustic characteristics of the environment based on acoustic measurements in the environment; and
storing the characterization information in the memory, wherein the characterization information includes the one or more acoustic characteristics, and wherein, while in the characterization mode, the coordination device does not transmit the audio content or the additional audio content intended for the electronic device; and
transitioning into a normal mode after determining the one or more acoustic characteristics, wherein in the normal mode, the one or more operations comprise transmitting, to one or more nodes, one or more frames comprising the additional audio content and playback timing information intended for the electronic device, and
wherein the playback timing information specifies a playback time when the electronic device is to playback the additional audio content based on the one or more acoustic characteristics.

14. The computer-readable storage medium of claim 13, wherein the location includes a distance between the coordination device and the electronic device, and an angle of arrival of wireless signals associated with the electronic device.

15. The computer-readable storage medium of claim 14, wherein the change in the location includes one of a change in: the distance, the angle of arrival, and the distance and the angle of arrival.

16. The computer-readable storage medium of claim 13, wherein, when in the characterization mode, the one or more operations comprise communicating, to or from the one or more nodes, frames associated with other electronic devices in the environment;
wherein the acoustic measurements associated with the other electronic devices are received from one or more nodes; and
wherein the one or more acoustic characteristics are further determined based on locations of the other electronic devices in the environment.

17. The computer-readable storage medium of claim 13, wherein the one or more operations comprise performing the acoustic measurements using one or more acoustic transducers in the coordination device.

18. A method for selectively determining one or more acoustic characteristics of an environment, comprising:
by a coordination device:
detecting, based on wireless communication, an electronic device in the environment;
determining a change condition, wherein the change condition includes one of: the electronic device was not previously detected in the environment, and a change in a location of the electronic device, and wherein the change condition is determined based at least in part on the wireless communication;
when the change condition is determined:
transitioning into a characterization mode;
providing, to one or more nodes in the coordination device that are communicatively coupled to one or more antennas, instructions intended for the electronic device to playback audio content at a specified playback time;
determining the one or more acoustic characteristics of the environment based on acoustic measurements in the environment; and
storing the characterization information in the memory, wherein the characterization information includes the one or more acoustic characteristics, and wherein, while in the characterization mode, the coordination device does not transmit the audio content or the additional audio content intended for the electronic device; and
transitioning into a normal mode after determining the one or more acoustic characteristics, wherein in the normal mode, the one or more operations comprise transmitting, to one or more nodes, one or more frames comprising the additional audio content and playback timing information intended for the electronic device; and
wherein the playback timing information specifies a playback time when the electronic device is to playback the additional audio content based on the one or more acoustic characteristics.

19. The method of claim 18, wherein the location includes a distance between the coordination device and the electronic device, and an angle of arrival of wireless signals associated with the electronic device; and
wherein the distance is determined using wireless ranging.

20. The method of claim 18, wherein the location includes a distance between the coordination device and the electronic device, and an angle of arrival of wireless signals associated with the electronic device; and
wherein the change in the location includes one of a change in: the distance, the angle of arrival, and the distance and the angle of arrival.

* * * * *